United States Patent [19]

Otake et al.

[11] Patent Number: 5,291,189
[45] Date of Patent: Mar. 1, 1994

[54] DIRECT MEMORY ACCESS APPARATUS IN IMAGE PROCESSING SYSTEM AND EXTERNAL STORAGE DEVICE USED THEREIN

[75] Inventors: Masahiro Otake, Kyoto; Toyofumi Takahashi, Tokyo; Satoshi Nishiumi, Kyoto; Hitoshi Yamamoto, Tokyo, all of Japan

[73] Assignees: Nintendo Co., Ltd., Kyoto; Ricoh Co., Ltd., Tokyo, both of Japan

[21] Appl. No.: 749,530

[22] Filed: Aug. 26, 1991

[30] Foreign Application Priority Data

Aug. 27, 1990 [JP] Japan ................................. 2-225671

[51] Int. Cl.⁵ ............................................. G09G 5/36
[52] U.S. Cl. ...................................... 340/799; 340/798; 340/814
[58] Field of Search ................ 340/799, 798, 744, 747, 340/750, 724, 726, 814, 725; 273/856, 433-437, DIG. 28; 358/335, 339, 310

[56] References Cited

U.S. PATENT DOCUMENTS

| 4,432,067 | 2/1984 | Nielson | 273/DIG. 28 |
| 4,439,762 | 3/1984 | Van Vliet et al. | 340/799 |
| 4,445,114 | 4/1984 | Stubben | 340/726 |
| 4,591,845 | 5/1986 | Komatsu et al. | 340/750 |
| 4,777,485 | 10/1988 | Costello | 340/799 |

Primary Examiner—Jeffery Brier
Attorney, Agent, or Firm—Nixon & Vanderhye

[57] ABSTRACT

A direct memory access apparatus includes a CPU, and data of one byte or more to be transferred is stored in a working RAM of the CPU or an external storage unit. The external storage unit includes a memory cartridge or a CD-ROM, and stores parameter data including the number of data to be transferred, and a first address and second address for direct memory access. Prior to a start of the direct memory access, the parameter data is read and, when a horizontal blanking signal is generated from a counter included in a video processor, the data is read from the working RAM or the external storage unit in accordance with the first address value and the data is transferred to an internal memory of the video processor in accordance with the second address value.

12 Claims, 49 Drawing Sheets

26
DMA CIRCUIT

DMA CONTROL
SIGNAL
GENERATING
CIRCUIT
562

DATA SWITCHING CONTROL SIGNAL GENERATING CIRCUIT 38

ARITHMETIC CONTROL CIRCUIT 42

LBO SIGNAL GENERATING CIRCUIT 44

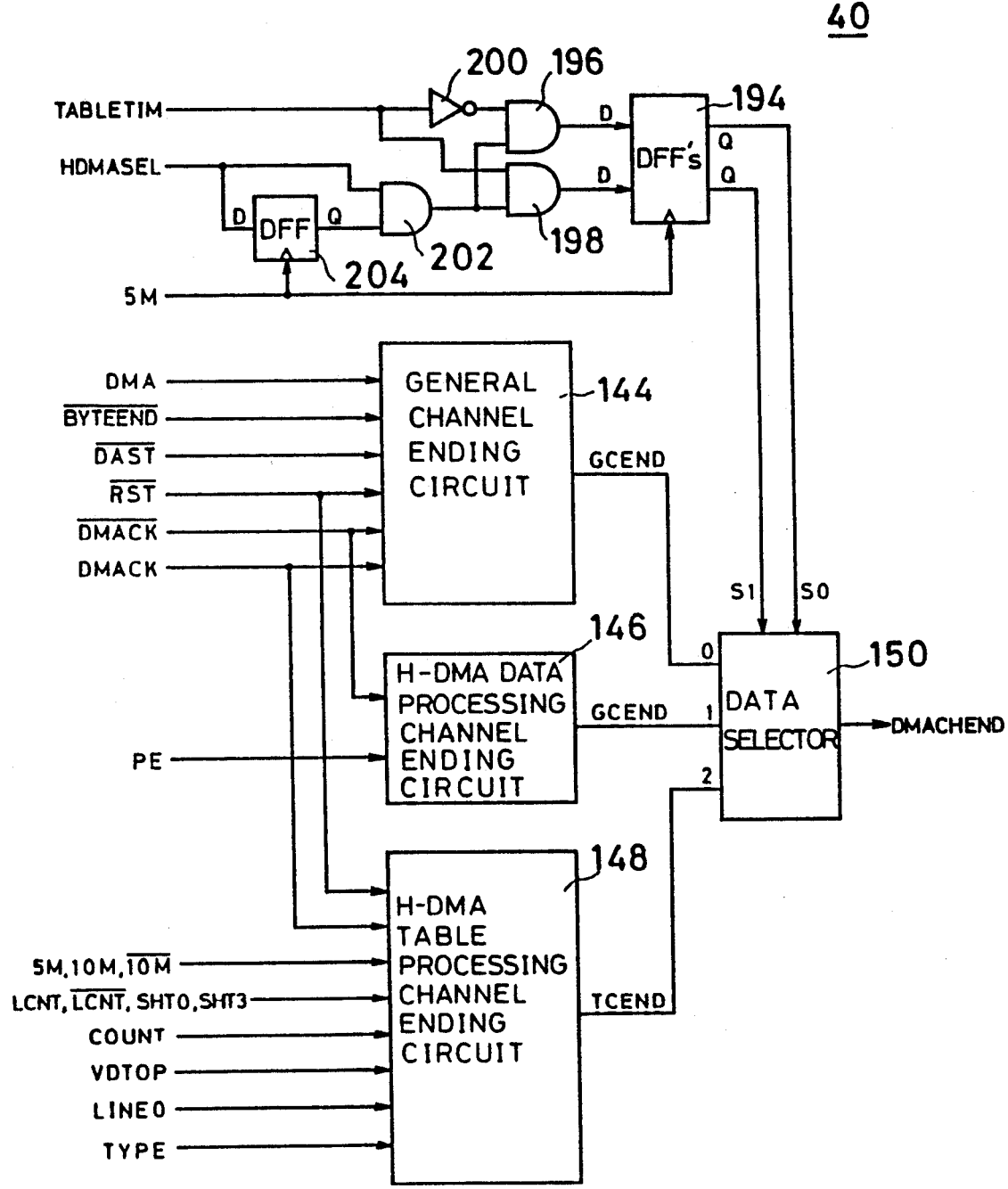

F I G. 13
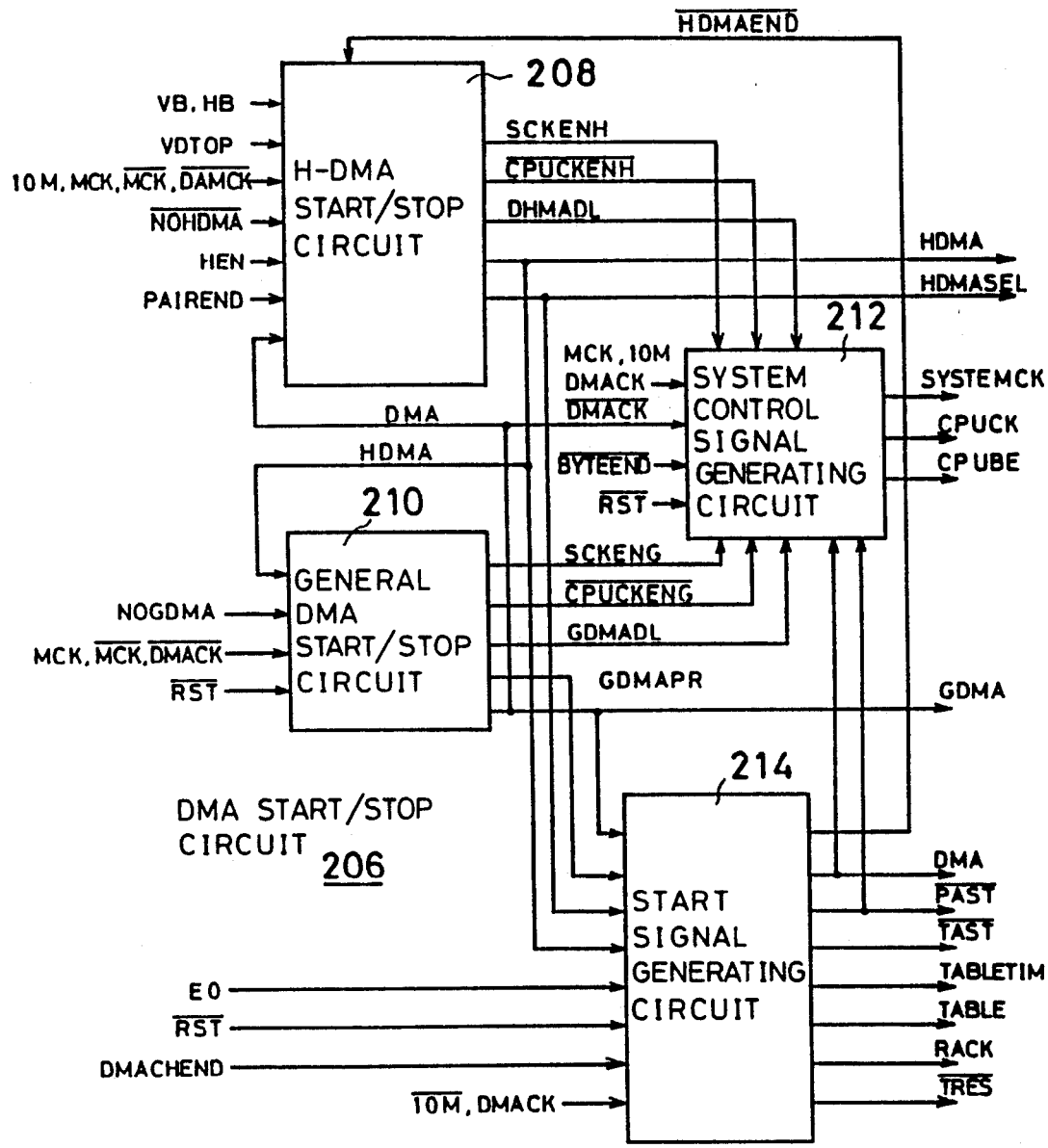

208 H-DMA START/STOP CIRCUIT

F I G. 17
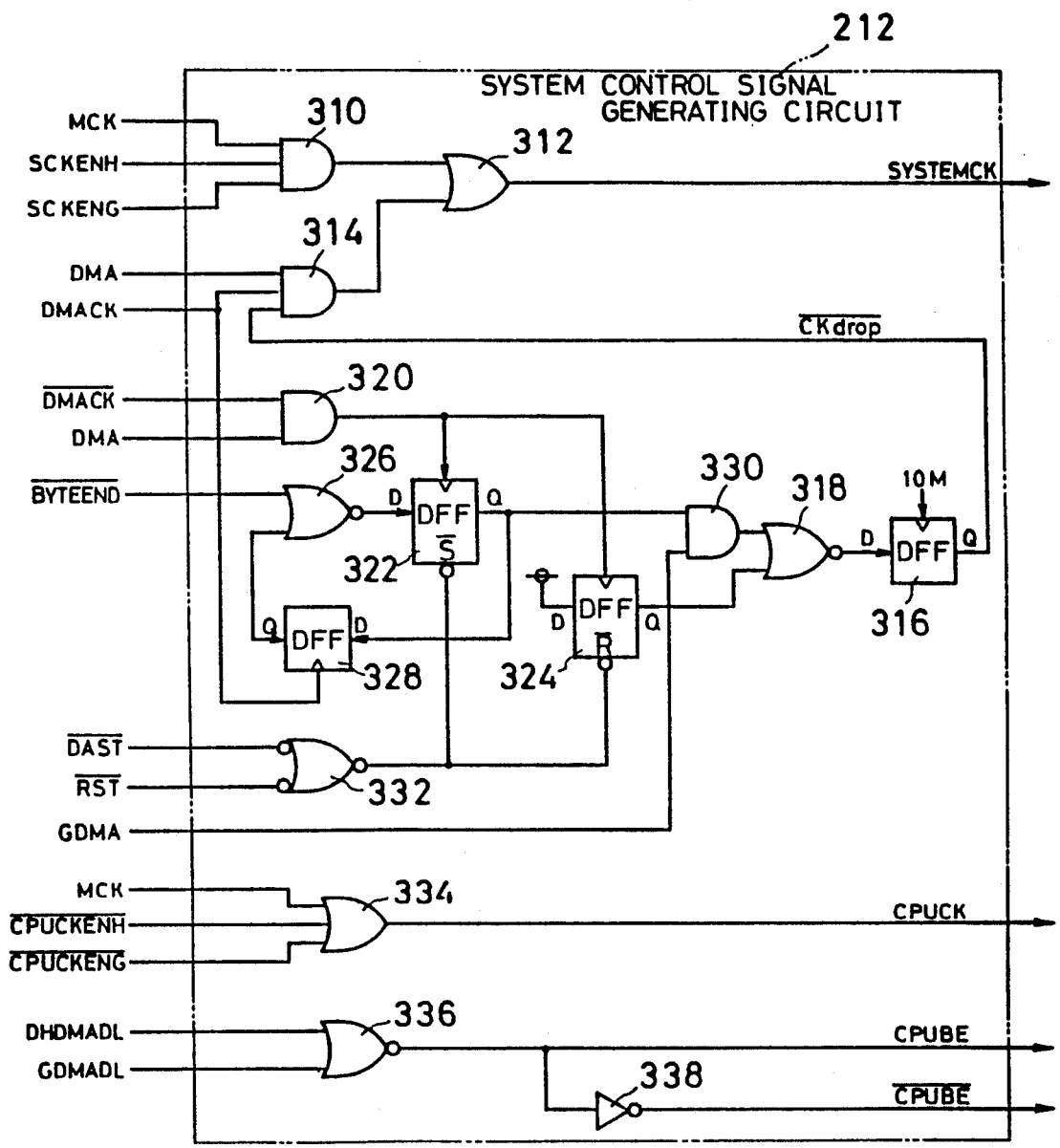

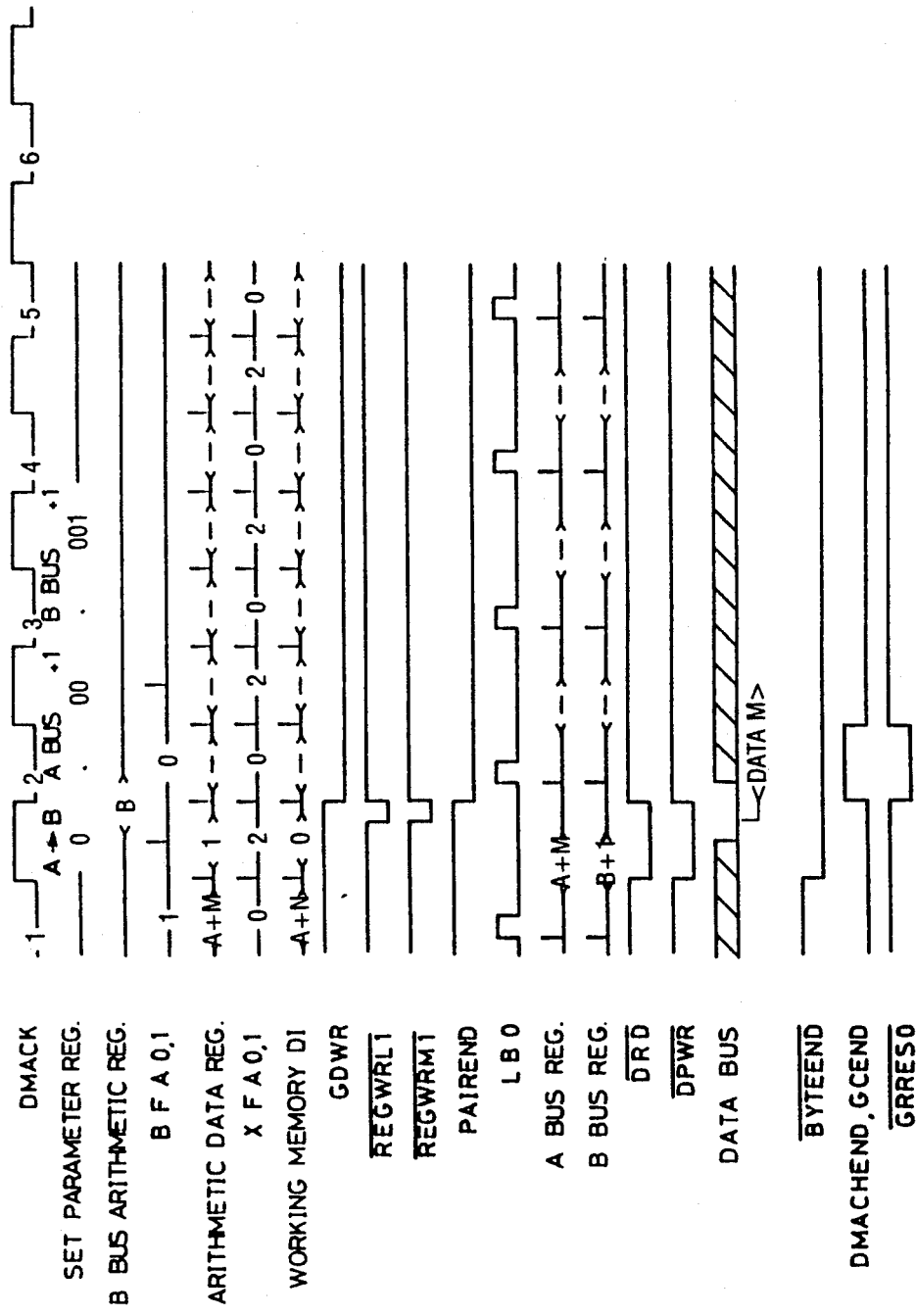

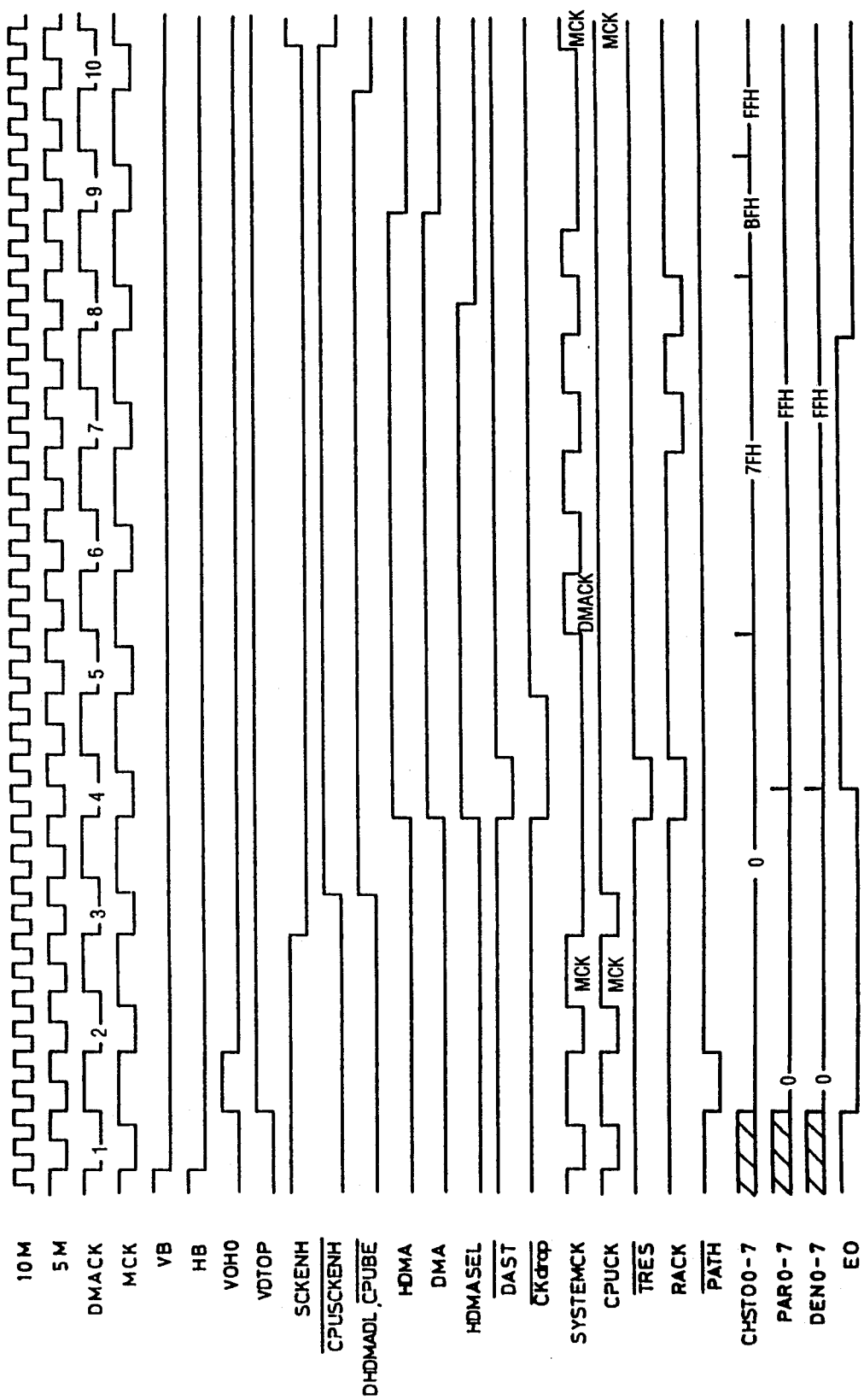

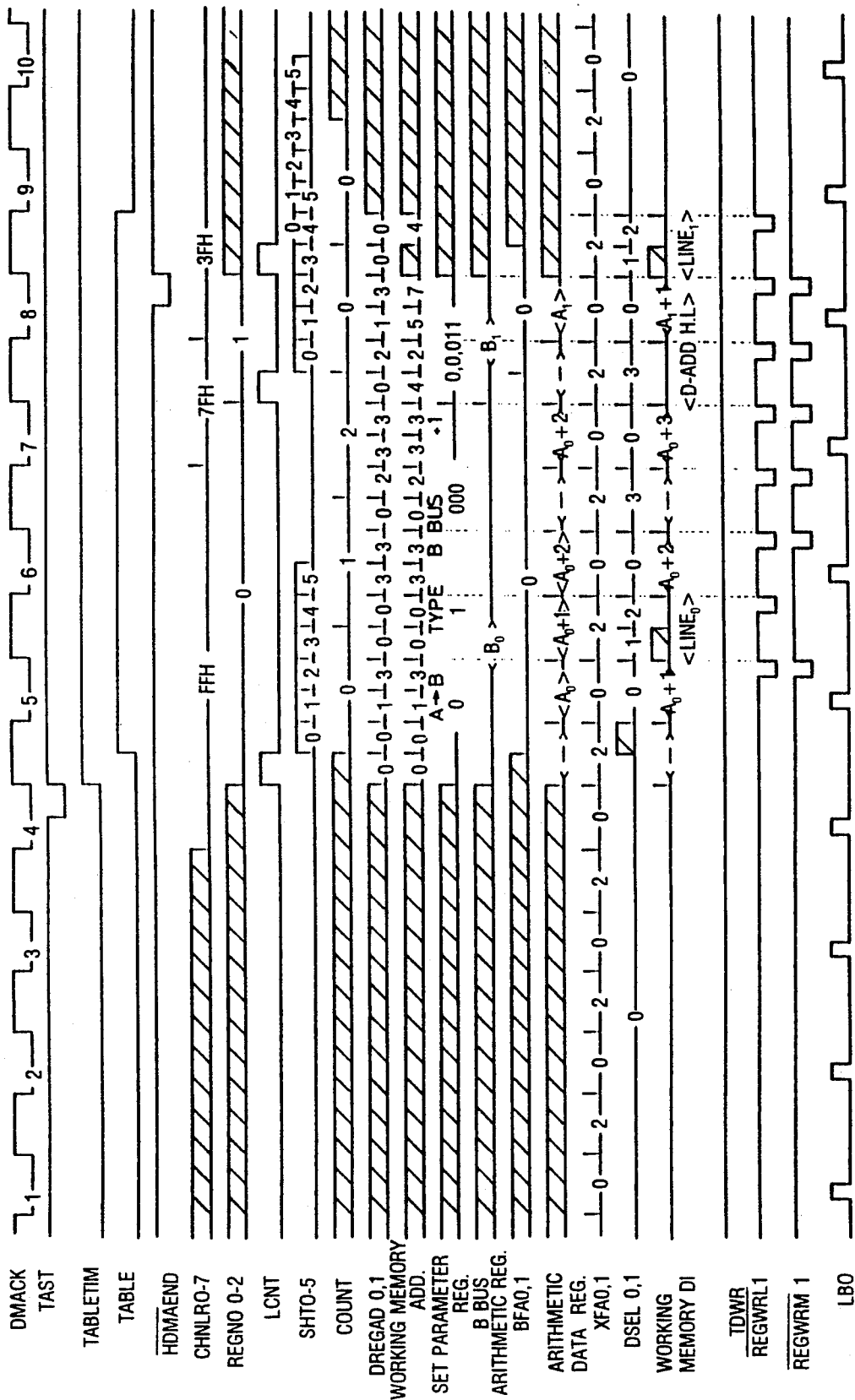

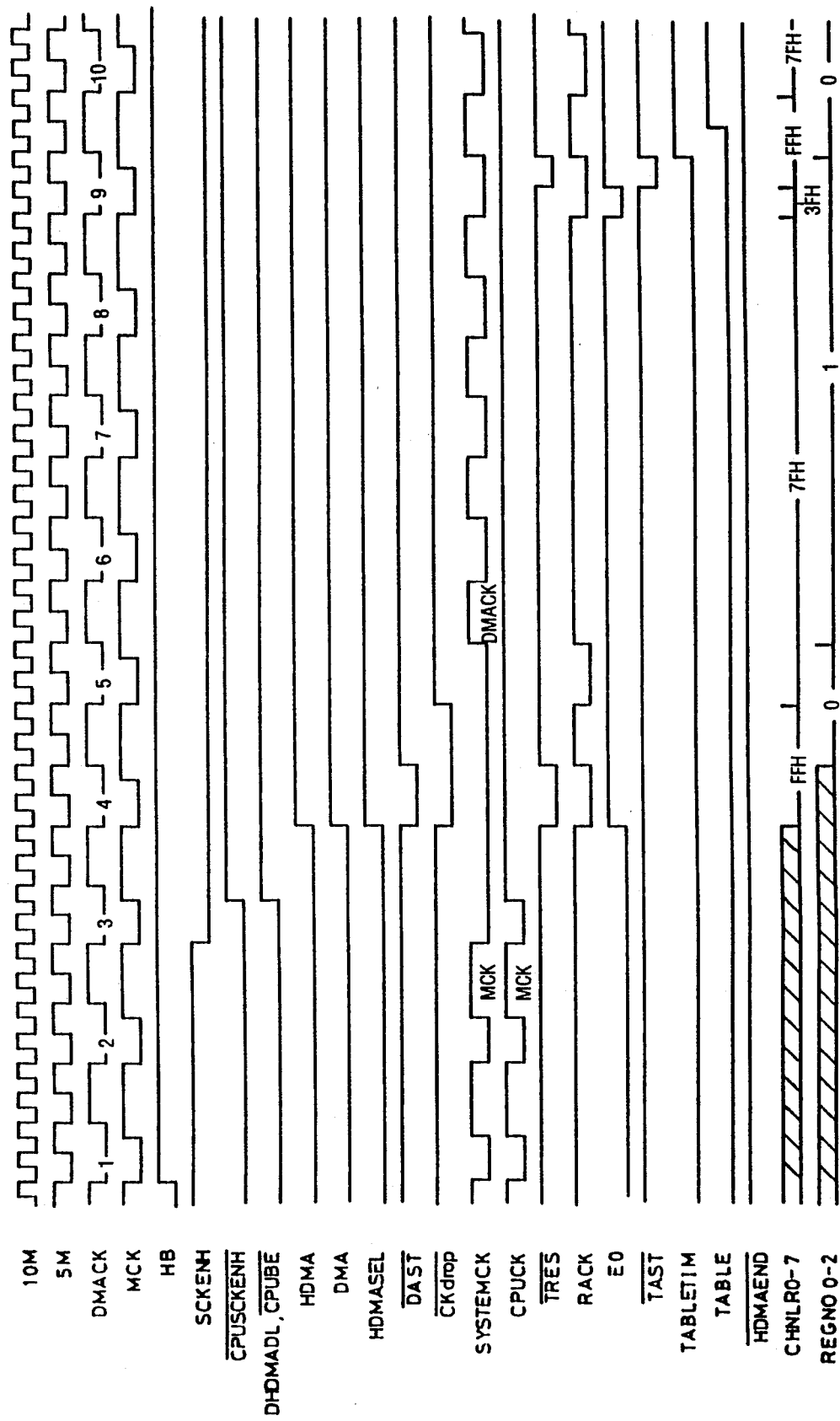

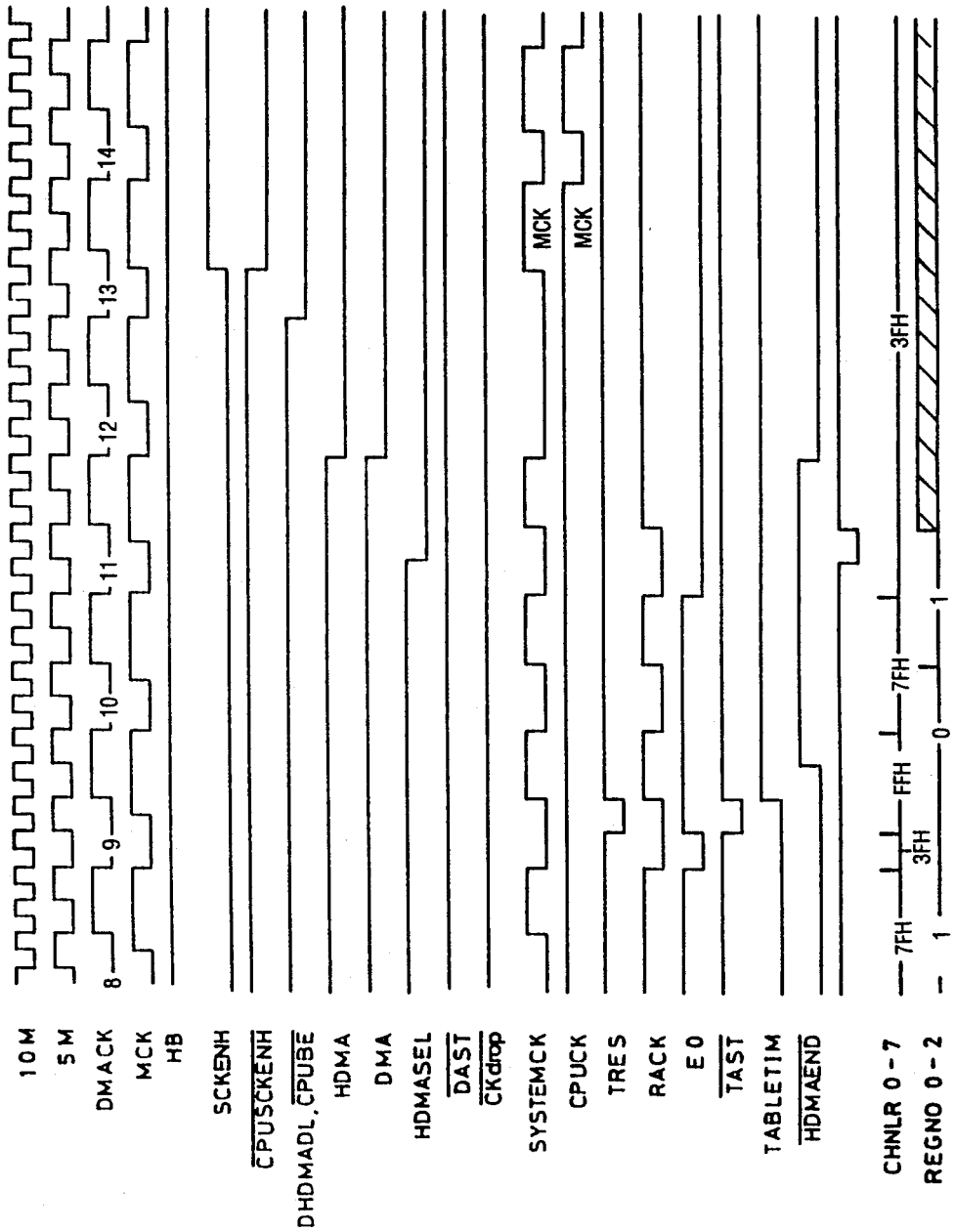

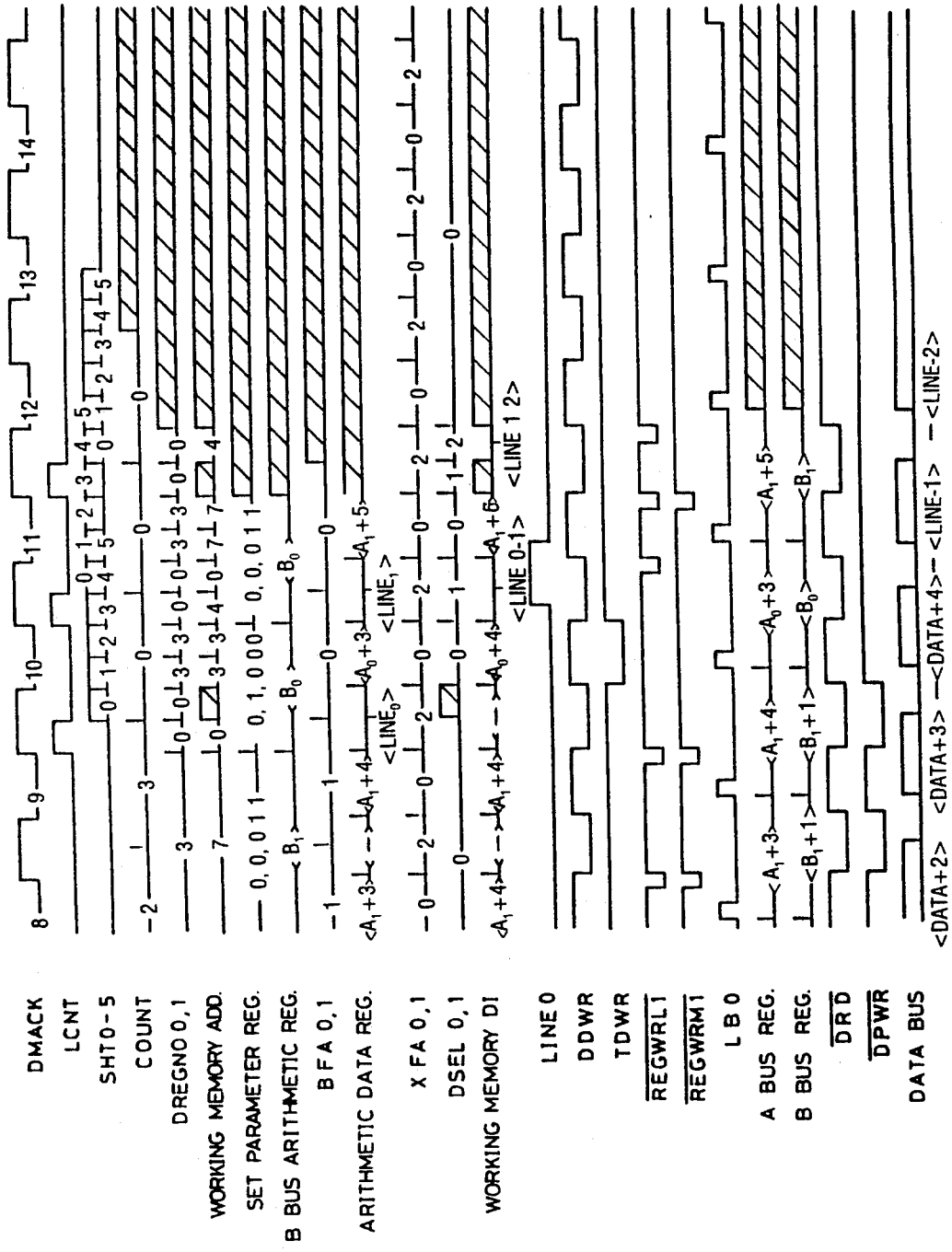

F I G. 38A
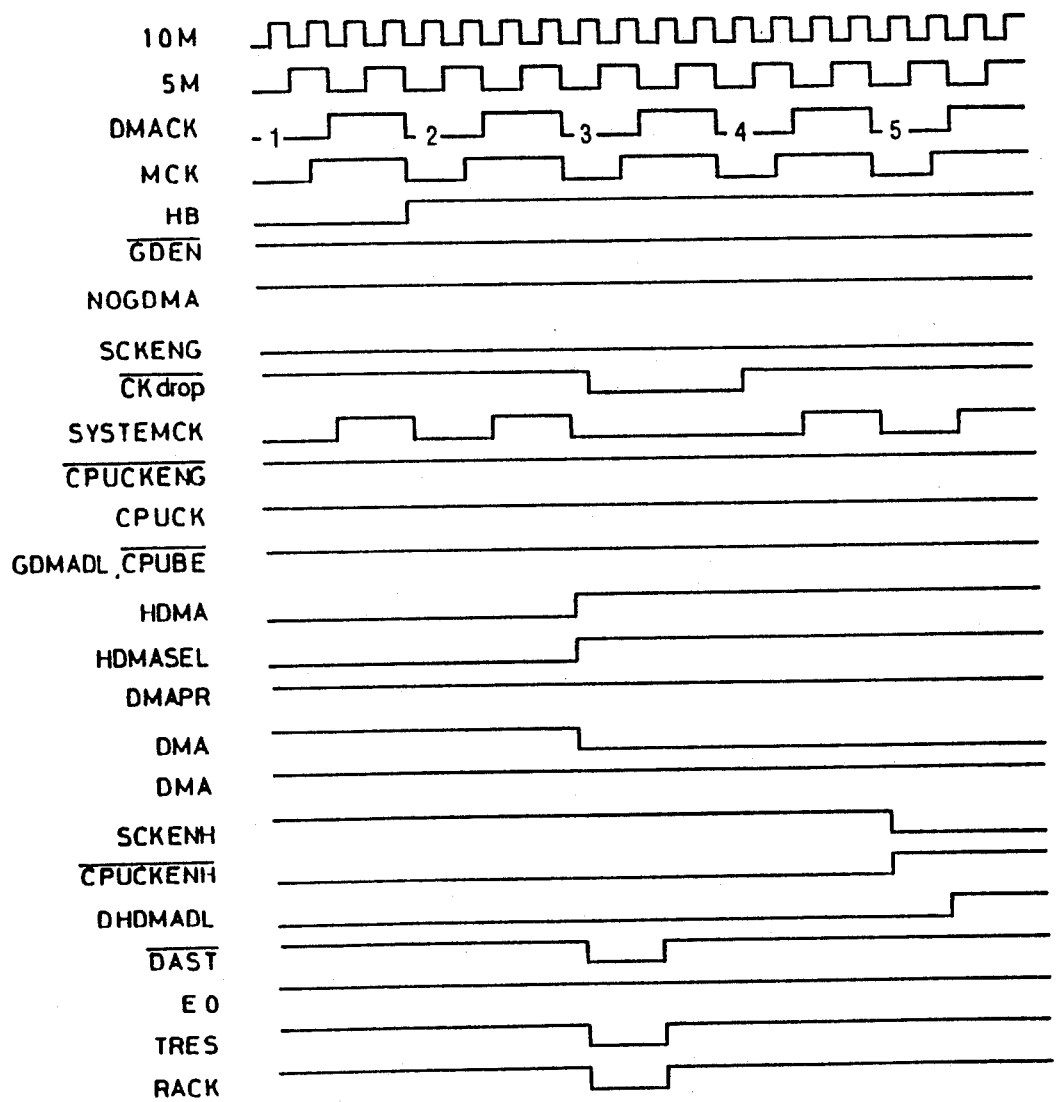

F I G. 38B
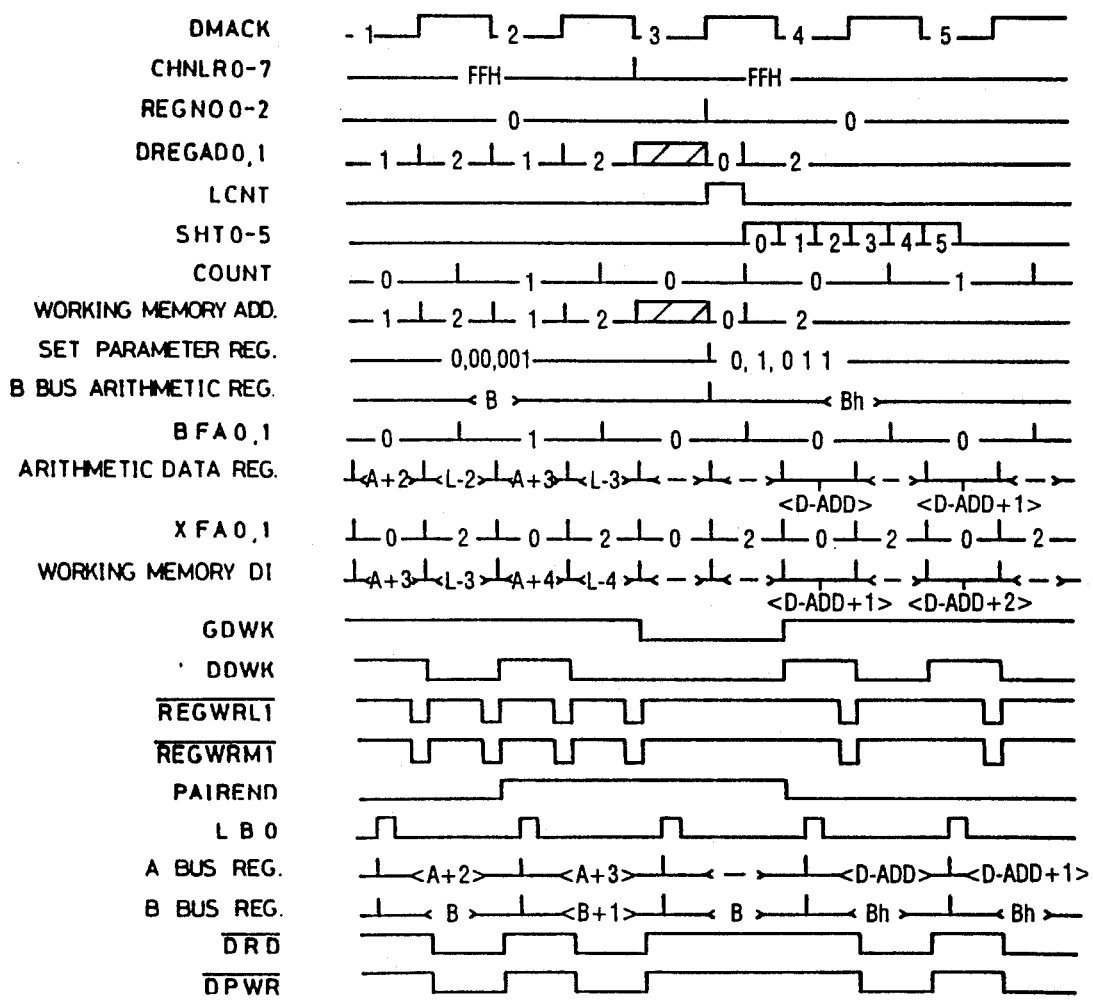

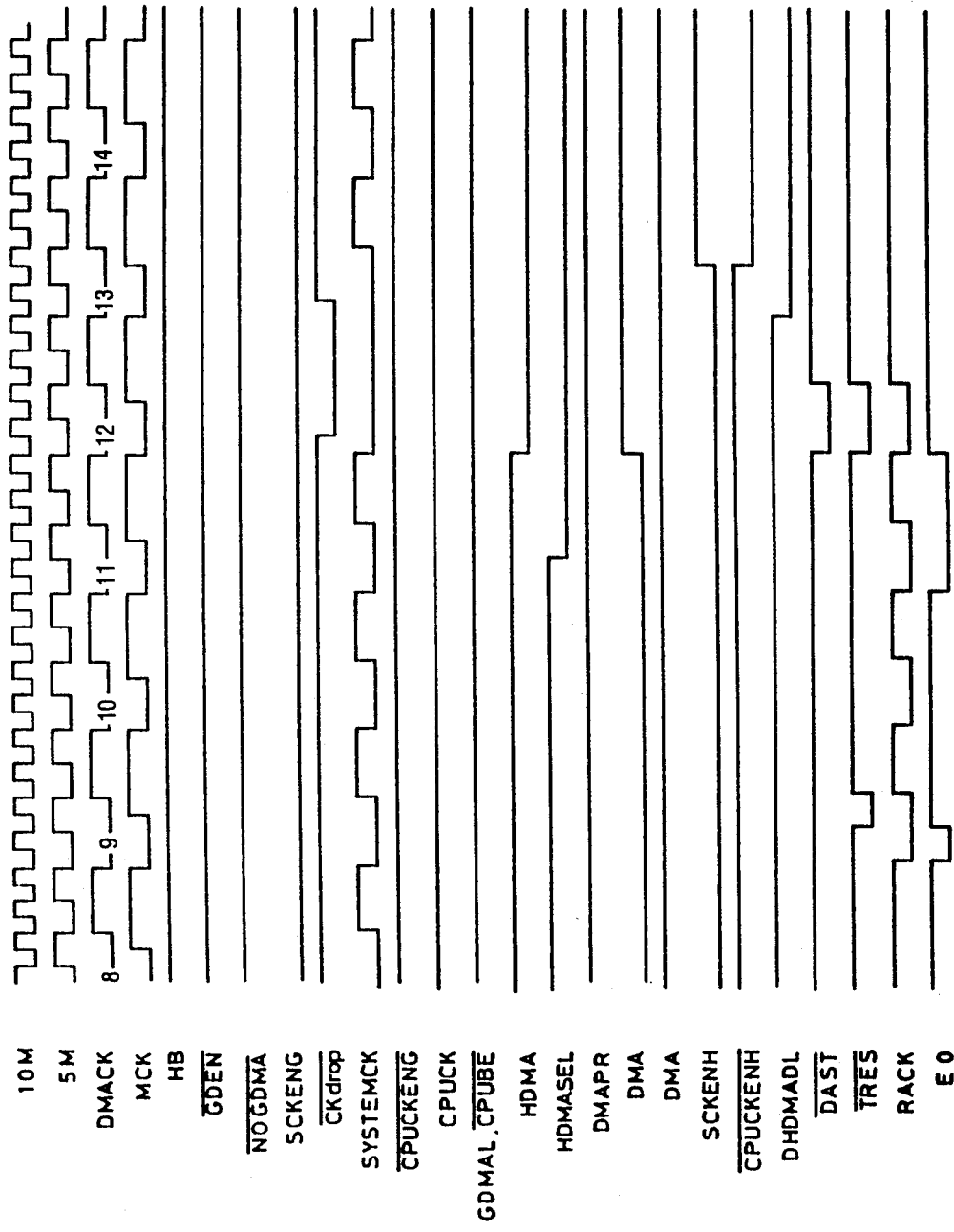

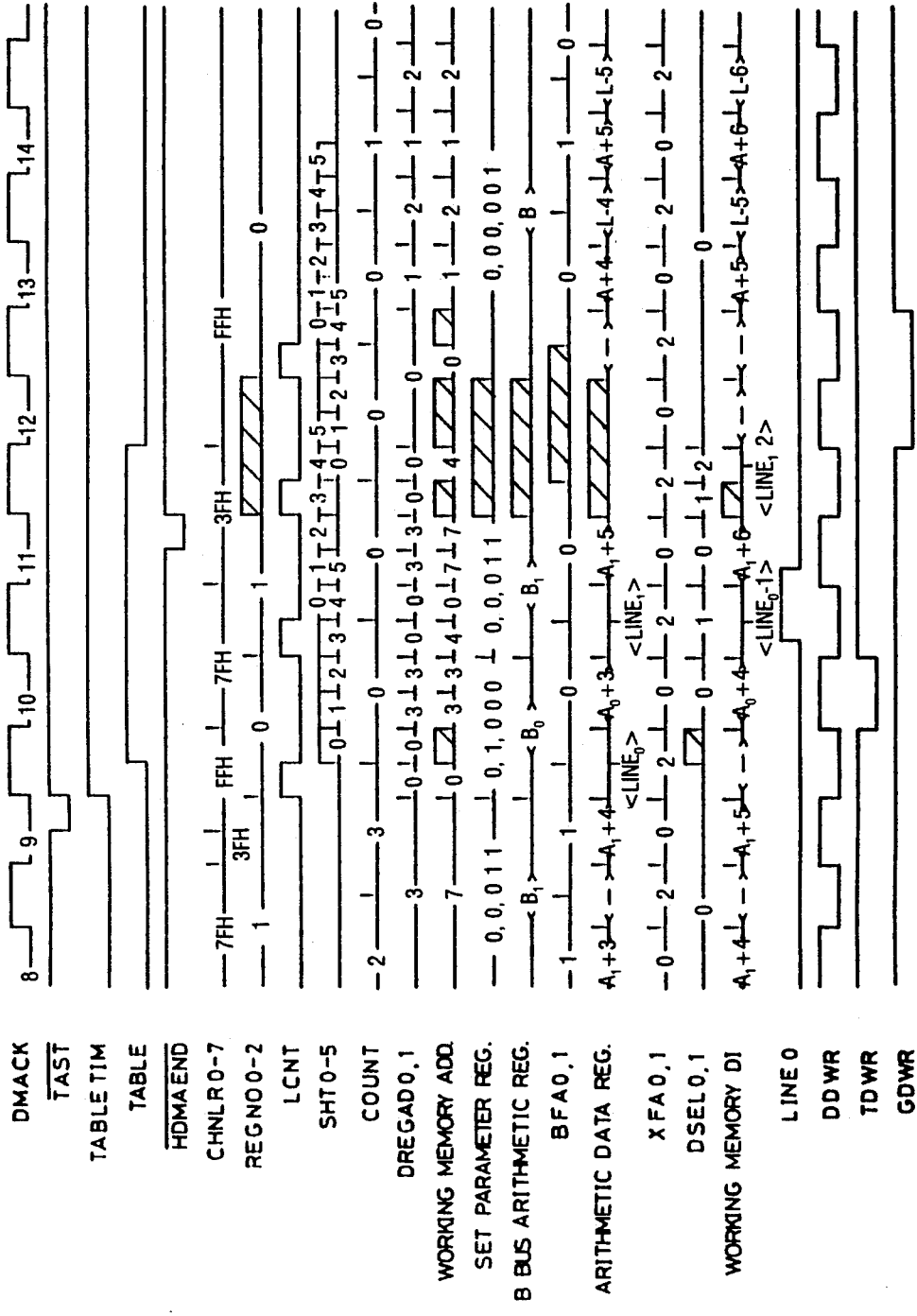

C = 0

C = 1

DIRECT MEMORY ACCESS APPARATUS IN IMAGE PROCESSING SYSTEM AND EXTERNAL STORAGE DEVICE USED THEREIN

CROSS-REFERENCE TO RELATED APPLICATIONS

This application is related to U.S. Ser. No. application 07/651,265, entitled "Video Processing Apparatus", which was filed on Apr. 10, 1991, naming Takahishi et al as inventors, which application is hereby expressly incorporated herein by reference. This application is also related, to a U.S. application Ser. No. 07/749,527 filed concurrently herewith on Aug. 26, 1991 and entitled, "Video Display Apparatus and External Storage Device Used Therein", naming Otake et al as inventors, which application is hereby expressly incorporated herein by reference. This application Ser. No. 07/749,533 is also related to an application filed concurrently herewith on Aug. 26, 1991 entitled "Still Picture Display Apparatus and External Storage Device Used Therein", naming Otake et al as inventors, which application is hereby expressly incorporated herein by reference.

This application is also related to U.S. application Ser. No. 07/749,938 filed on Aug. 23, 1991, entitled "TV Game Machine" naming Inoue et al as inventors. This latter application discloses an exemplary mechanical design for a video game control deck and associated removable game cartridge, which design may be used to house the electronics described herein. This application is also expressly incorporated herein by reference.

BACKGROUND OF THE INVENTION

1. Field of the invention

The present invention relates to a direct memory access apparatus in an image processing system and an external storage device used therein. More specifically, the present invention relates to a direct memory access apparatus used in an image processing system which displays a image on a raster scan type monitor such as a CRT display or the like.

2. Description of the prior art

One prior art image processing device that displays an image on a raster scan monitor is disclosed in Japanese Patent Publication No. 2-7478 published on Feb. 19, 1990 (corresponding U.S. Pat. No. 4,824,106). When changing display data on a given horizontal line in such a type of image processing device, generally, a CPU verify that the monitor has entered a horizontal blanking period and then the CPU changes either the display data or display parameters.

One disadvantage of the above-noted prior art is that the CPU is overburdened in executing its tasks. Another disadvantage is that because the horizontal blanking period is short, only a limited amount of data can be changed during that period. In TV game machines that do not afford expensive high-speed CPU's, the program involved can be quite complex. This makes it practically impossible to change display data on a horizontal line by horizontal line basis.

SUMMARY OF THE INVENTION

It is therefore a principal object of the present invention to provide a direct memory access apparatus for use in an image processing system, in which it is possible to change display data on a given horizontal line without resorting to complicated programming.

It is another object of the present invention to provide a direct memory access apparatus in an image processing system, in which it is possible to transfer data through a direct memory access during a horizontal blanking period.

It is still another object of the present invention to provide an external storage device which is effectively utilized in the above described system.

In brief, according to the present invention, a direct memory access apparatus in an image processing system that displays an image on a raster scan monitor, comprising a data storing means for storing data to be transferred; a data receiving means for receiving transferred data; an address value generating means for generating a first address value and a second address value necessary for direct memory access; a signal generating means for generating a horizontal blanking signal in synchronism with a horizontal blanking of the raster scan monitor; and a first data transfer means for reading, in response to the horizontal blanking signal from the signal generating means, the data to be transferred from the data storing means in accordance with the first address value, the first data transfer means transferring thereafter a read-out data to the data receiving means in accordance with the second address value.

An external storage device in accordance with the present invention is used in association with a direct memory access apparatus in an image processing system that displays an image on a raster scan monitor, the external storage device comprising an address value storing means for storing a first address value and a second address value necessary for direct memory access. At least one of the external storage device and the direct memory access apparatus includes a data storing means for storing data to be transferred. The direct memory access apparatus includes a data receiving means; a signal generating means for generating a horizontal blanking signal in synchronism with a horizontal blanking period; and a first data transfer means for reading, in response to the horizontal blanking signal from the signal generating means, the data to be transferred from the data storing means in accordance with the first address value and for transferring the data to the data receiving means in accordance with the second address value.

For example, a data to be transferred of at least one byte is stored in the data storing means such as a working RAM of a CPU or a program ROM. The address value generating means generates the first and second address values prior to a start of a direct memory access. For example, when a horizontal blanking signal is outputted by the signal generating means such as a counter contained in a video processor, the first data transfer means is triggered to start an operation. The first data transfer means thereupon reads data from the data storing means as per the first address value and transfers the data to the data receiving means in accordance with the second address value. The data receiving means may be an internal memory of the video processor, a video memory or a port.

According to the invention, since data transfer is carried out by the first data transfer means in response to the horizontal blanking signal, it is possible to change display data during the horizontal blanking period without the intervention of the CPU. This means that the diversity of image display is enhanced without recourse to complicated programming.

For example, when a still image (background image) of FIG. 42 is to be changed to what is shown in FIG. 43, it is conventionally necessary for the CPU to rewrite scroll values for every horizontal line in a portion indicated by "C=1" in FIG. 43. By contrast, the invention involves executing a direct memory access in response to the horizontal blanking signal in such a manner that relevant scroll values are automatically changed without the intervention of the CPU.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 3 illustrates the manner in which

FIGS. 3A and 3B comprise a block diagram showing a DMA circuit in the embodiment of FIG. 1;

FIG. 10 is a block diagram showing a channel ending circuit comprised in the DMA timing signal generating circuit;

FIG. 13 is a schematic block diagram showing a DMA start/stop circuit depicted in FIG. 3B;

FIG. 17 is a block diagram showing a system control signal generating circuit included in the DMA start/stop circuit;

FIGS. 34A and 34B are timing charts showing an timing in effect when the general DMA operation is stopped;

FIGS. 35A, 35B and 35C are timing charts showing an H-DMA table processing V;

FIGS. 36A and 36B are timing charts showing an operation of an H-DMA data processing;

FIGS. 37A, 37B and 37C are timing charts showing an H-DMA table processing H;

FIGS. 38A and 38B are timing charts showing an operation at a timing of transition from general DMA to H-DMA;

FIGS. 39A, 39B and 39C are timing charts showing an operation at a timing of transition from H-DMA to general DMA;

DETAILED DESCRIPTION OF THE PREFERRED EMBODIMENTS

Figure 1:
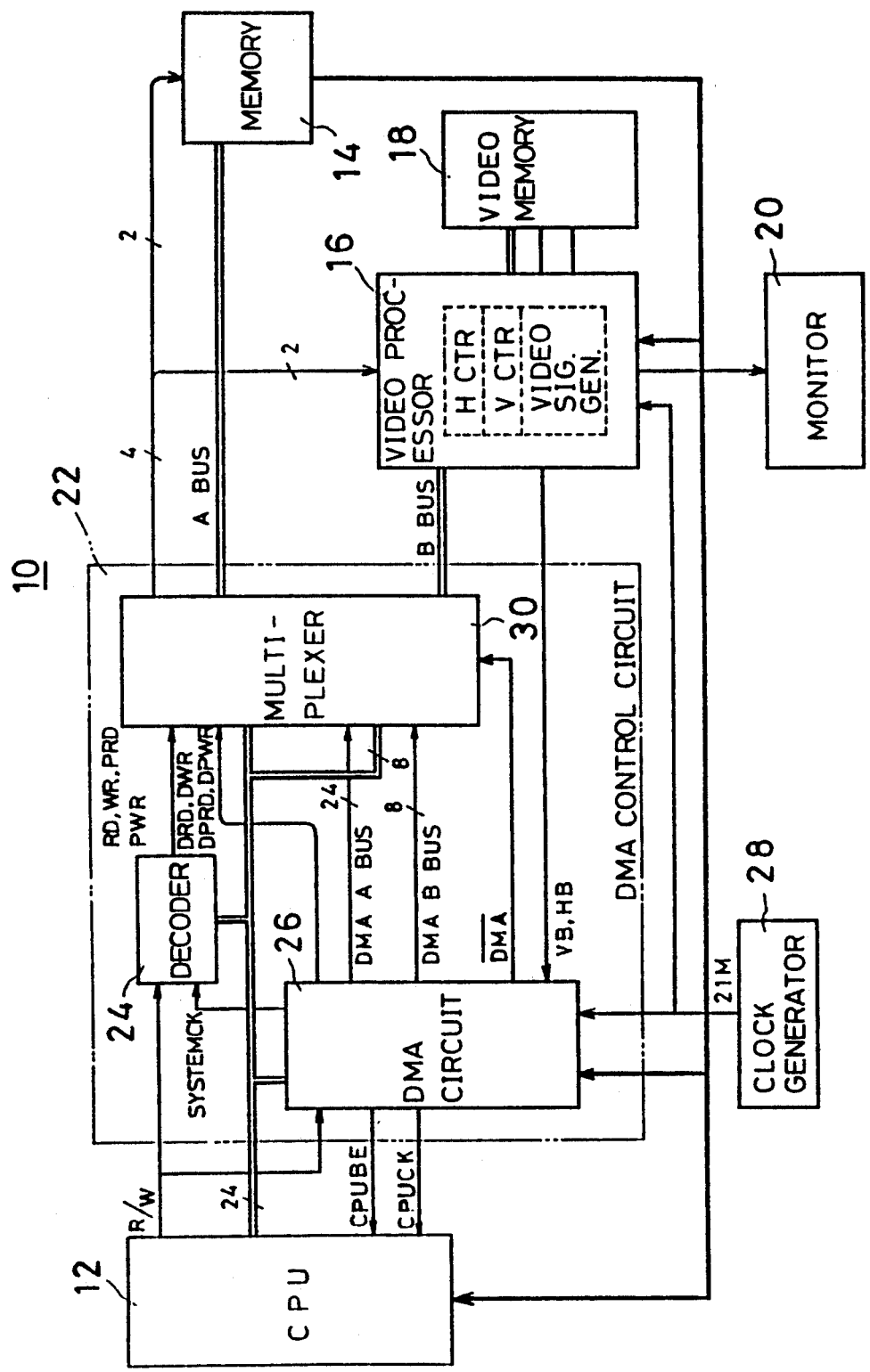
FIG. 1 is a block diagram showing an image processing device of one embodiment in accordance with the present invention.

Referring to FIG. 1, an image processing system 10 such as a TV game machine of this embodiment shown includes a CPU 12 which provides overall control on the components of the image processing device 10 including a video processor 16 in accordance with a program stored in a memory 14 in advance. For example, the CPU 12 may be a 16-bit microprocessor.

The video processor 16 reads graphic data from a video memory 18 according to the instructions from the microprocessor or CPU 12. The video processor 16 then sends the graphic data to a monitor 20 through a TV interface, not shown.

The memory 14 includes a working RAM and a program data storage contained in a detachable memory cartridge, not shown. The video memory 18 stores graphic data (dot data) about objects (i.e., characters graphically moved by operator or by player) and about background patterns (i.e., still images not moved by operator or by player). The video processor 16 contains an H counter, a V counter and a video signal generating circuit. The H counter forms one horizontal scanning period by counting the number of dots in a horizontal direction on the monitor 20, while the V counter forms one vertical scanning period by counting horizontal scanning lines on the monitor 20. The video signal generating circuit, controlled by the CPU 12 according to the program data, reads the dot data for necessary characters from the video memory 18.

A direct memory access (DMA) control circuit 22 is also provided. In this embodiment, DMA operations are carried out between the memory 14 and the video processor 16 under control of the DMA control circuit 22.

The DMA control circuit 22 includes a decoder 24. The decoder 24 supplies write and read signals to the memory 14 and video processor 16 in accordance with a signal R/W and an address signal on the address bus from the CPU 12, and a system clock signal SYSTEMCK from a DMA circuit 26, at a time when an operation other than the DMA is performed. As will be described later in detail, the DMA circuit 26 performs DMA data transfer between the memory 14 and the video processor 16 as per instructions from the CPU 12 and or a timing signal from the video processor 16. In this embodiment, the DMA circuit 26 generates a system clock signal SYSTEMCK for synchronizing the entire system as well as a CPU clock signal CPUCK illustratively on the basis of a basic clock signal of 21.47727 MHz from a clock generator 28.

A multiplexer 30 supplies the memory 14 and the video processor 16 with address data from the CPU 12 and with a control signal from the decoder 24 during a normal operation. During the DMA operation, the multiplexer 30 supplies the memory 14 and the video processor 16 with address data and a control signal from the DMA circuit 26. This embodiment uses a tristate buffer to switch between an A bus and the control signal. The multiplexer 30 is only used to switch to a B bus.

Figure 2:
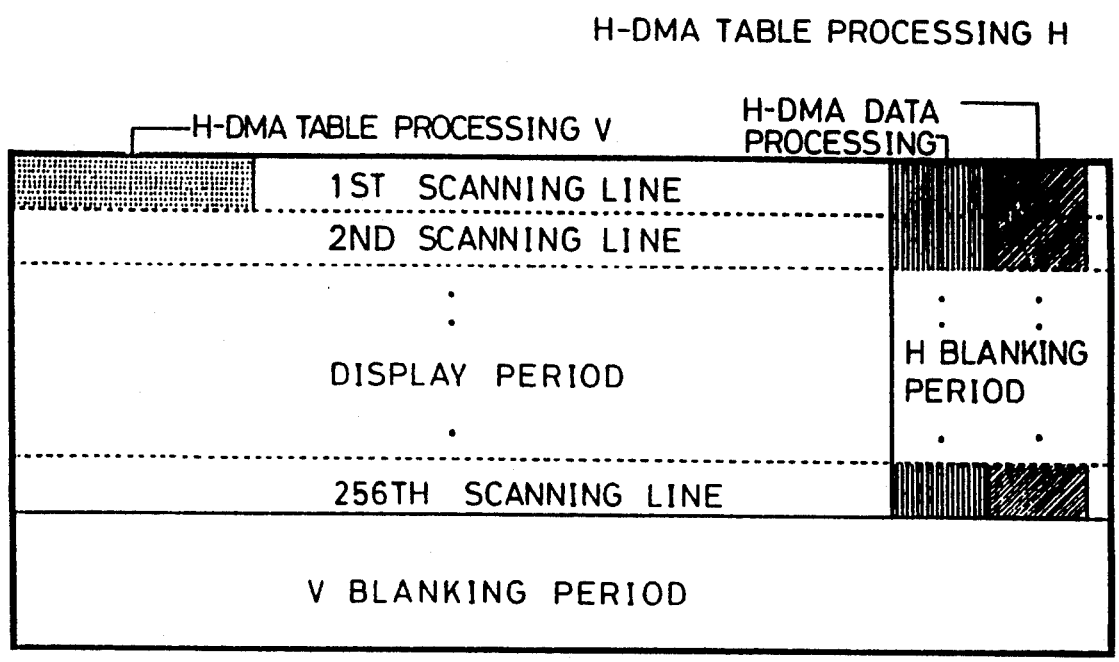
FIG. 2 is an illustrative view showing an execution timing of an H-DMA operation performed by this embodiment.
Figure 3:
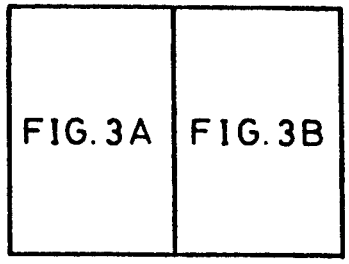
Figure 3A:
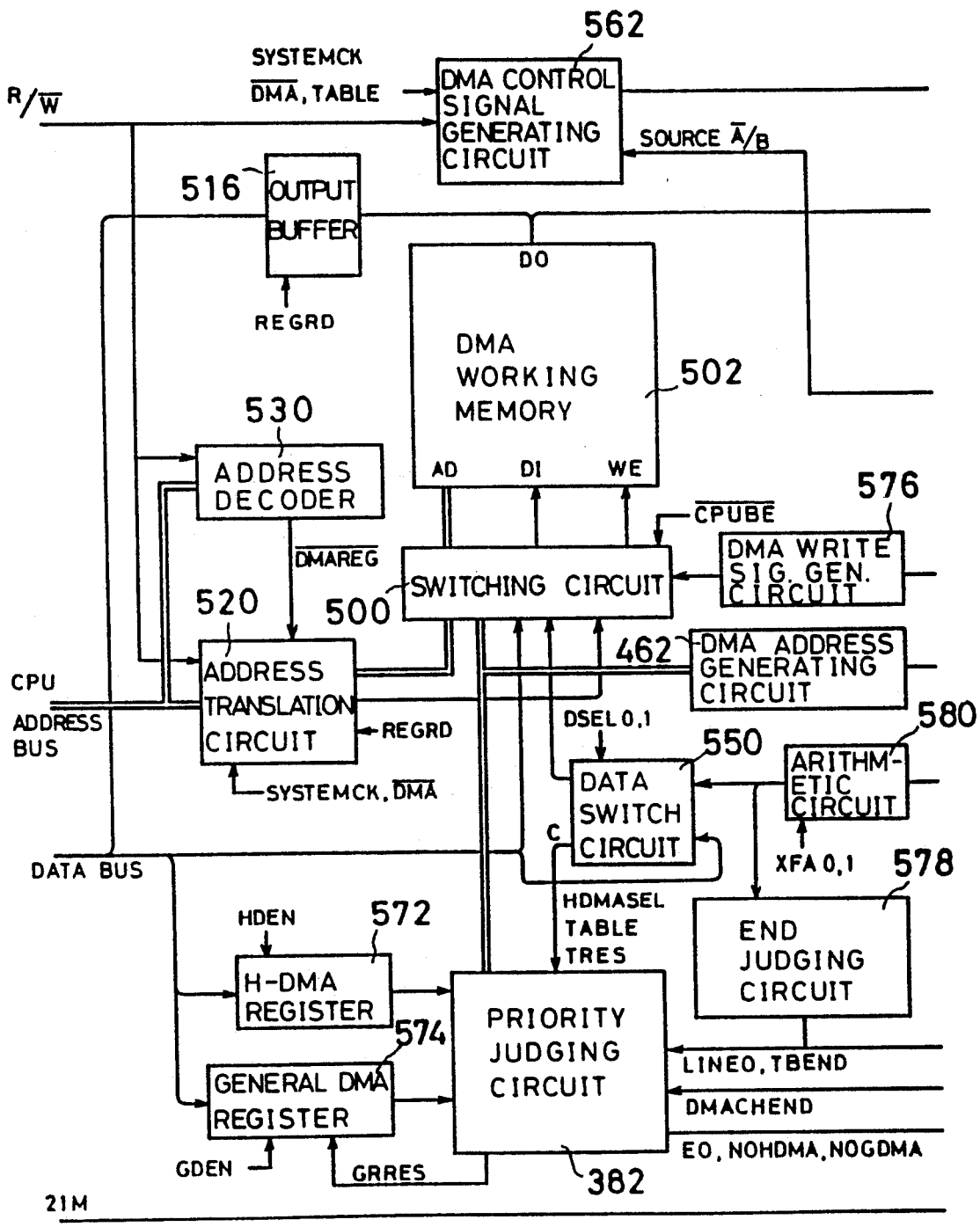
FIGS. 3A and 3B are joined.
Figure 29:
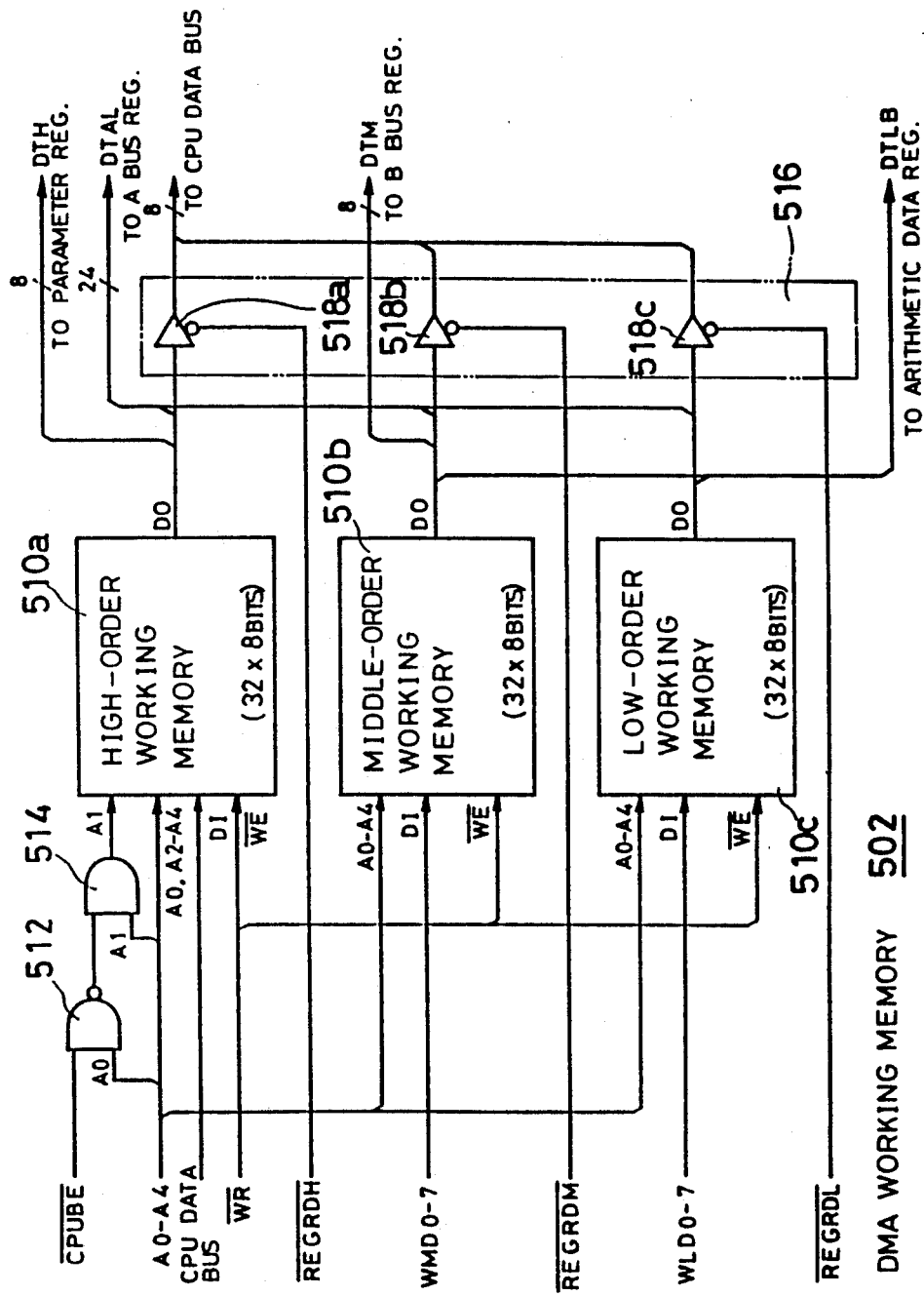
FIG. 29 is a block diagram showing a DMA working memory and output buffers indicated in FIG. 3A.

How the DMA control circuit 22 of FIG. 1 performs a DMA operation is outlined below with reference to FIG. 2. This embodiment is constructed to carry out selectively one of two kinds of DMA operation, a general DMA and an H-DMA. The general DMA operation involves starting data transfer in response to a command from the CPU 12, and the H-DMA operation concerns executing data transfer during each horizontal blanking period. For these kinds of DMA operation, up to eight channels (0-7) may be set concurrently. Either the general DMA or the H-DMA operation is performed selectively on each of the channels. The general DMA operation is carried out as needed in response to the commands from the CPU 12. As shown in FIG. 2, the H-DMA operation involves an H-DMA table processing V performed immediately after a start of a display period, an H-DMA data processing effected immediately after a start of horizontal blanking and an H-DMA table processing H executed immediately after the H-DMA data processing. In the H-DMA table processing V, the CPU 12 writes various parameters such as a direction of transfer, an addressing mode, a B buss mode, and etc. to a set parameter area in a DMA working memory 502 (FIG. 3A and FIG. 29; to be described later). The writing of the parameters is performed prior to the data transfer in the H-DMA data processing to be carried out immediately after entry into a horizontal blanking period. In the H-DMA table processing H, a line counting work area (to be described later) in the DMA working memory is decremented, and the processing is performed according to the decremented result.

Figure 3B:
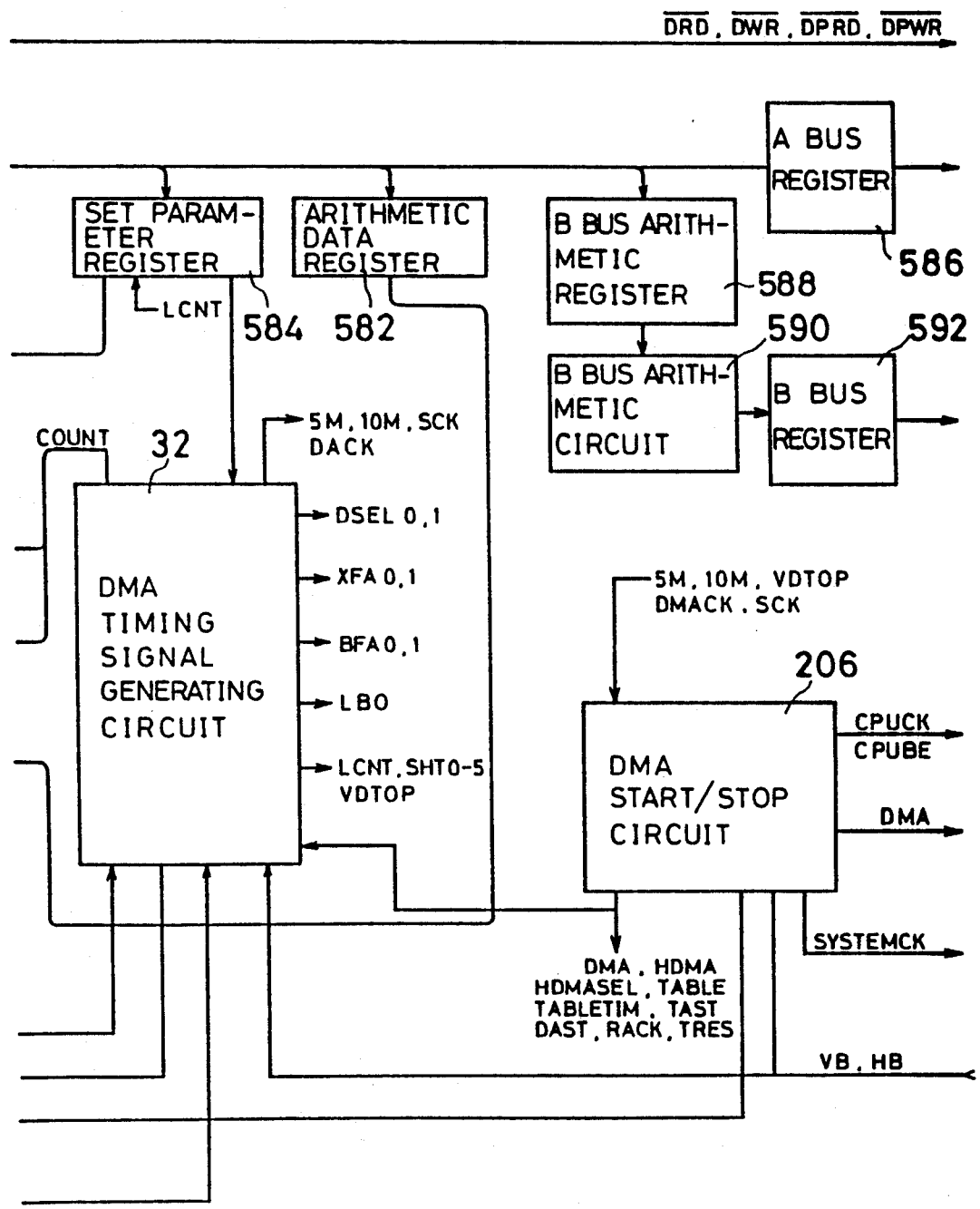
Figure 4:
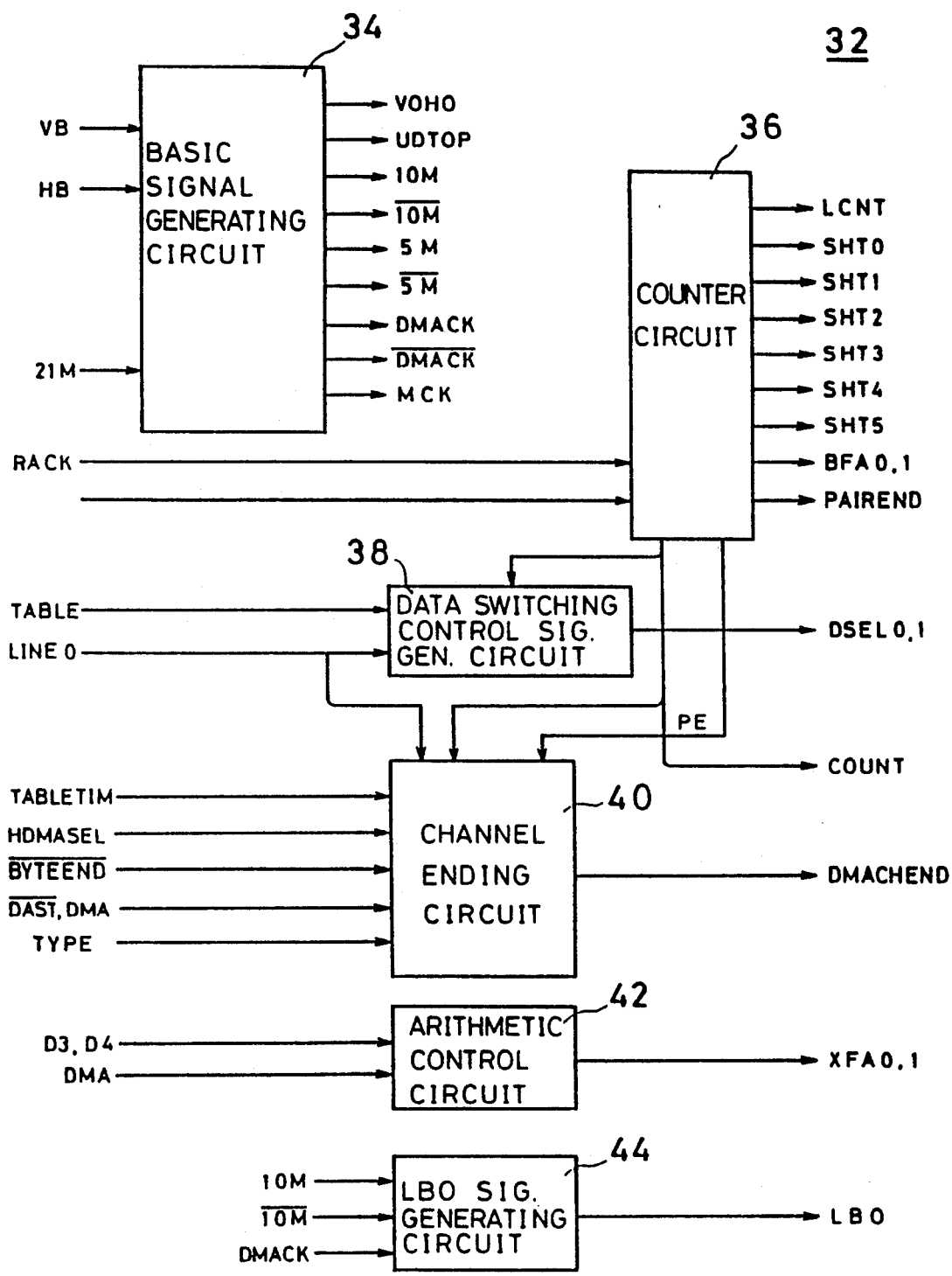
FIG. 4 is a schematic block diagram showing a DMA timing signal generating circuit shown in FIGS. 3A and 3B comprise.

Referring now to FIGS. 3A and 3B, the DMA circuit 26 shown in FIG. 1 is described below in detail. The DMA circuit 26 contains a DMA timing signal generating circuit 32. As illustrated in FIG. 4, the DMA timing signal generating circuit 32 comprises a basic signal generating circuit 34, a counter circuit 36, a data switching control signal generating circuit 38, a channel ending circuit 40, an arithmetic control circuit 42 and an LBO signal generating circuit 44. The basic signal generating circuit 34 generates basic timing signals VOHO, VDTOP, 10M, /10M, 5M, /5M, DMACK, /DMACK and MCK in accordance with a basic clock signal 21M from the clock generator 28 (FIG. 1) and with a horizontal blanking signal HB and a vertical blanking signal VB from the video processor 16. In this specification, a slash (/) prefixed to a signal name means inversion.

Figure 5:
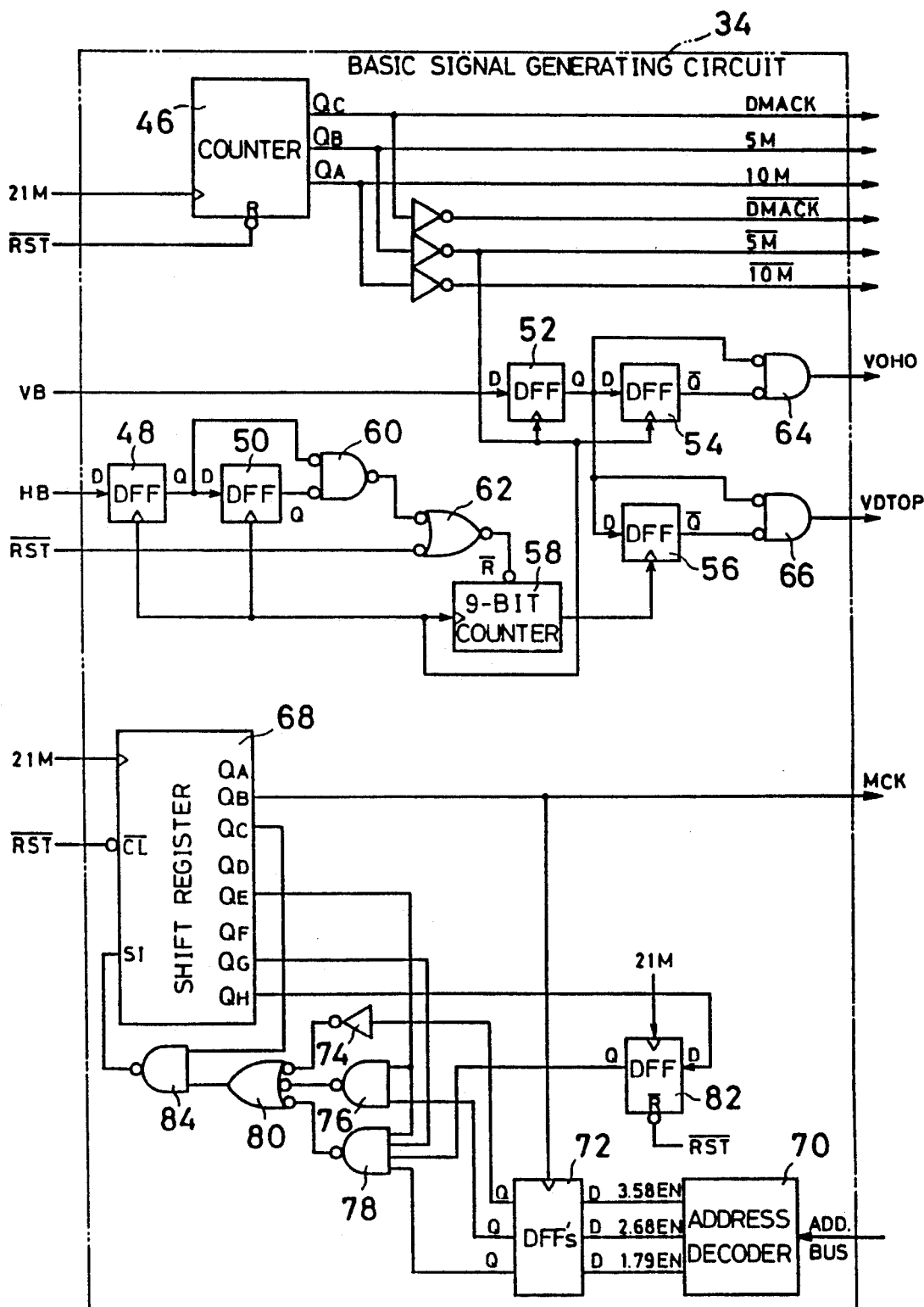
FIG. 5 is a block diagram showing a basic signal generating circuit contained in the DMA timing signal generating circuit.

As depicted in FIG. 5, the basic signal generating circuit 34 comprises a three-bit counter 46. The counter 46 admits as its count input the basic clock signal 21M, and as its reset signal a system reset signal /RST from the CPU 12. The counter 46 frequency-divides the basic clock signal 21M by two to output the signals 10M and /10M. The signal 10M is frequency-divided further by two, whereby the signals 5M and /5M are generated. One cycle of the signal 5M corresponds to a display period of one dot (pixel) on the monitor 20. The clock signal DMACK, which serves as the basic clock signal of the DMA operation, is obtained by further frequency-dividing the signal 5M by two. The signal /5M is fed as a clock input to D flip-flops (DFF's) 48, 50, 52, 54 and 56 as well as to a nine-bit counter 58. A D input of the DFF 48 is supplied with the horizontal blanking period HB, and a D input of the DFF 52 is supplied with the vertical blanking signal VB. An output Q of the DFF 48 is applied both to a D input of the DFF 50 and to one input of an OR gate 60. An output /Q of the DFF 50 is applied to the other input of the OR gate 60. Both an output of the OR gate 60 and the system reset signal RST are fed to an AND gate 62. An output of the AND gate 62 is supplied to a reset input /R of the nine-bit counter 58. A count-up output of the nine-bit counter 58 is sent to the DFF 56 as a clock signal of the latter. An output Q of the DFF 52 is applied as D inputs to both DFF's 54 and 56, respectively. The output Q of the DFF 52 is also applied to one of the two inputs of each of NOR gates 64 and 66. An output of the DFF 54 is fed to the other input of the NOR gate 64, while an output /Q of the DFF 56 is supplied to the other input of the NOR gate 66. The NOR gate 64 outputs the signal VOHO. The signal VOHO is brought High, as shown in FIG. 35A, during one cycle period of the signal /5M at the start of the above-described display period of FIG. 2. The NOR gate 66 outputs the signal VDTOP. The signal VDTOP is also brought High, as depicted in FIG. 35A, during the display period (i.e., scanning period) following the vertical blanking period of FIG. 2. The signal VDTOP going High means that the H-DMA table processing V of FIG. 2 is in effect.

The basic signal generating circuit 34 shown in FIG. 5 further comprises an eight-bit shift register 68. The shift register 68 admits the basic clock signal 21M as its shift clock signal. A clear terminal of the shift register 68 is supplied with the system reset signal /RST. An address decoder 70 is also provided to receive address data from the address bus. According to the address data given, the address decoder 70 outputs one of signals 3.58EN, 2.68EN and 1.79EN by which to set to one of three frequencies 3.58 MHz, 2.68 MHz and 1.79 MHz the clock signal MCK output by the shift register 68. The signals 3.58EN, 2.68EN and 1.79EN are supplied to respective D inputs of DFF's 72. Three outputs of the DFF's 72 are sent respectively through an inverter 74, a NAND gate 76 and a NAND gate 78 to a NAND gate 80. That is, the signal 3.58EN from the address decoder 70 is passed through the DFF's 72 and inverted by the inverter 74 before reaching one of inputs of the NAND gate 80. The output Q of the DFF's 72 which corresponds to the signal 2.68EN is fed to one of two inputs of the NAND gate 76. The other input of the NAND gate 76 is supplied with a bit output $Q_E$ from the shift register 68. The signal $Q_E$ is also applied to one of inputs of the NAND gate 8. The output Q of the DFF's 72 which corresponds to the signal 1.79EN is sent to another input of the NAND gate 78. The NAND gate 78 further receives a bit output $Q_G$ from the shift register 68 and an output Q from a DFF 82. Outputs of the NAND gates 76 and 78 are each inverted before being applied to the NAND gate 80. An output of the NAND gate 80, together with a bit output $Q_C$ of the shift register 68, is fed to a NAND gate 84. In turn, An output of the NAND gate 84 is supplied to an input SI of the shift register 68. The DFF 82 admits the basic clock signal 21M as its clock signal, a bit output $Q_H$ of the shift register 68 as its D input, and the system reset signal /RST as its reset input /R. By frequency-dividing the basic clock signal 21M, the shift register 68 outputs the clock signal MCK from its bit output $Q_B$. The clock signal MCK provides the basis for generating the system clock signal SYSTEMCK. It is to be noted that during a DMA operation, changes in the frequency of the signal MCK have no significance because the clock signal DMACK, to be described later, is used as the system clock signal.

Figure 6:
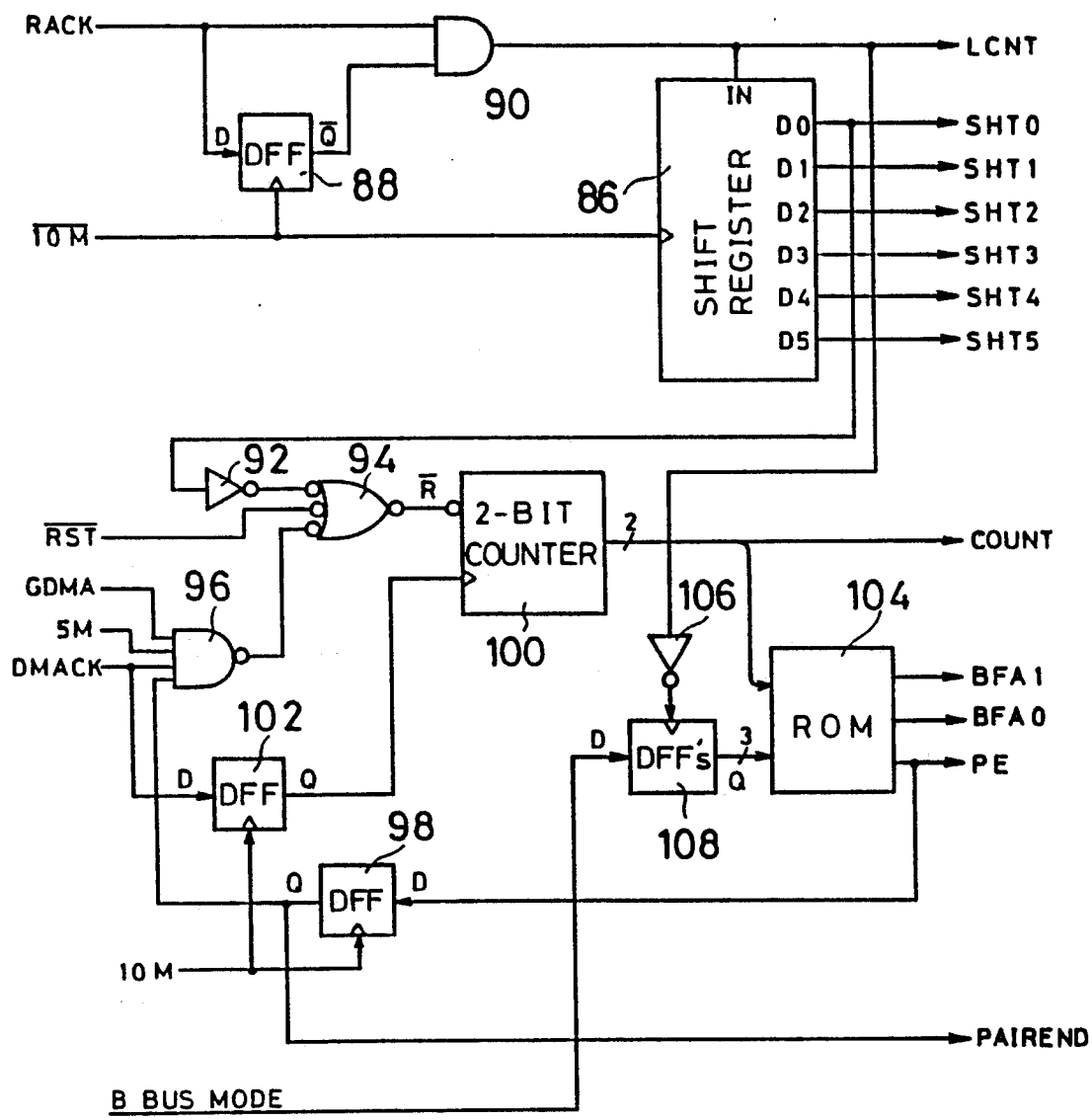
FIG. 6 is a block diagram showing a counter circuit included in the DMA timing signal generating circuit.

As shown in FIG. 6, the counter circuit 36 contains a six-bit shift register 86. The shift register 86 receives the signal /10M as its shift clock signal. A D input of a DFF 88 and one of the inputs of an AND gate 90 are supplied with a signal RACK. The signal RACK is generated by a DMA start/stop circuit 206, to be described later (FIG. 3 (B), FIGS. 13-18) in starting the DMA, in switching channels, or in transition from H-DMA data processing to H-DMA table processing H. The DFF 88 receives the signal /10M as its clock signal. An output /Q of the DFF 88 is applied to the other input of the AND gate 90. Thus, at a leading edge of the signal RACK, the AND gate 90 outputs a signal LCNT that is brought High during one cycle of the signal /10M. The signal LCNT serves as a pulse signal by which to detect leading edges of the signal RACK. The shift register 86 receives the signal LCNT as its input. After the signal LCNT is brought High, the shift register 86 consecutively outputs timing signals SHT0–SHT5 from its outputs D0–D5 during each cycle of the signal /10M. The timing signal SHT0 is obtained by delaying the signal LCNT by one cycle of the signal 10M. Likewise, the timing signal SHT5 is acquired by delaying the signal LCNT by six cycles of the signal 10M.

The signal SHT0 from the shift register 86 is inverted by an inverter 92 before being fed to one of three inputs of an AND gate 94. The other two inputs of the AND gate 94 are supplied with the system reset signal /RST and an output of a NAND gate 96. The NAND gate 96 is a four-input NAND gate receives a signal GDMA that goes High upon the general DMA operation triggered by the DMA start/stop circuit 206, to be described later (FIG. 3B) and indicates that the general DMA operation is in effect, the clock signal 5M and and a clock signal DMAC from the basic signal generating circuit 34 (FIG. 5), and an output Q of a DFF 98, i.e., a signal PAIREND. The signal PAIREND indicates that the H-DMA data processing has ended on one channel. An output of the NOR gate 94 is sent to the reset input /R of a two-bit counter 100. The two-bit counter 100 receives an output Q of a DFF 102 as its clock input. The signal 10M is applied as a clock input to both the DFF 98 and the DFF 102. A D input of the DFF 102 receives the signal DMACK. Thus, during H-DMA table processing or general DMA operation, the two-bit counter 100 is reset by the signal SHT0 from the shift register 86. The two-bit counter 100 outputs count data COUNT in the H-DMA processing. The count data COUNT is reset by the signal PAIREND from the DFF 98 and counted up every four cycles of the signal 10M.

The count data COUNT, i.e., the signal from the two-bit counter 100 is supplied to a ROM 104. Meanwhile, the above-noted signal LCNT is inverted by an inverter 106 before being applied to the clock input of a DFF 108. A D input of the DFF 108 receives B bus mode data (3-bit) from a set parameter register 584 (FIG. 3B), to be described later. In accordance with these inputs, the ROM 104 outputs signals BFA1, BFA0 and PE as listed in Table I below.

TABLE I

| B bus mode | COUNT | BFA1 | BFA0 | PE |
|---|---|---|---|---|
| 000 | 00 | 0 | 0 | 1 |
|  | 01 | — | — | — |
|  | 10 | — | — | — |
|  | 11 | — | — | — |
| 001 | 00 | 0 | 0 | 0 |
|  | 01 | 0 | 1 | 1 |
|  | 10 | — | — | — |
|  | 11 | — | — | — |
| 010 | 00 | 0 | 0 | 0 |
|  | 01 | 0 | 0 | 1 |
|  | 10 | — | — | — |
|  | 11 | — | — | — |
| 011 | 00 | 0 | 0 | 0 |
|  | 01 | 0 | 0 | 0 |
|  | 10 | 0 | 1 | 0 |
|  | 11 | 0 | 1 | 1 |
| 100 | 00 | 0 | 0 | 0 |
|  | 01 | 0 | 1 | 0 |
|  | 10 | 1 | 0 | 0 |
|  | 11 | 1 | 1 | 1 |

Figure 7:
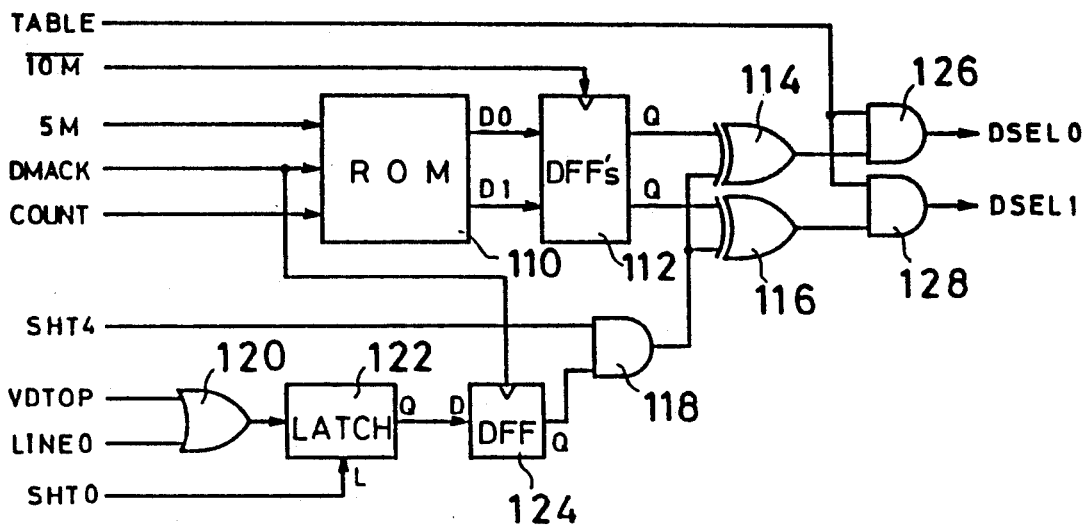
FIG. 7 is a block diagram showing a data switching control signal generating circuit included in the DMA timing signal generating circuit.

The data or signals BFA1 and BFA0 are fed, as an augend each for the B bus data, to a B bus arithmetic circuit 590 (FIG. 3B). The signal PE is applied to a D input of the DFF 98. Thus, during a general DMA operation, the signal PE is used to reset the two-bit counter 100. During the H-DMA data processing period, the signal PE provides the basis for generating a channel end signal DMACHEND. The above-described signal PAIREND generated with the signal PE is supplied to the DMA start/stop circuit 206, to be described later, as the timing signal by which to start the H-DMA process while the general DMA is performed. The data switching control signal generating circuit 38 shown in FIG. 7 contains a ROM 110. The ROM 110 receives four bits of data, i.e., the clock signals 5M and DMACK as well as the count data COUNT from the counter circuit 36 (FIG. 6). The ROM 110 outputs signals D0 and D1 as indicated in Table II below.

TABLE II

| COUNT | DMACK | 5M | D1 | D0 |
|---|---|---|---|---|
|    | 1 | 1 | 0 | 0 |
| 00 | 0 | 0 | 0 | 0 |
|    | 0 | 1 | 0 | 1 |
|    | 1 | 0 | 0 | 1 |
|    | 1 | 1 | 0 | 0 |
| 01 | 0 | 0 | 0 | 0 |
|    | 0 | 1 | 1 | 1 |
|    | 1 | 0 | 1 | 1 |
|    | 1 | 1 | 0 | 0 |
| 10 | 0 | 0 | 0 | 0 |
|    | 0 | 1 | 1 | 1 |
|    | 1 | 0 | 1 | 1 |

The outputs D0 and D1 from the ROM 110 are fed to a D inputs of DFF's 112. Each of the DFF's 112 receives the signal /10M as its clock signal. One of the two outputs Q of the DFF's 112 is fed to one input of an exclusive-OR gate 114 and the other output Q of the DFF's 112 is given to one input of an exclusive-OR gate 116. The other inputs of the exclusive-OR gates 114 and 116 are supplied with the output of an AND gate 118. The signal VDTOP and a signal LINE0 are given to a latch 122. The signal LINE0 is outputted when the result of operations by an arithmetic circuit 580 (FIG. 3A), to be described later, becomes zero, i.e., when the number of lines in the work area reaches zero during the H-DMA process. The latch 122 receives as its latch signal the signal SHT0 from the counter circuit 36 (FIG. 6). An output of the latch 122 is applied to a D input of the DFF 124. The DFF 124 receives the signal DMACK as its clock signal. An output Q of the DFF 124, together with the signal SHT4 from the counter circuit 36, is applied to an input of the above-described AND gate 118. An output of the exclusive-OR gate 114 and an output of the exclusive-OR gate 116 are fed, respectively, to one input of an AND gate 126 and one input of an AND gate 128. The other inputs of the AND gates 126 and 128 are commonly supplied with a signal TABLE from the DMA start/stop circuit 206, to be described later. The signal TABLE is brought High during H-DMA table processing V and during H-DMA table processing H. In this manner, the AND gates 126 and 128 output signals DSEL0 and DSEL1. The signals DSEL0 and DSEL1 both become "0" during the general DMA operation and during the H-DMA data processing period. During the H-DMA data processing period, the signals DSEL0 and DSEL1 vary with the output of the ROM 110. If the number of lines counted by the arithmetic circuit 580, to be described later, becomes zero during H-DMA table processing V or during H-DMA table processing H, the exclusive-OR gates 114 and 116 trigger inversion of the output from the ROM 110, i.e., from the DFF 112. That is, the signals DSEL1 and DSEL0 are changed from "0, 1" to "1, 0". This is equivalent to supplying the DMA working memory 502 (FIG. 3A), to be described later, with the line count data from the memory 14 (FIG. 1) using the same timing as the process of supplying the "line count minus 1" to the DMA working memory 502.

Figure 8:
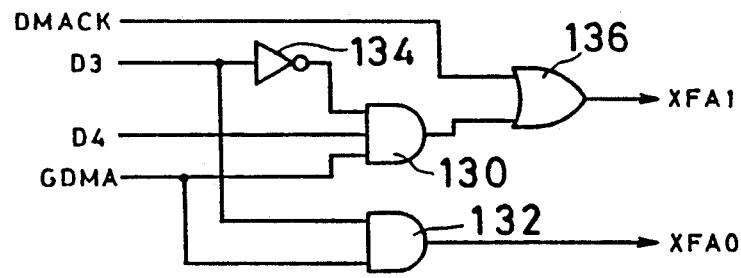
FIG. 8 is a block diagram showing an arithmetic control circuit incorporated in the DMA timing signal generating circuit.
Figure 9:
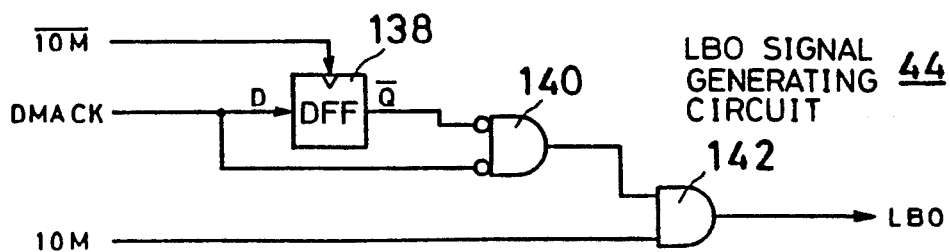
FIG. 9 is a block diagram showing an LBO signal generating circuit accommodated in the DMA timing signal generating circuit.

The arithmetic control circuit 42 depicted in FIG. 8 comprises AND gates 130 and 132, an inverter 134 and an OR gate 136. In accordance with A bus increment designation data D3 and D4 from the set parameter register 584 (FIG. 3B), to be described later, the arithmetic control circuit 42y generates signals XFA1 and XFA0. The signals XFA1 and XFA0 are used to designate an arithmetic procedure "+1", "+0" or "−1" for the arithmetic circuit 580 (FIG. 3A).

Figure 12:
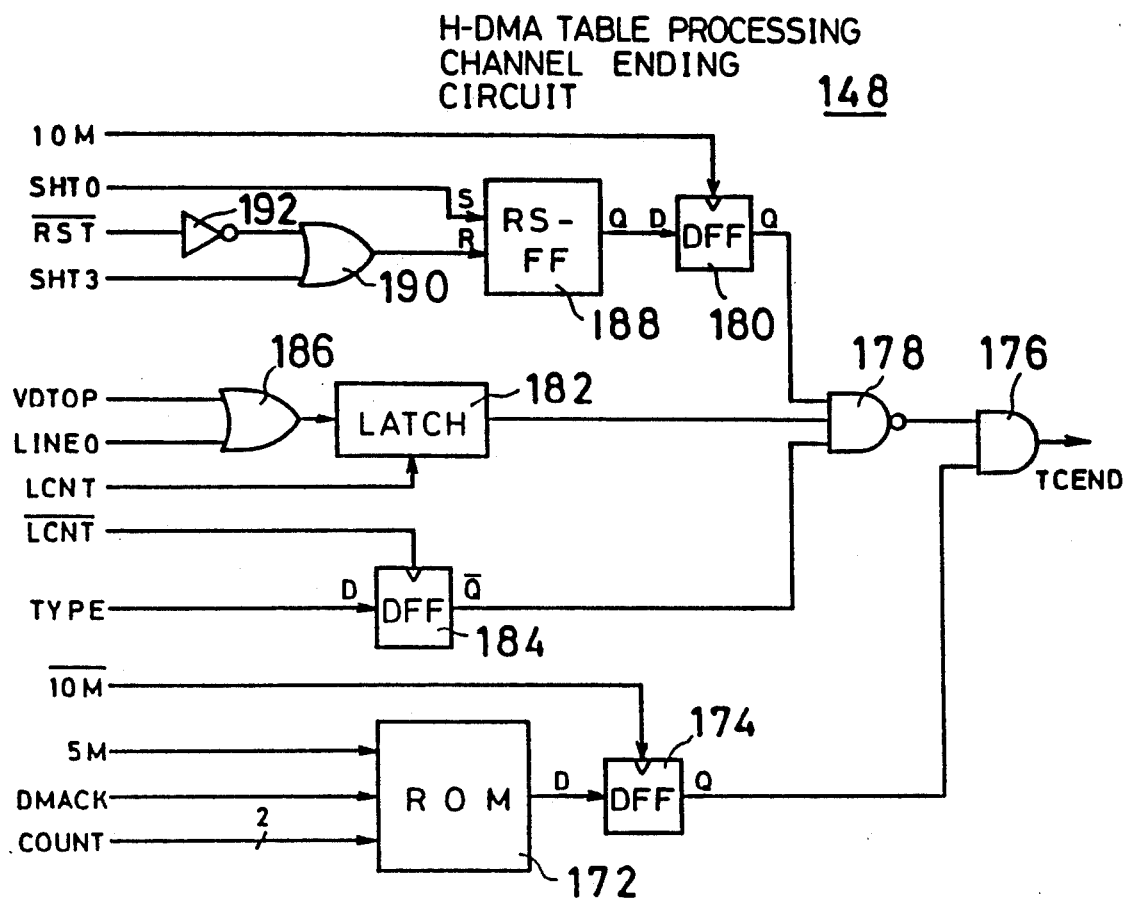
FIG. 12 is a block diagram showing an H-DMA table processing channel ending circuit contained in the channel ending circuit.

The LBO signal generating circuit 44 shown in FIG. 12 contains a DFF 138, a NOR gate 140 and an AND gates 142. The LBO signal generating circuit 44 generates a signal LBO on the basis of the clock signals 10M and DMACK. The signal LBO is given as a latch signal or a load signal to an A bus register 586 and a B bus register 592 (both in FIG. 3B), to be described later.

The channel ending circuit 40, whose details are shown in FIG. 10, comprises a general DMA channel ending circuit 144, an H-DMA data processing channel ending circuit 146 and an H-DMA table processing channel ending circuit 148. One of signals GCEND, DCEND and TCEND generated by these circuits is selected by a data selector 150. The selected signal is outputted as the signal DMACHEND indicating the end of each channel.

Figure 11:
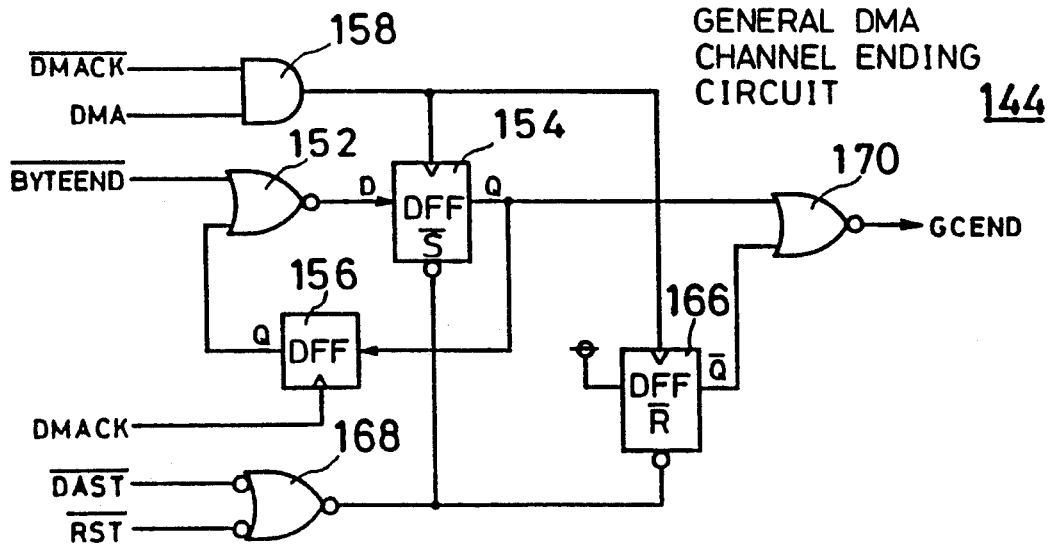
FIG. 11 is a block diagram showing a general DMA channel ending circuit included in the channel ending circuit.

As depicted in FIG. 11, the general DMA channel ending circuit 144 includes a NOR gate 152 that receives through one of its inputs a signal /BYTEEND from an end judging circuit 578 (FIG. 3A), to be described later. The signal /BYTEEND is outputted when the result of operations by the arithmetic circuit 580 becomes zero, i.e., when the number of continuously transmitted data during the general DMA operation becomes zero. An output of the NOR gate 152 is fed to a D input of a DFF 154. In turn, an output of the DFF 154 is supplied through a DFF 156 to the other input of the NOR gate 152. The DFF 154 receives as its clock signal an output of an AND gate 158. The AND gate 158 in turn receives the clock signal /DMACK and the signal DMA. An output of the AND gate 158 is fed as a clock signal to a DFF 160. The DFF 156 receives the signal DMACK as its clock signal. The output of an AND gate 168 is applied to a set input /S of the DFF 154 and to a reset input /R of a DFF 166. Two inputs of the AND gate 168 are supplied with a pulse signal /DAST and with the system reset signal /RST. The pulse signal DAST is outputted by the DMA start/stop circuit 206 and is brought Low at the start of a DMA operation. An output /Q of the DFF 166, together with an output Q of the DFF 154, is fed to a NOR gate 170. In turn, the NOR gate 170 outputs a channel end signal GCEND for the general DMA operation in response to the signal BYTEEND.

The H-DMA data processing channel ending circuit 146 contains an AND gate, not shown, which receives the clock signal /DMACK and the signal PE from the counter circuit 36 of the DMA timing signal generating circuit 32, and outputs a channel end signal DCEND for H-DMA data processing in response to the signal PE. The H-DMA table processing channel ending circuit illustrated in FIG. 12 comprises a ROM 172 that receives the clock signals 5M and DMACK as well as the count data COUNT from the counter circuit 36. The ROM effects its output, i.e., supplies a D input of a DFF 174 therewith in accordance with Table III below.

TABLE III

| COUNT | DMACK | 5M | D |
|---|---|---|---|
|  | 1 | 1 | 1 |
| 00 | 0 | 0 | 1 |
|  | 0 | 1 | 0 |
|  | 1 | 0 | 0 |
|  | 1 | 1 | 0 |
| 01 | 0 | 0 | 0 |
|  | 0 | 1 | 0 |
|  | 1 | 0 | 0 |
|  | 1 | 1 | 1 |
| 10 | 0 | 0 | 1 |
|  | 0 | 1 | 0 |
|  | 1 | 0 | 0 |

The DFF 174 receives the signal /10M as its clock signal. An output Q of the DFF 174 is sent to one of the inputs of an AND gate 176. The other input of the AND gate 176 is supplied with an output of a NAND gate 178. Three inputs of the NAND gate 178 receive an output Q of a DFF 180, an output of a latch 182 and an output /Q of a DFF 184. A D input of the DFF 184 is fed with a signal TYPE which is outputted by the set parameter register 584 (FIG. 3B) and which indicates a direct addressing mode when set to "0" and an indirect addressing mode when set to "1". The DFF 184 receives as its clock signal the signal /LCNT from the counter 36. The latch 182 admits the signal VDTOP from the basic signal generating circuit 34 or the signal LINE0 from the arithmetic circuit 580 (FIG. 3A) through an OR gate 186. As its latch signal, the latch 182 receives the signal LCNT from the counter circuit 36. A D input of the DFF 180 receives an output Q of an RS-FF 188, and an S input of the RS-FF 188 is supplied with the signal SHT0 from the counter circuit 36, and an R input of the RS-FF 188 admits an output of an OR gate 190. One of the two inputs of the OR gate 190 admits the signal SHT3 from the counter 36 and the other input of the OR gate 190 is supplied with the system reset signal /RST after inversion by an inverter 192. The DFF 180 receives as its clock signal the signal 10M from the basic signal generating circuit 34. In this manner, the AND gate 176 of the H-DMA table processing channel ending circuit 148 outputs a channel end signal TCEND for H-DMA table processing. That is, when that signal TYPE is "0" which comes from the set parameter register 584 and which indicates the type of addressing mode, the signal TCEND is outputted at the start of the data COUNT of "10" and, when the signal TYPE is "1", the signal TCEND is outputted at the start of the data COUNT of "00".

The signals GCEND, DCEND and TCEND output in the manner described are applied to the data selector 150. As its selection inputs, the data selector 150 receives two outputs Q from DFF's 194, as shown in FIG. 10. Two D inputs of the DFF's 194 admit outputs of AND gates 196 and 198. One input of the AND gate 196 receives a signal TABLETIM (providing the basis for generating the signal TABLE) which comes from the DMA start/stop signal 206 and which is inverted by an inverter 200. The other input of the AND gate 196 admits an output of an AND gate 202. Two inputs of the AND gate 198 are supplied with the signal TA-BLETIM and with the output of the AND gate 202. The AND gate 202 is fed with a signal HDMASEL (providing the basis for generating a signal HDMA) from the DMA start/stop circuit 206 and with an output Q of a DFF 204 which also admits the signal HDMASEL. As with the DFF's 194, the DFF 204 receives the clock signal 5M from the basic signal generating circuit 34. Two outputs Q of the DFF's 194 are both "0" during the general DMA operation. In this state, the data selector 150 outputs as the channel end signal DMACHEND the signal GCEND from the general DMA channel ending circuit 144. During the H-DMA data processing period, the inputs S1 and S0 of the data selector 150 are "1, 0". Thus the data selector 150 outputs as the channel end signal DMACHEND the signal DCEND from the H-DMA data processing channel ending circuit 146 during the H-DMA data processing period. During the H-DMA table processing period, the inputs of the data selector 150, i.e., the two outputs Q of the DFF's 194, are both "1". Thus, the data selector 150 outputs as the channel end signal DMACHEND the signal TCEND from the H-DMA table processing channel ending circuit 148 during the H-DMA table processing period.

Referring now to FIGS. 13 through 18, the DMA start/stop circuit 206 shown in FIGS. 3B will be described below. As illustrated in FIG. 13, the DMA start/stop circuit 206 comprises an H-DMA start/stop circuit 208, a general DMA start/stop circuit 210, a system control signal generating circuit 212 and a start signal generating circuit 214.

Figure 14:
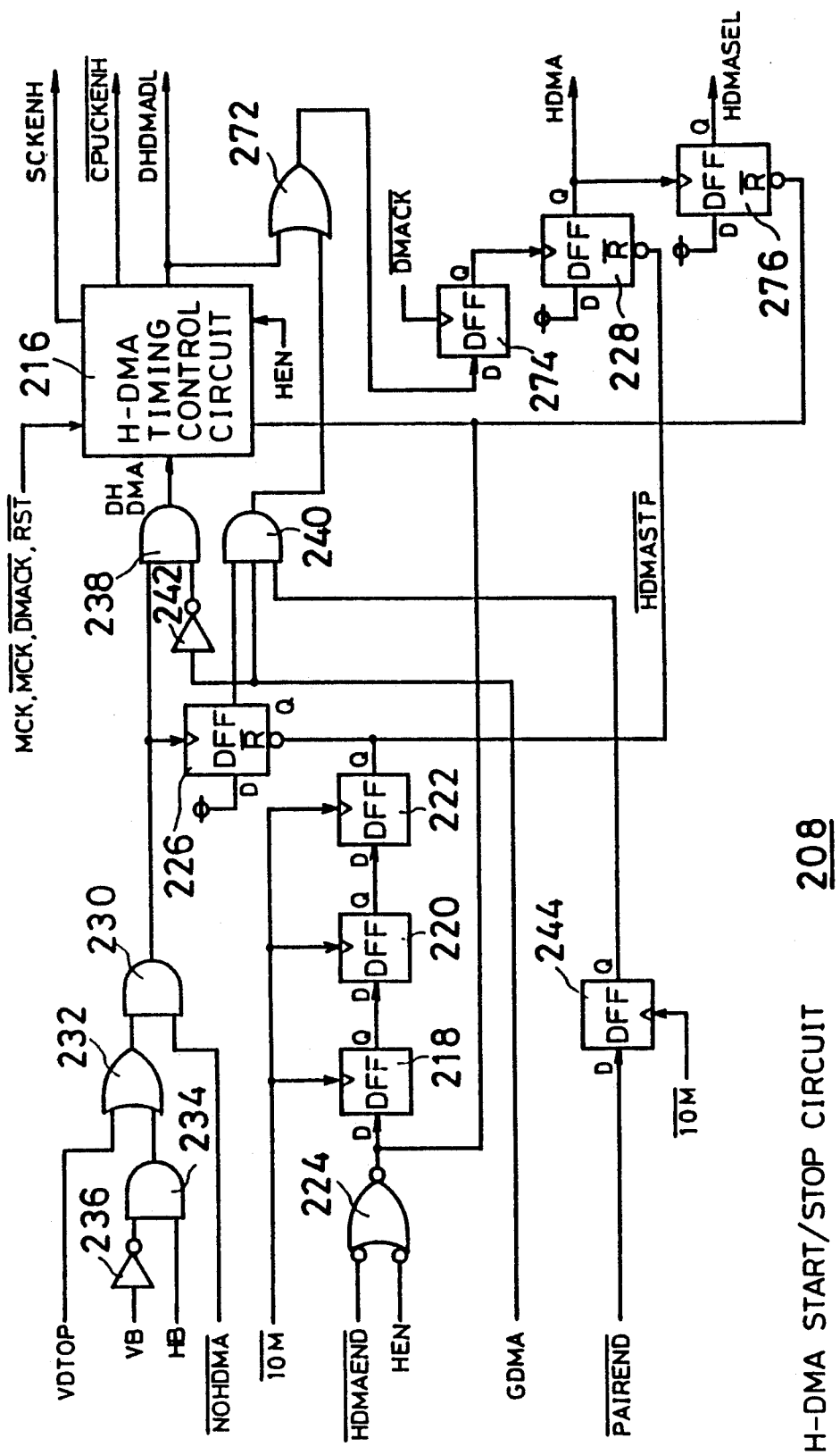
FIG. 14 is a block diagram showing an H-DMA start/stop circuit accommodated in the DMA start/stop circuit.
Figure 15:
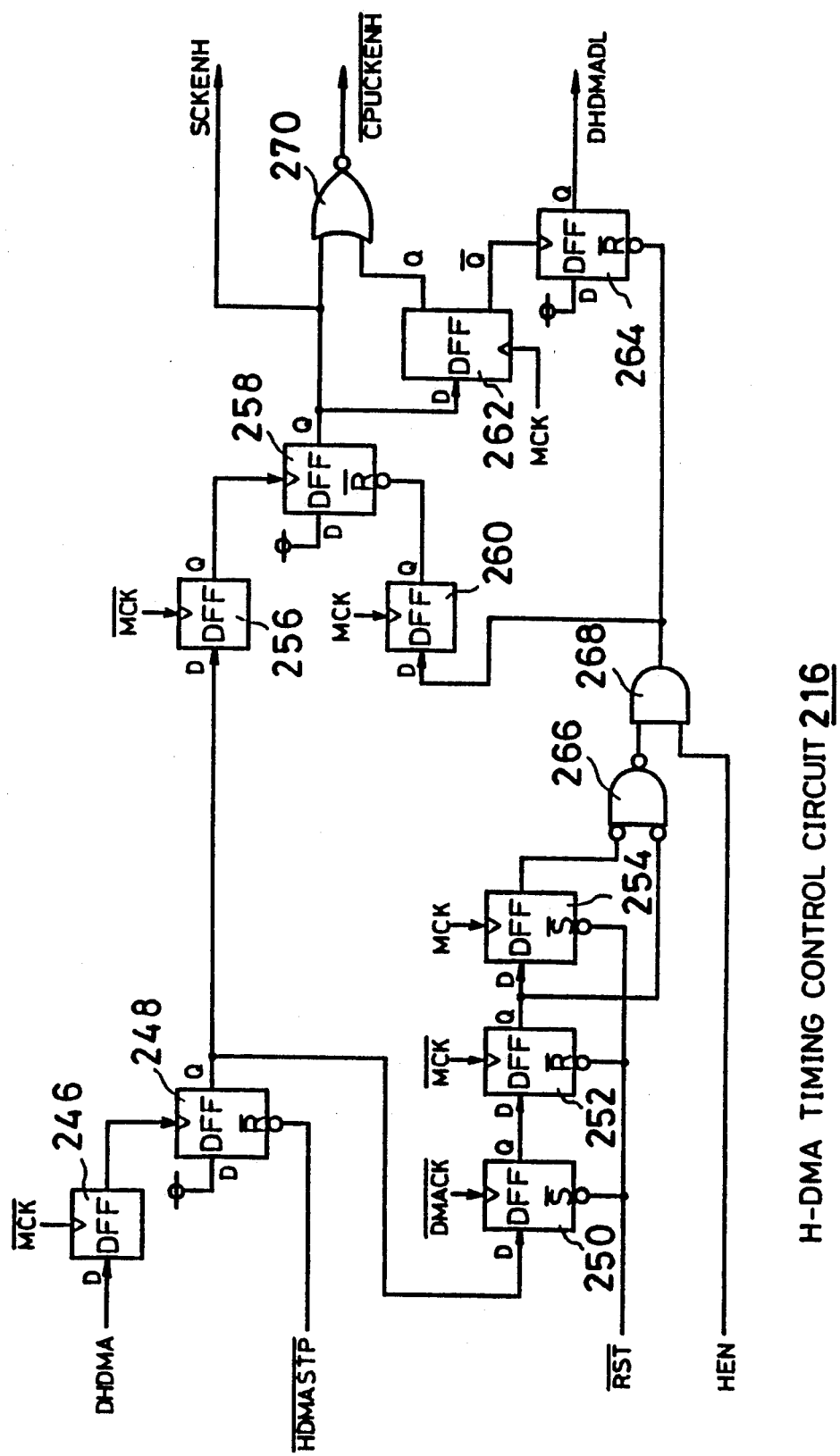
FIG. 15 is a block diagram showing an H-DMA timing control circuit incorporated in the H-DMA start/stop circuit.

The H-DMA start/stop circuit 208 includes an H-DMA timing control circuit 216 (whose details are given in FIG. 15), as depicted in FIG. 14. The H-DMA start/stop circuit 208 of FIG. 14 contains DFF's 218, 220 and 222 connected in a cascade fashion. A D input of the DFF 218 admits an output of an AND gate 224. Two inputs of the AND gate 224 are supplied with a signal /HDMAEND indicating an end of H-DMA and with a signal HEN from a start enable circuit in a priority judging circuit 382 (FIG. 3A, FIGS. 19–24), to be described later. The DFF's 218, 220 and 222 receive the clock signal /10M from the basic signal generating circuit 34. An output Q of the DFF 222 is applied as a signal /HDMASTP to reset inputs /R of DFF's 226 and 228. A D input of the DFF 226 is set to "1" and the clock signal sent thereto is an output of an AND gate 230. One input of the AND gate 230 admits a signal NOHDMA from the start enable circuit to be described later and the other input of the AND gate 230 is supplied with the signal VDTOP from the basic signal generating circuit 34 and with an output of an OR gate 232 that receives an output of an AND gate 234. The AND gate 234 admits the blanking signals VB and HB from the video processor 16 (FIG. 1) while the blanking signal VB is inverted by an inverter 236. Thus in accordance with the horizontal blanking signal HB or the signal VDTOP, the AND gate 230 outputs a trigger signal for stating the H-DMA only when the signal NOHDMA that comes from the start enable circuit 392 (FIG. 24) in the priority judging circuit 382 is High. The signal GDMA from the general DMA start/stop circuit 210 is sent to one input of an AND gate 238 as well as to one input of an AND gate 240, the signal GDMA being inverted by an inverter 242 before reaching the AND gate 238. The other input of the AND gate 238 admits an output of the AND gate 230. Remaining two inputs of the AND gate 240 are fed with an output Q of the DFF 226 and with an output Q of the DFF 244. A D input of the DFF 244 receives the signal /PAIREND from the DMA timing signal generating circuit 32, and a clock signal applied to the DFF 244 is the signal /10M. The AND gate 238 outputs a signal DHDMA to the H-DMA timing control circuit 216 whose details are shown in FIG. 15.

The H-DMA timing control circuit 216 comprises DFF's 246, 248, 250, 252, 254, 256, 258, 260, 262 and 264, an OR gate 266, an AND gate 268 and a NOR gate 270. The H-DMA timing control circuit 216 receives the signal DHDMA from the AND gate 238 (FIG. 14), the signal /HDMASTP and the signal HEN, and outputs signals SCKENH, /CPUCKENH and DHDMADL.

The signal DHDMADL from the H-DMA timing control circuit 216 is supplied, together with an output of the AND gate 240 (FIG. 14), to an OR gate 272. An output of the OR gate 272 is applied to a D input of a DFF 274. An output Q of the DFF 274 is applied as a clock signal to the DFF 228. An output Q of the DFF 228 is outputted as a signal HDMA that is brought High during the H-DMA operation. The signal HDMA is also applied as a clock signal to a DFF 276. The DFF 276 receives an output of the NOR gate 224 to its reset input /R. An output Q of the DFF 276 is provided as the signal HDMASEL.

Figure 16:
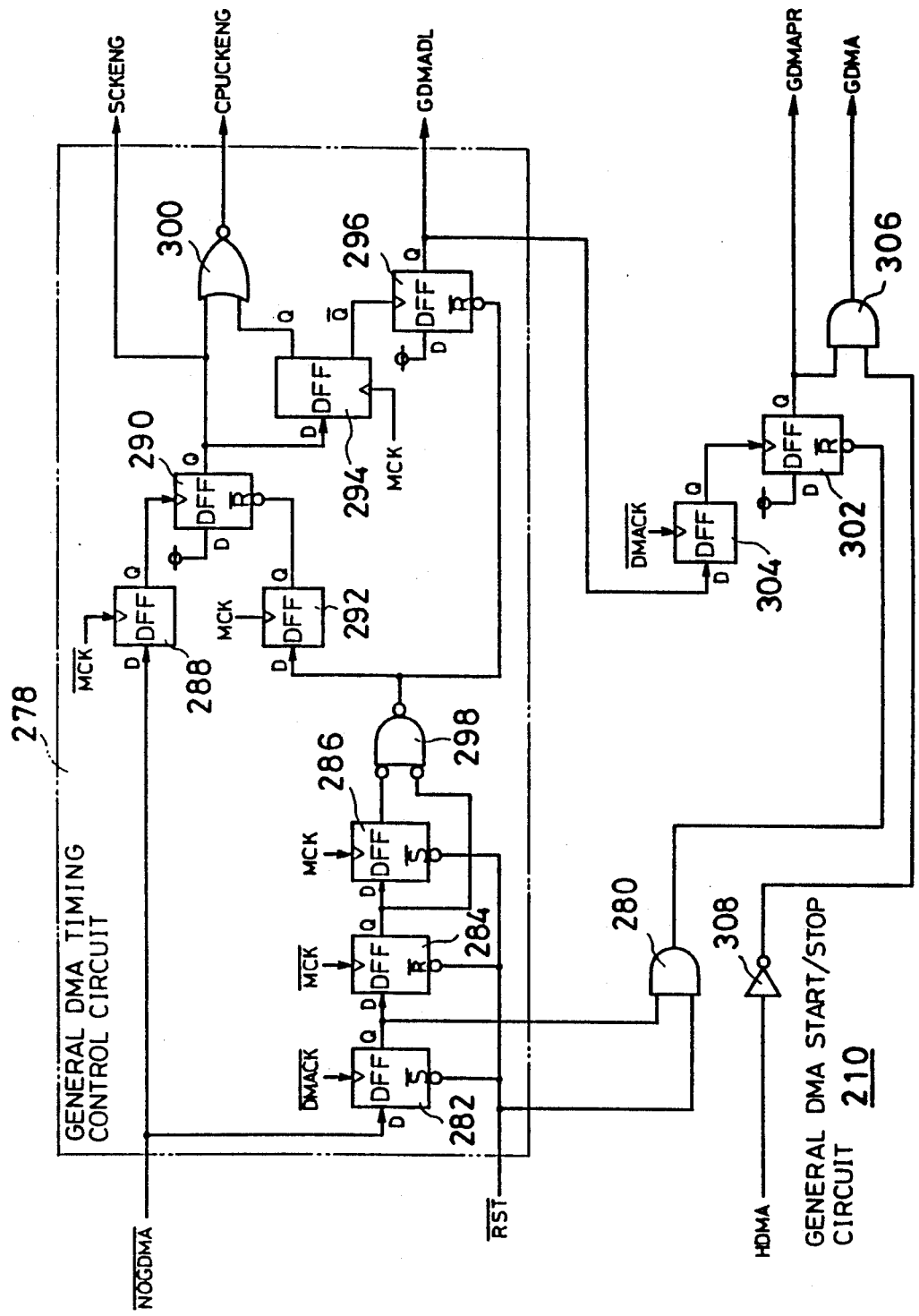
FIG. 16 is a block diagram showing a general DMA start/stop circuit and a general DMA timing control circuit comprised in the DMA start/stop circuit.

The general DMA start/stop circuit 210, whose details are depicted in FIG. 16, comprises an AND gate 280 that receives a signal from a general DMA timing control circuit 278. The general DMA timing control circuit 278 includes DFF's 282, 284, 286, 288, 290, 292, 294 and 296, an OR gate 298 and a NOR gate 300. The general DMA timing control circuit 278 receives a signal /NOGDMA from the start enable circuit 392 (FIG. 24) and the system reset signal /RST, and outputs signals SCKENG, CPUCKENG and GDMADL. An output Q of the DFF 282 is applied, together with the system reset signal /RST, to the AND gate 280. In turn, an output of the AND gate 280 is fed to a reset input /R of a DFF 302. The DFF 302 receives as its clock signal an output Q of a DFF 304. A D input of the DFF 304 is supplied with the signal GDMADL from the general DMA timing control circuit 278, i.e., an output Q of the DFF 296. An output Q of the DFF 302 is obtained as a signal GDMAPR and is applied to one of two inputs of an AND gate 306. The other input of the AND gate 306 is fed with an output of an inverter 308 that receives the signal HDMA from the H-DMA start/stop circuit 208 (FIG. 14). Thus the AND gate 306 outputs the signal GDMA that goes High during the general DMA operation.

The system control signal generating circuit 212, whose details are illustrated in FIG. 17, comprises an AND gate 310 that receives the clock signal MCK, the signal SCKENH from the H-DMA timing control circuit 216 and a signal SCKENG from a general DMA timing control circuit 278. An output of the AND gate 310 is applied to one of two inputs of an OR gate 312. The other input of the OR gate 312 is supplied with an output of an AND gate 314. The AND gate 314 receives the signal DMA which is brought High during the DMA operation period, the clock signal DMACK from the basic signal generating circuit 34, and an output Q of a DFF 316. A D input of the DFF 316 receives an output of a NOR gate 318. The clock signal /DMACK and the signal DMA are applied to an AND gate 320. In turn, an output of the AND gate 320 is supplied as a clock signal to DFF's 322 and 324. A D input of the DFF 322 receives an output of a NOR gate 326 that admits the signal /BYTEEND and an output of a DFF 328. An output Q of the DFF 322 is applied to one of two inputs of an AND gate 330 as well as to a D input of the DFF 328. The DFF 328 receives the clock signal DMACK. An output of an AND gate 332 that receives the signal /DAST and the system reset signal /RST is supplied to a set input /S of the DFF 322 as well as to a reset input /R of the DFF 324. The signal GDMA from the general DMA start/stop circuit 210 (FIG. 16) enters the other input of the AND gate 330. An output of the AND gate 330 is applied, together with an output Q of the DFF 324, to the NOR gate 318. The DFF 316 receives the signal 10M as its clock signal. Thus an output of the DFF 316 is applied as a /CKdrop to the AND gate 314. This causes the system clock signal SYSTEMCK to drop one clock cycle when the signal BYTEEND is brought Low immediately after the start of DMA or during the general DMA operation. In this manner, write and read signals in a DMA control signal generating circuit 562 (FIG. 3A and FIG. 32) are disabled during one clock cycle, respectively.

The system control signal generating circuit 212 further comprises an OR gate 334. The OR gate 334 receives the clock signal MCK, the /CPUCKENH from the H-DMA start/stop circuit 208 and the signal /CPUCKENG from the general DMA start/stop circuit 210. An output of the OR gate 334 is applied as the CPU clock signal CPUCK to the CPU 12 (FIG. 1). The system control signal generating circuit 212 also includes a NOR gate 336 whose two inputs admit the signals DHDMADL and GDMADL. An output of the NOR gate 336 is inverted by an inverter 338 before being applied to the CPU 12 as a CPU bus enable signal /CPUBE. When the signal /CPUBE remains Low, that means the CPU 12 is outputting address data.

Figure 18:
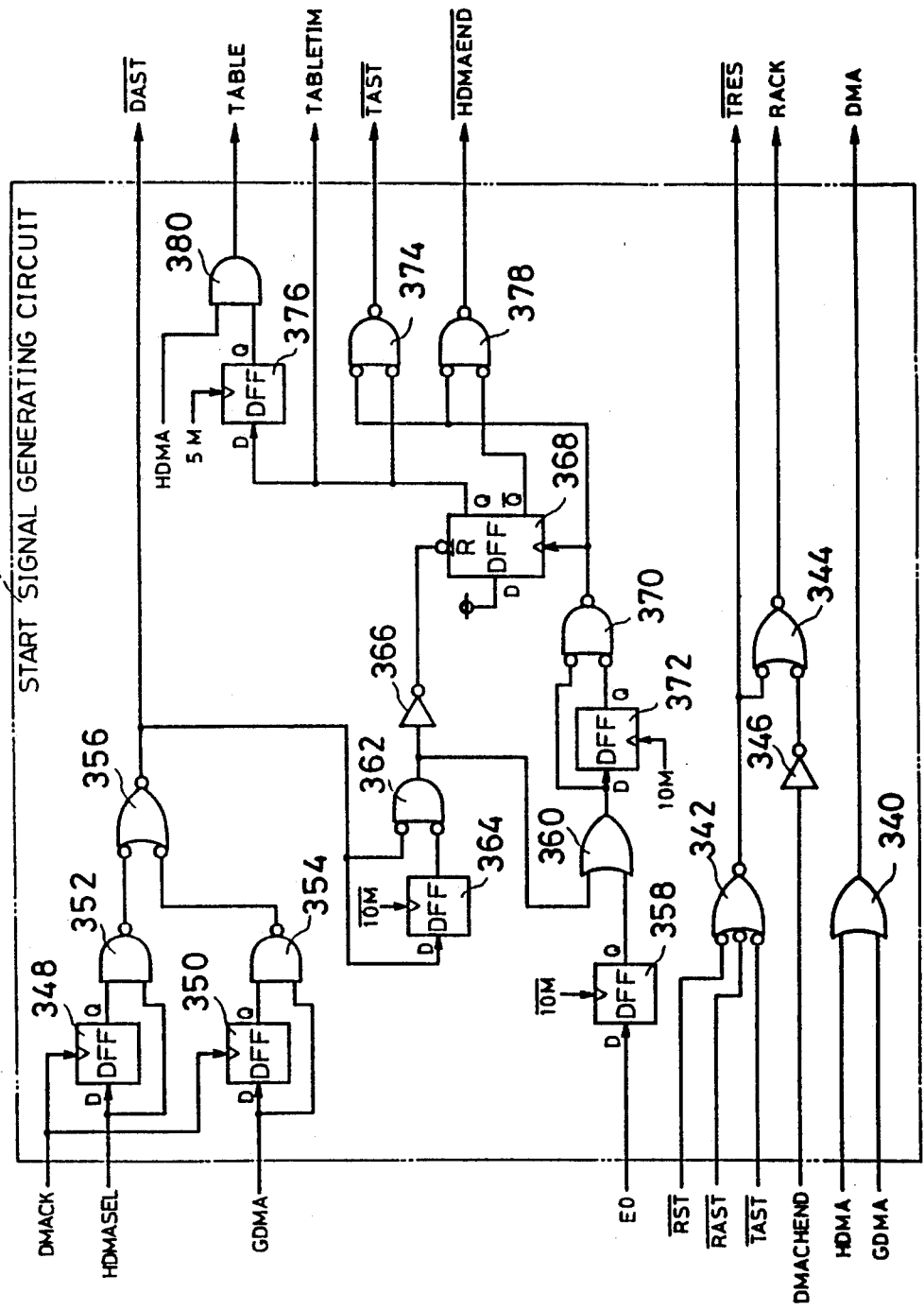
FIG. 18 is a block diagram showing a start signal generating circuit contained in the DMA start/stop circuit.

The start signal generating circuit 214, details of which are shown in FIG. 18, contains an OR gate 340 that receives the signal HDMA from the H-DMA start/stop circuit 208 and the signal GDMA from the general DMA start/stop circuit 210. An output of the OR gate 340 is the signal DMA that goes High during the DMA operation period. An output of a NOR gate 342 that receives the system reset signal /RST and signals /RAST and /TAST is outputted as a signal /TRES and is applied to one of two inputs of an AND gate 344. The other input of the AND gate 344 receives the channel end signal DMACHEND that has passed through an inverter 346. The AND gate 344 outputs the signal RACK described earlier.

The start signal generating circuit 214 additionally includes DFF's 348 and 350 whose inputs are fed with the signals HDMASEL and GDMA. The DFF's 348 and 350 commonly receive the clock signal DMACK. An output of the DFF 348 is supplied, together with the signal HDMASEL, to a NAND gate 352. An output Q of the DFF 350 is applied, together with the signal GDMA, to a NAND gate 354. An output of the NAND gate 352 and an output of the NAND gate 354 are both fed to an AND gate 356. In turn, an output of the AND gate 356 provides the above-mentioned signal /DAST.

A D input of a DFF 358 admits a signal EO that is brought Low at the end of the DMA operation. The DFF 358 receives the signal /10M as its clock signal. An output Q of the DFF 358 is supplied to one of two inputs of an OR gate 360. The other input of the OR gate 360 receives an output of a NOR gate 362 which in turn admits the signal /DAST and an output Q of a DFF 364. A D input of the DFF 364 is fed with the signal /DAST, and a clock signal applied to the DFF 364 is the signal /10M. An output of the NOR gate 362 is inverted by an inverter 366 before reaching a reset input /R of a DFF 368. A D input of the DFF 368 is "1", and the DFF 368 receives as its clock signal an output of an OR gate 370. The OR gate 370 is supplied both with an output of the OR gate 360 and with an output Q of a DFF 372. The DFF 372 receives the signal 10M as its clock signal, and a D input of the DFF 372 admits an output of the OR gate 360. An output Q of the DFF 368 is outputted as the signal TABLETIM, and is applied to one of two inputs of an OR gate 374 and to a D input of a DFF 376. An output /Q of the DFF 368 is fed to one of two inputs of an OR gate 378. The other inputs of the OR gates 374 and 378 are supplied with an output of the OR gate 370. The OR gate 374 provides the signal /TAST, and the OR gate 378 outputs the signal /HDMAEND. The DFF 376 receives the signal 5M as its clock signal. An output of the DFF 376 is applied, together with the signal HDMA, to an AND gate 380. In turn, the AND gate 380 provides the signal TABLE that is brought High during the H-DMA table processing period.

The signal /DAST is a pulse signal that goes Low at the start of the DMA operation, while the signal /TAST is a pulse signal that is brought Low when the H-DMA table processing period begins. The signal TABLETIM provides the basis for generating the signal TABLE. The signal /HDMAEND is brought Low at the end of the H-DMA processing period. The signal /RACK is outputted when a applied channel is activated. In response to the signal /RACK, setting a mode and initialization of the entire DMA circuit 26 are performed. The signals DMA, /DAST and /TRES are outputted at the start of the DMA operation, and the signals TABLE, TABLETIM and /TAST are outputted when H-DMA table processing is started.

Referring now to FIGS. 19 through 24, the priority judging circuit 382 (FIG. 3A) is described below. The priority judging circuit 382 comprises a status storing-/selecting circuit 384, a status storage control circuit 386, a priority circuit 388, an interrupting circuit 390 and the start enable circuit 392.

Figure 20:
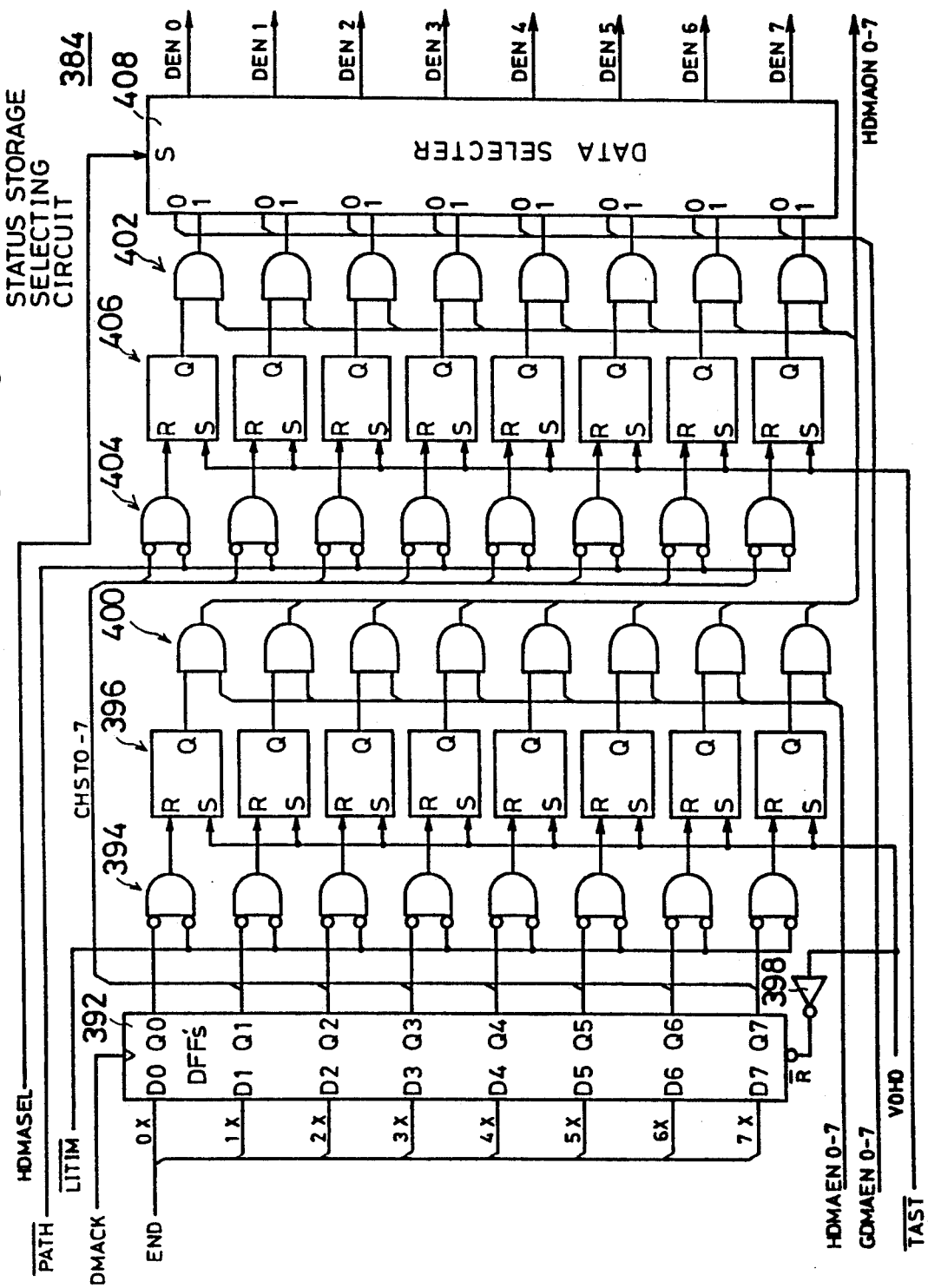
FIG. 20 is a block diagram showing a status storing/selecting circuit accommodated in the priority judging circuit.

Details of the status storing/selecting circuit 384 are depicted in FIG. 20. The status storing/selecting circuit 384 contains a DFF 392 that latches data END as per the clock signal DMACK. An output of the DFF 392 is supplied via a gate circuit 394 to an intra-frame operation enable register 396. The intra-frame operation enable register 396 comprises eight RS-FF's. A reset input R of each of the RS-FF's receives each bit output of the gate circuit 394 and a set input S of each RS-FF admits the signal VOHO. The signal VOHO is applied through an inverter 398 to a reset input /R of the DFF 392. The gate circuit 394 contains eight NOR gates. One of the two inputs of each AND gate in the gate circuit 394 receives one of outputs Q0-Q7 from the DFF 392, respectively. The other input of each AND gate in the circuit 394 admits a signal /LITIM. The signal /LITIM is outputted when the line count data loaded from the memory 14 is zero. Thus the intra-frame operation enable register 396 is reset with the signal /LITIM, thereby to disable a current channel until a next frame. The outputs of the intra-frame operation enable register 396 are supplied, through a gate circuit 400 comprising eight AND gates, to a gate circuit 402 and are also outputted as data HDMAEN0-7.

Figure 19:
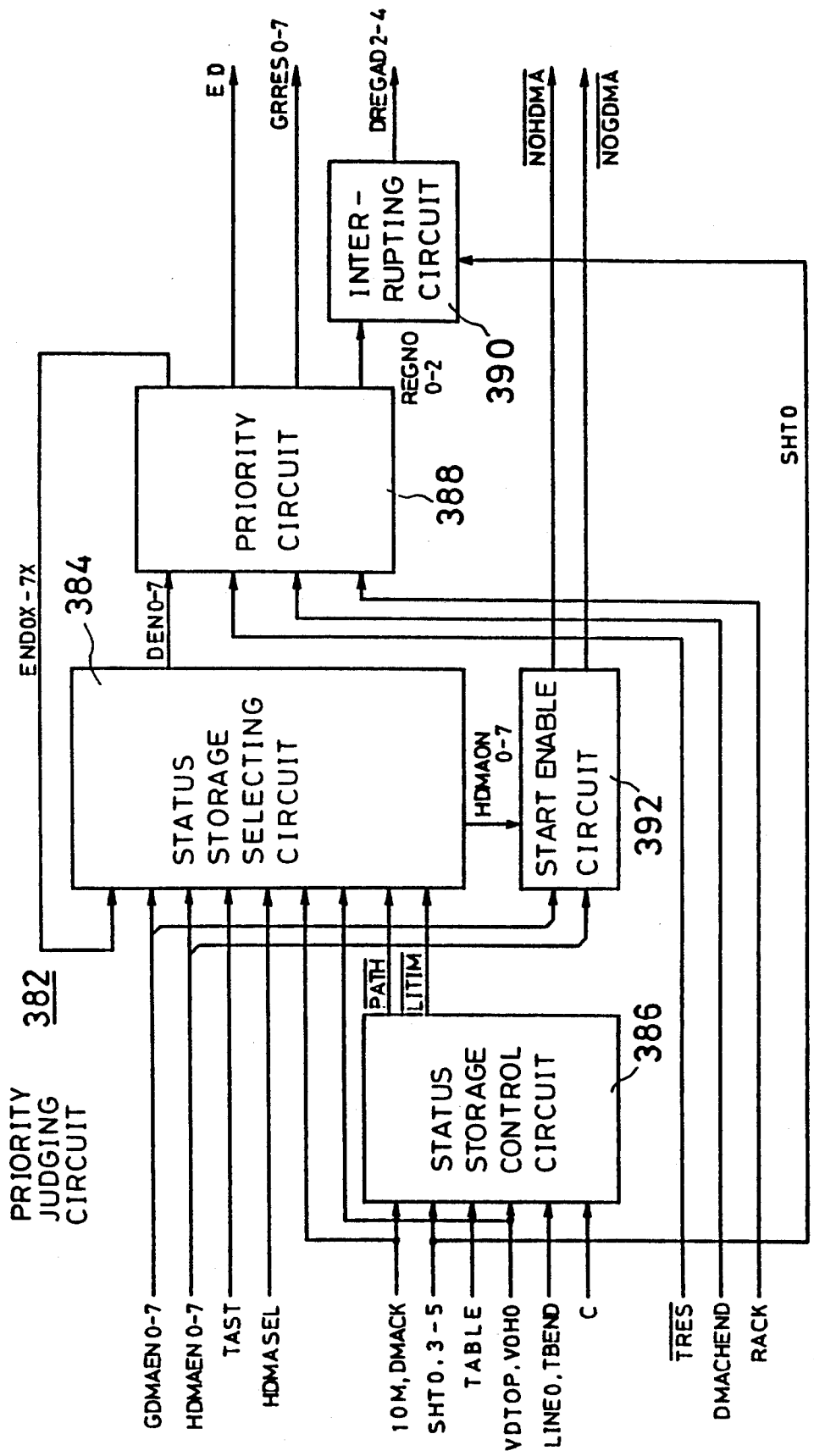
FIG. 19 is a schematic block diagram showing a priority judging circuit indicated in FIG. 3A.

One of two inputs of each AND gate in the gate circuit 400 receives each bit output from the intraframe operation enable register 396. The other input of each AND gate in the gate circuit 400 admits each of bits constituting data HDMAEN0-7. A gate circuit 404 comprising eight NOR gates receives bit outputs from the DFF 392. A signal PATH is fed to the gate circuit 404 whose outputs are applied to a data transfer enable register 406. The data transfer enable register 406 contains eight RS-FF's whose reset inputs R admit bit outputs from the gate circuit 404. Set inputs S of the data transfer enable register 406 are supplied with the signal /TAST. In response to a signal /PATH, the gate circuit 404 outputs data that corresponds to the current channel number. The output data enters reset inputs R of the data transfer enable register 406 so that when a data transfer mode is "0", data transfer is disabled during a next horizontal blanking period. Outputs of the data transfer enable register 406 are applied to the other input of each RS-FF in the gate circuit 402. Outputs of the gate circuit 402 are fed to a data selector 408 which receives the signal HDMASEL as its selection input. Thus during the H-DMA or general DMA operation, the data selector 408 outputs enable signals DEN0-DEN7 corresponding to each channel. The enable signals DEN0-DEN7 are sent to the priority circuit 388 (FIG. 19).

Figure 21:
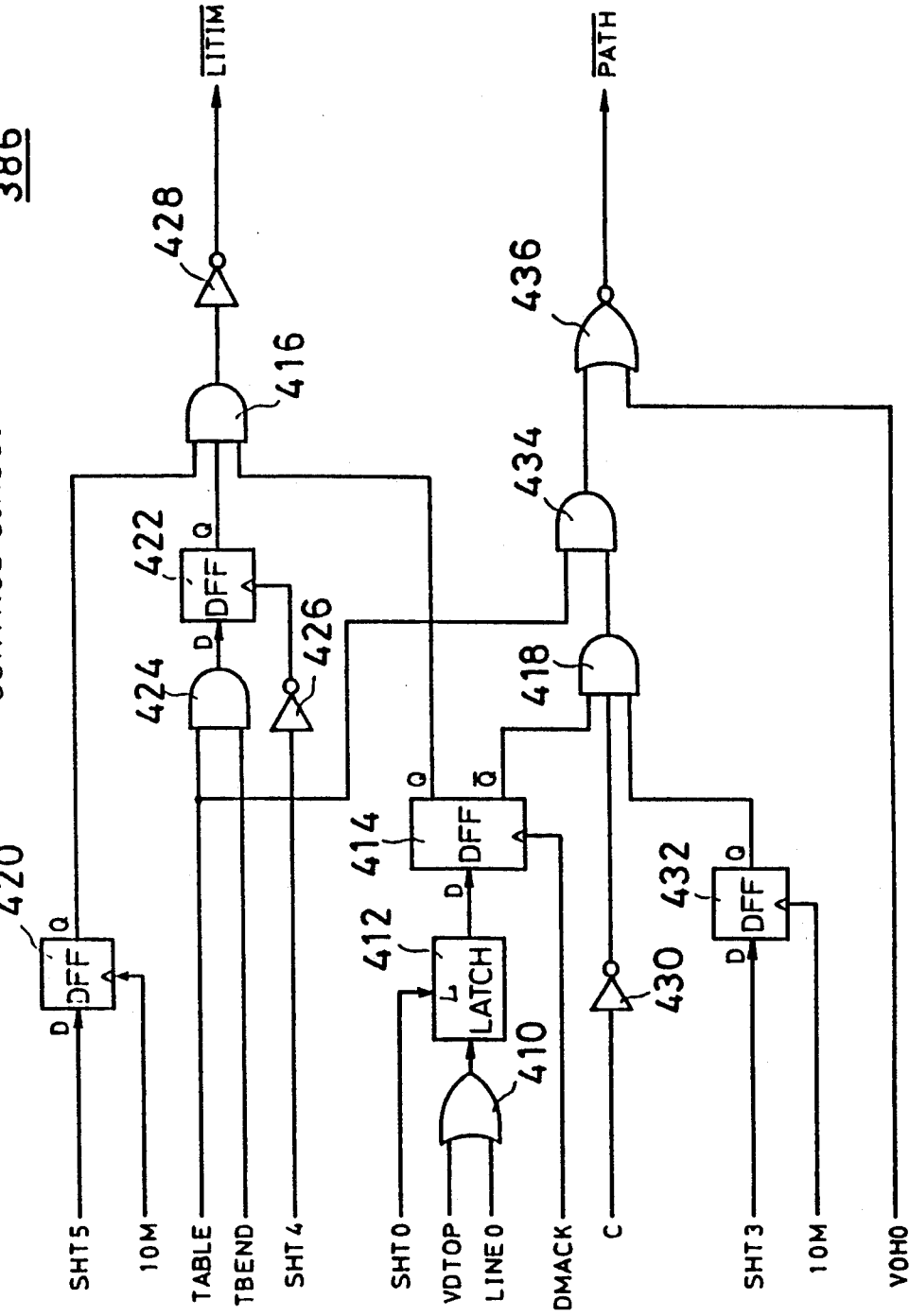
FIG. 21 is a block diagram showing a status storage control circuit incorporated in the priority judging circuit.

The status storage control circuit 386, illustrated in detail in FIG. 21, generates the signals /LITIM and /PATH which are applied to the status storing/selecting circuit 384 (FIG. 20). The status storage control circuit 386 comprises an OR gate 410 that receives the signal /VDTOP from the basic signal generating circuit 34 and the signal LINE0. An output of the OR gate 410 is latched by a latch 412 in response to the signal SHT0. An output of the latch 412 enters a D input of a DFF 414. The DFF 414 admits the clock signal DMACK. An output Q of the DFF 414 is applied to one input of an AND gate 416, and an output /Q of the DFF 414 is sent to one input of an AND gate 418. Remaining two inputs of the AND gate 416 receive Q outputs of DFF's 420 and 422. A D input of the DFF 420 admits the signal SHT5, and the DFF 420 receives the clock signal 10M. D D input of the DFF 422 is fed with an output of an AND gate 424 that receives both the signal TABLE and a signal TBEND. As its clock signal, the DFF 422 admits the signal SHT4 through an inverter 426. Thus the AND gate 416 outputs the signal LITIM when the signal TBEND from the end judging circuit 578 is brought High with a predetermined timing (of signal SHT4), i.e., when the data bus value becomes zero. The signal LITIM is inverted by an inverter 428, and an inverted signal /LITIM is sent as a control signal to the gate circuit 394 of FIG. 20.

Remaining two inputs of the AND gate 418 that receives an output /Q of the DFF 414 are supplied with a signal C via an inverter 430 and with an output Q of a DFF 432. A D input of the DFF 432 receives the signal SHT3, and the DFF 432 admits the signal 10M as its clock signal. An output of the AND gate 418 is applied, together with the signal TABLE, to an AND gate 434. An output of the AND gate 434 is fed to one of the two inputs of a NOR gate 436. The other input of the NOR gate 436 receives the signal VOHO. Thus the NOR gate 436 outputs the signal /PATH when the most significant bit in a line register of a data switching circuit is brought Low at a specific timing. The signal /PATH is applied as a control signal to the gate circuit 404 shown in FIG. 20.

Figure 22:
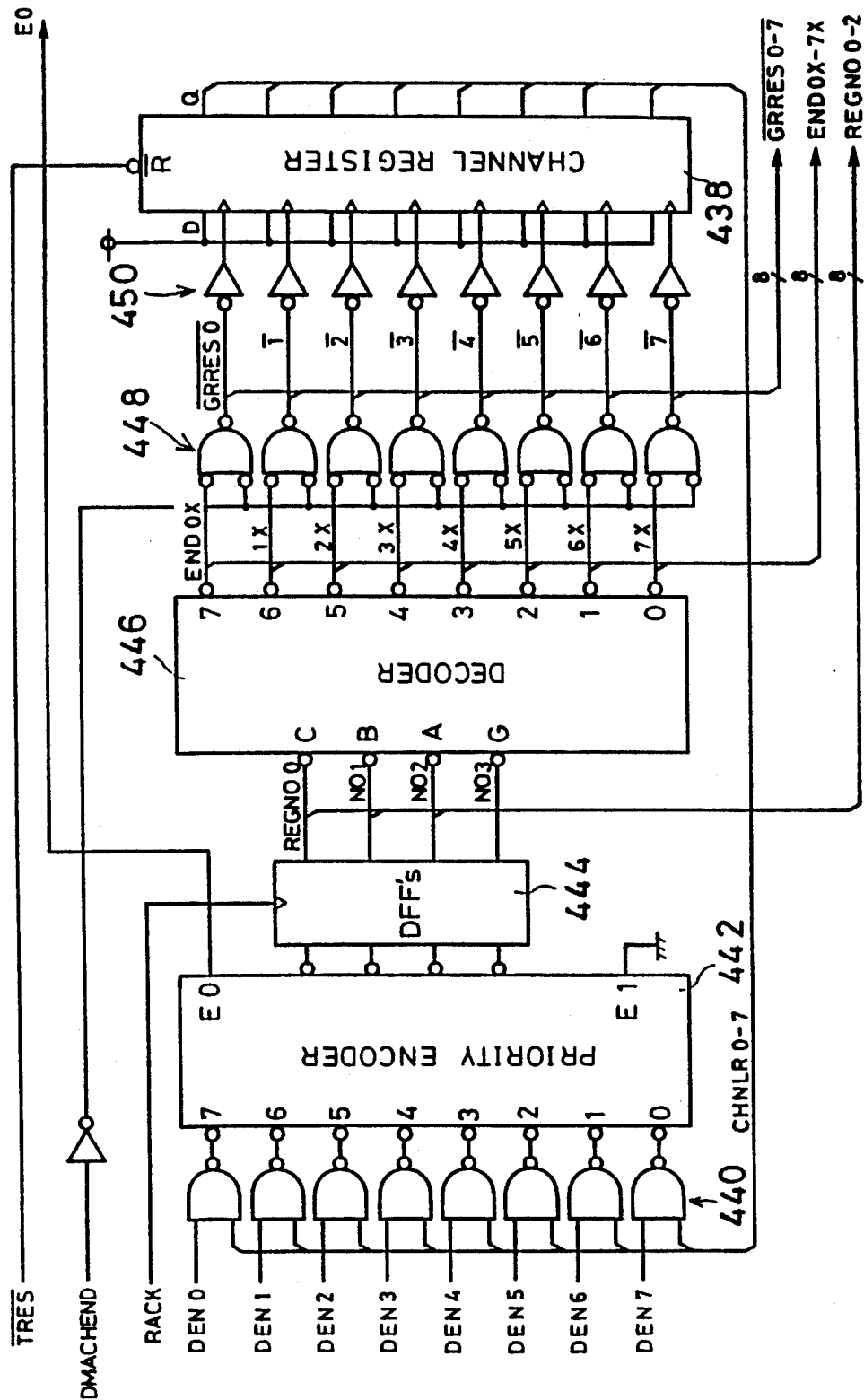
FIG. 22 is a block diagram showing a priority circuit included in the priority judging circuit.

The priority circuit 388, details of which are depicted in FIG. 22, comprises a channel register 438 that is reset by the signal /TRES. Channel data CHNLR0-7, after leaving the channel register 438, enter a gate circuit 440 that contains eight NAND gates. The gate circuit 440 receives as its gate signal the signal DEN0-DEN7 from the data selector 408 for the status storing/selecting circuit 384 shown in FIG. 20. An output of the gate circuit 440 is applied to a priority encoder 442. The priority encoder 442 outputs signals for carrying-out the DMA operations on channels 0 through 7, in that order, the signals being fed to a DFF 444. When all channels have been finished, the priority encoder 442 outputs the signal EO after bringing it Low. Register number data REGN0, which was latched with the signal RACK in the DFF 444, is forwarded to a decoder 446. The decoder 446 decodes supplied data REGN0 and outputs one of enable signals END0X through END7X for each channel. The enable signal thus outputted enters a gate circuit 448 which in turn outputs a general DMA register reset signal /GRREAS0-7. This reset signal passes through an inverter 450 and is applied as a clock signal to the DFF's that constitute the above-described channel register 438. In this manner, the priority circuit 388 resets the channel register 438 in response to the signal /TRES from the DMA start/stop circuit 206 during the H-DMA operation. Thus DMA operations are performed consecutively on the channels 0 through 7, in that order. The number of the currently operating channel is applied as the address to a DMA working memory, to be described later. When all channels have been finished, the signal EO is brought Low and the current H-DMA operation is stopped. Every time a general DMA operation ends on a applied channel, a reset signal /GRRES corresponding to that channel is outputted. The reset signal is supplied as a reset signal to a general DMA register 574 (FIG. 3A), to be described later. As in the H-DMA operation, the number of the currently operating channel is applied as the address to the DMA working memory 502.

Figure 23:
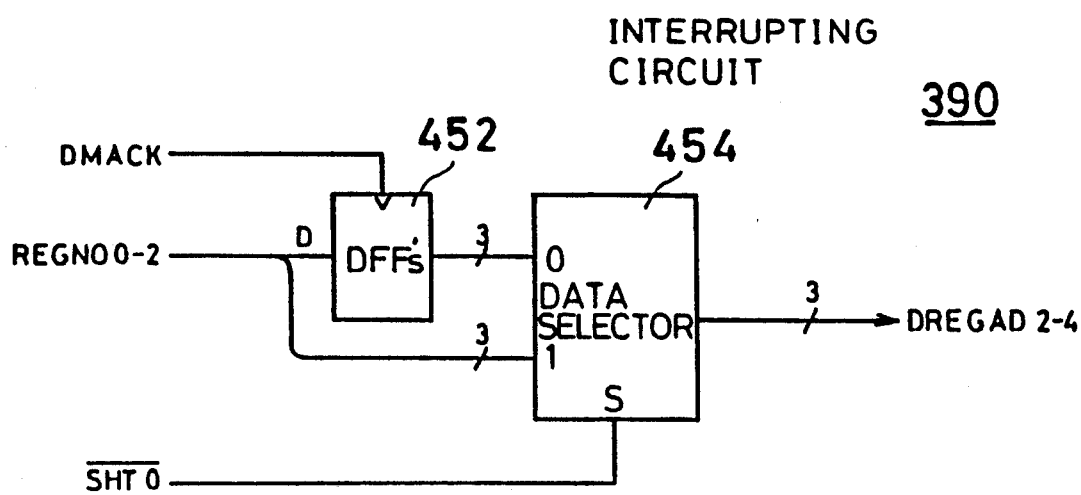
FIG. 23 is a block diagram showing an interrupting circuit contained in the priority judging circuit.

The interrupting circuit 390 shown in FIG. 23 contains a DFF 452. The DFF 452 receives as its data input each of bits of data REGN0-2 from the DFF 444 in the priority circuit 388 of FIG. 22. As its clock, the DFF 452 admits the signal DMACK. An output of the DFF 452 and the data REGN0-2 are supplied to inputs of a data selector 454. The signal /SHT0 from the counter 36 is applied as a selection signal S to the data selector 454. Thus in response to the signal /SHT0 from the DMA timing signal generating circuit 32, the interrupting circuit 390 forwards the number of the preceding channel as an address signal to a switching circuit 550 (FIG. 3A), to be described later. This makes possible the transition from one channel to the next without time loss. For example, in FIG. 35B, an address value for the DMA working memory (FIG. 3A) changes from "0013" to "0033", "0233", and "4257". High-order three bits indicate the number of the currently operating channel. This means that following "4", every numeral should be 4 or higher. However, time losses occur in such cases as "0233", "-2--" and "4-57" where each dash (-) indicates a loss. In cases such as "0233" and "4257", the flow of data over the data bus fails to keep up with the operation. Thus one way to go back on the channel number by one with a specific timing is to provide an optimal timing.

Figure 24:
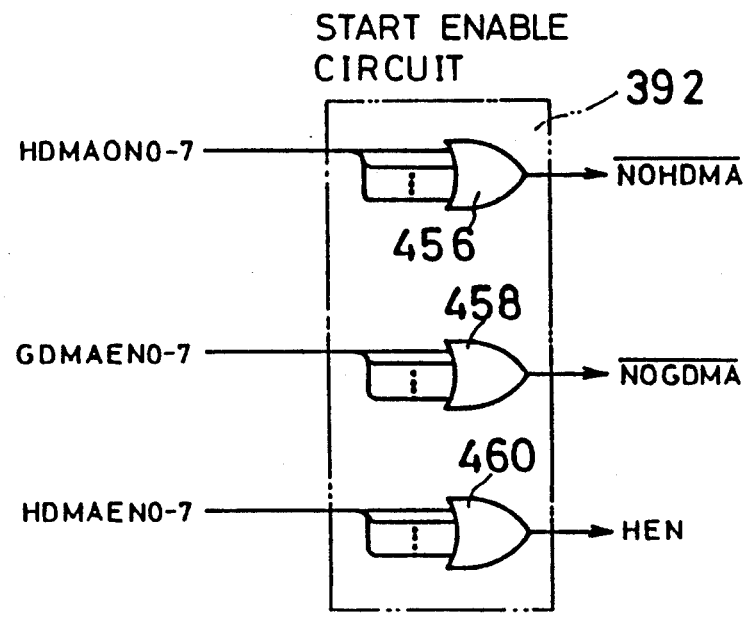
FIG. 24 is a block diagram showing a start enable circuit accommodated in the priority judging circuit.
Figure 25:
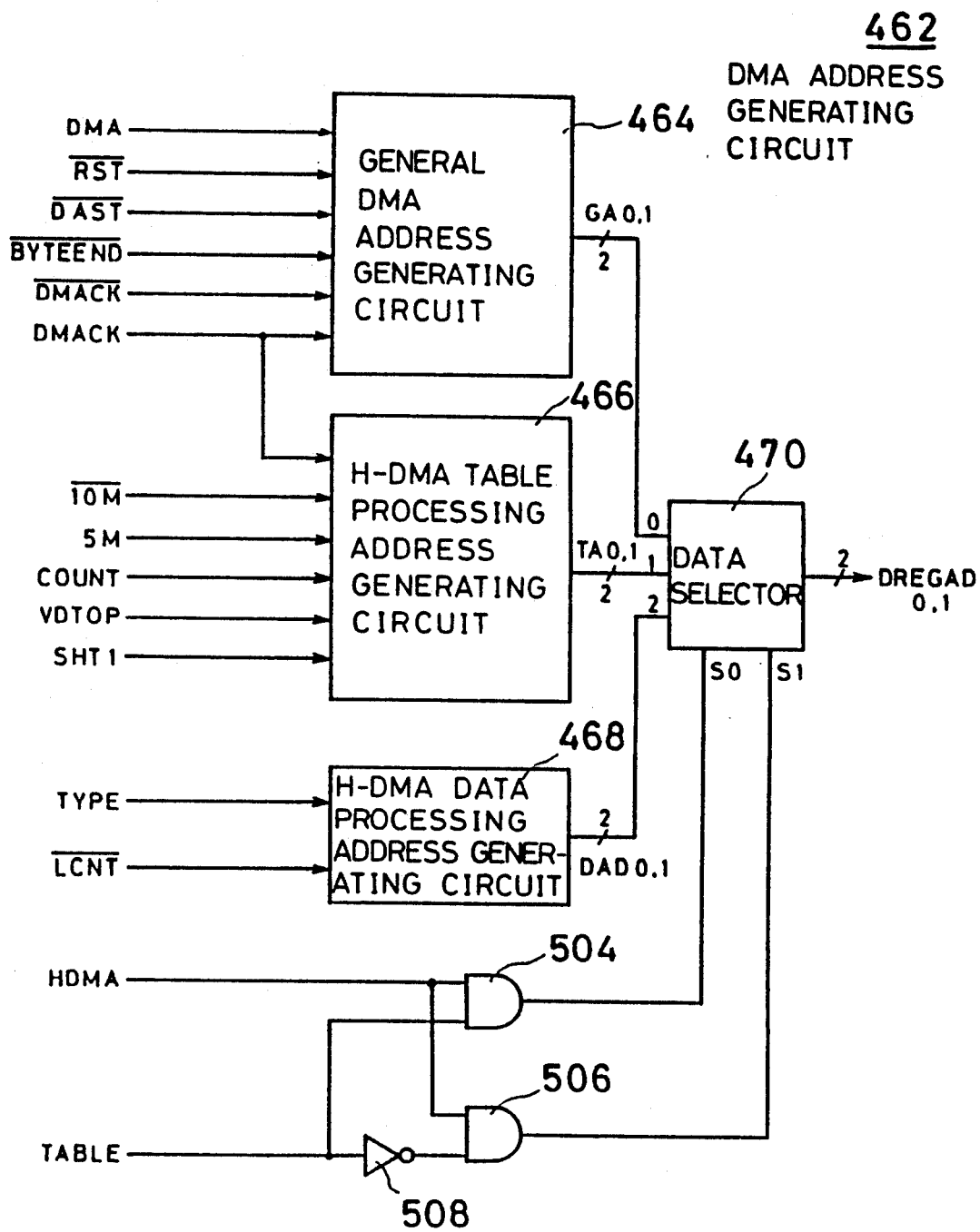
FIG. 25 is a schematic block diagram showing a DMA address generating circuit shown in FIG. 3A.

The start enable circuit 392 illustrated in FIG. 24 comprises three OR gates 456, 458 and 460. The OR gate 456 receives the signal HDMAON0-7 from the status storing/selecting circuit 384 in FIG. 20, and the NOR gate 458 admits data GDMAEN0-7 from a general DMA register, to be described later, and the NOR gate 460 accepts data HDMAEN0-7 from an H-DMA register, to be described later. Thus when at least one H-DMA channel is enabled, the NOR gate 456 outputs a high level signal /NOHDMA. When at least one channel of the general DMA register is enabled, the NOR gate 458 outputs a high level signal /NOGDMA. When all outputs from the H-DMA register 572 (FIG. 3A), to be described later, are brought Low, the NOR gate 460 outputs a low level signal HEN. The signal /NOHDMA serves as an H-DMA start signal and the signal /NOGDMA as a general DMA start signal. The signal HEN acts as an H-DMA stop signal.

Referring to FIGS. 25 through 28, a DMA address generating circuit 462 (FIG. 3A) is described below. The DMA address generating circuit 462 comprises a general DMA address generating circuit 464, an H-DMA table processing address generating circuit 466 and an H-DMA data processing address generating circuit 468. Any of the data GA0,1; TA0,1 and DAD0,1 respectively from the circuits 464, 466 and 468 is selected by a data selector 470 and fed to a switching circuit 500 (FIG. 3A), to be described later.

Figure 26:
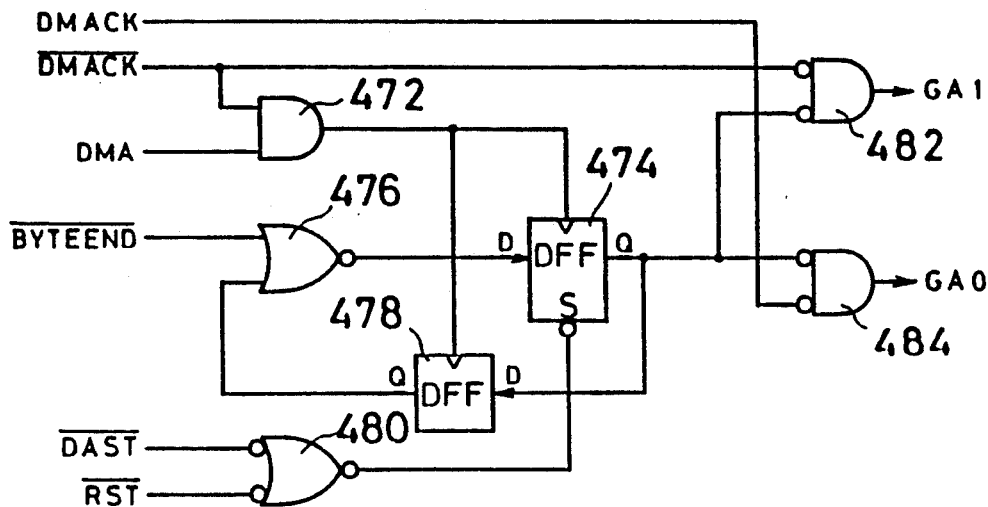
FIG. 26 is a block diagram showing a general DMA address generating circuit incorporated in the DMA address generating circuit.

FIG. 26 shows details of the general DMA address generating circuit 464. The general DMA address generating circuit 464 includes an AND gate 472. One input of the AND gate 472 receives the signal DMA and the other input thereof admits the clock signal /DMACK. An output of the AND gate 472 is applied as a clock signal to a DFF 474. A D input of the DFF 474 is fed with an output of a NOR gate 476. The NOR gate 476 admits the signal /BYTEEND and an output Q of a DFF 478. A D input of the DFF 478 receives an output Q of the DFF 474. An output of the AND gate 472 is also applied as a clock signal to the DFF 478. A set input /S of the DFF 474 admits an output of an AND gate 480. The AND gate 480 is supplied with the signal /DAST and with the system reset signal /RST. An output of the DFF 474 is applied to one input of a NOR gate 482 and to one input of a NOR gate 484. The other input of the NOR gate 482 receives the clock signal /DMACK, and the other input of the NOR gate 484 admits the clock signal DMACK. Thus the NOR gates 482 and 484 output address data GA1 and GA0 which become "0" when the signal /DAST is received from the DMA start/stop circuit 206 or when the signal /BYTEEND is admitted from the end judging circuit 578 (FIG. 3A). Otherwise the address data GA and GA0 are alternately set to "1" and "2" and vice versa in synchronous with the clock signal DMACK.

Figure 27:
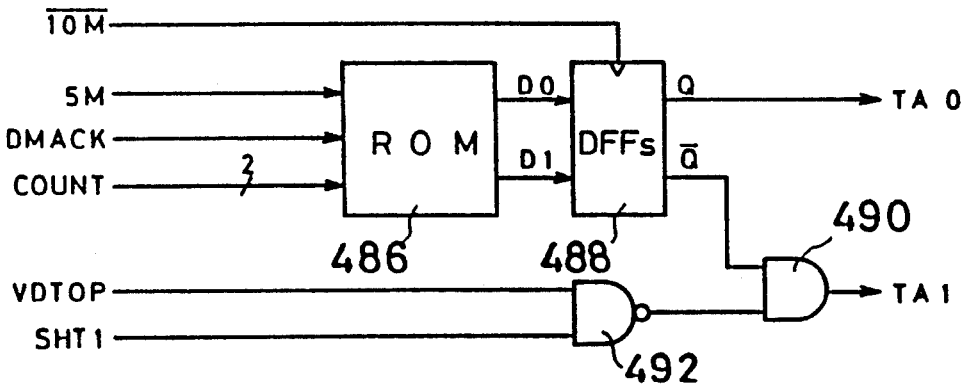
FIG. 27 is a block diagram showing an H-DMA table processing address generating circuit included in the DMA address generating circuit.

The H-DMA table processing address generating circuit 466, details of which are illustrated in FIG. 27, contains a ROM 486. The ROM 486 receives the clock signals 5M and DMACK as well as the count data COUNT, and outputs D0 and D1 as per Table IV below.

TABLE IV

| COUNT | DMACK | 5M | D1 | D0 |
|---|---|---|---|---|
|  | 1 | 1 | 1 | 1 |
| 00 | 0 | 0 | 1 | 1 |

TABLE IV-continued

| COUNT | DMACK | 5M | D1 | D0 |
|---|---|---|---|---|
|  | 0 | 1 | 0 | 0 |
|  | 1 | 0 | 0 | 0 |
|  | 1 | 1 | 1 | 1 |
| 01 | 0 | 0 | 1 | 1 |
|  | 0 | 1 | 0 | 0 |
|  | 1 | 0 | 1 | 0 |
|  | 1 | 1 | 1 | 1 |
| 10 | 0 | 0 | 1 | 1 |
|  | 0 | 1 | 0 | 0 |
|  | 1 | 0 | 1 | 0 |

An output of the ROM 486 is applied to a D input of a DFF 488. The DFF 488 receives the signal /10M as its clock signal. An output Q of the DFF 488 is outputted as the address TA0 and an output /Q thereof is input to an AND gate 490. The AND gate 490 also receives an output of a NAND gate 492. The NAND gate admits both the signal VDTOP and the signal SHT1. An output of the AND gate 490 becomes address TA1. In this manner, the H-DMA table processing address generating circuit 466 generates the addresses TA0 and TA1 for H-DMA table processing. Only during the H-DMA table processing V shown in FIG. 2 does the ROM 486 output "3" using the timing: COUNT=00, DMACK=1, 5M=1. Then the output of the ROM 486 is latched by the DFF 488 with the next timing: COUNT=00, DMACK=0, 5M =0. At this point, the data TA0 and TA1 are changed to "1".

Figure 28:
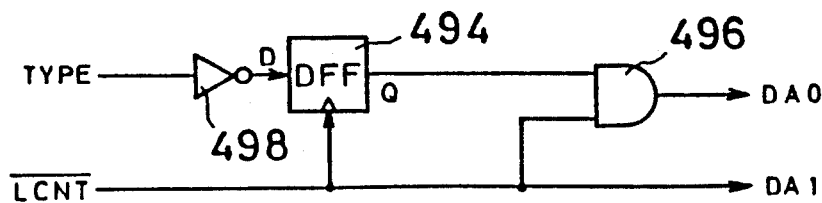
FIG. 28 is a block diagram showing an H-DMA data processing address generating circuit contained in the DMA address generating circuit.

The H-DMA data processing address generating circuit 468, details of which are shown in FIG. 28, includes a DFF 494 and an AND gate 496. A D input of the DFF 494 is supplied with the signal TYPE via an inverter 498, and the DFF 494 receives the signal LCNT as its clock signal. An output Q of the DFF 494 is sent to one input of an AND gate 496 and the other input thereof admits the signal /LCNT. The H-DMA data processing address generating circuit 468 provides address data DA0 and DA1 for the H-DMA data processing depicted in FIG. 2. Only upon receipt of the signal /LCNT from the DMA timing signal generating circuit 32, do the output address data become "3". Otherwise the output data DA0 and DA1 become "3" when the addressing mode signal TYPE from the set parameter register (described later) is Low and the data become "2" when the signal TYPE is High.

In the manner described, the data selector 470 selects any of the address data output by the general DMA address generating circuit 464, the H-DMA table processing address generating circuit 466 and the H-DMA data processing address generating circuit 468. The selected address data is sent to the switching circuit 500 (FIG. 3A) as low-order two bits of the address of the DMA working memory 502 (FIG. 3A).

Selection signals to the data selector 470 come from AND gates 504 and 506. Two inputs of the AND gate 504 are fed with the signal HDMA that goes High during the H-DMA operation period and with the signal TABLE that is brought High during the H-DMA table processing period. One input of the AND gate 506 receives the signal HDMA and the other input thereof admits the signal TABLE after inversion by an inverter 508. This means that during the general DMA operation period, outputs of the AND gates 504 and 506 are both brought Low. During that period, the data selector 470 selects as address DREGAD0-1 data GA0-1 from the general DMA address generating circuit 464. During the HDMA table processing period, either the AND gate 504 or the AND gate 506 provides a high level output. In that case, the data selector 470 selects the address TA0-1 from the H-DMA table processing address generating circuit 466. During the H-DMA data processing period, the AND gate 504 provides a high level output while the AND gate 506 yields a low level output. This causes the data selector 470 to select the data DAD0-1 from the H-DMA data processing address generating circuit 468.

As illustrated in FIG. 29, the DMA working memory 502 comprises a high-order working memory 510a, a middle-order working memory 510b and a low-order working memory 510c. The working memories 510a, 510b and 510c each contain a memory area of 32 bits by 8 bits in size. The DMA working memory 502 is a memory for storing various settings to execute the DMA operations. The signal /CPUBE and the least significant bit A0 of address data A0-A4 are applied to a NAND gate 512. An output of the NAND gate 512 is supplied, together with an address bit A1, to an AND gate 514. An output of the AND gate 514 is applied as the address bit A1 to the high-order working memory 510a. Remaining address bit inputs of the high-order working memory 510a receive bits A0 and A2-A4 intact. Thus only when the address value A0-A4 becomes "3", "7", "11", "15", "19", "23", "27" or "31" during the DMA operation, do the NAND gate 512 and the AND gate 514 change the address value to "1", "5", "9", "13", "17", "21", "25" or "29". This is done so as to set an address bank common to the A bus setting area and to the A bus count work area for each channel.

A data input DI of the high-order working memory 510a admits data over the CPU data bus through the switching circuit 500. The middle-order working memory 510b and low-order working memory 510c are supplied with data WMD0-7 and WLD0-7, respectively, through the switching circuit 500. Data outputs DO of the working memories 510a, 510b and 510c are applied to an output buffer 516 comprising tri-state buffers 518a, 518b and 518c. At the same time, the output data DO of the high-order working memory 510a is sent to the set parameter register 584 (FIG. 3B), and the output data DO of the middle-order working memory 510b is applied to the B bus register 592 (FIG. 3B). The output data DO of the middle-order working memory 510b is also supplied, together with the output data DO of the low-order working memory 510c, to an arithmetic data register 582 (FIG. 3B) as data DTLB. The tri-state buffers 518a, 518b and 518c of the output buffer 516 are fed respectively with read signals /REGRDH, /REGRDM and /REGRDL from an address translation circuit 520 (FIG. 30), to be described later.

Figure 30:
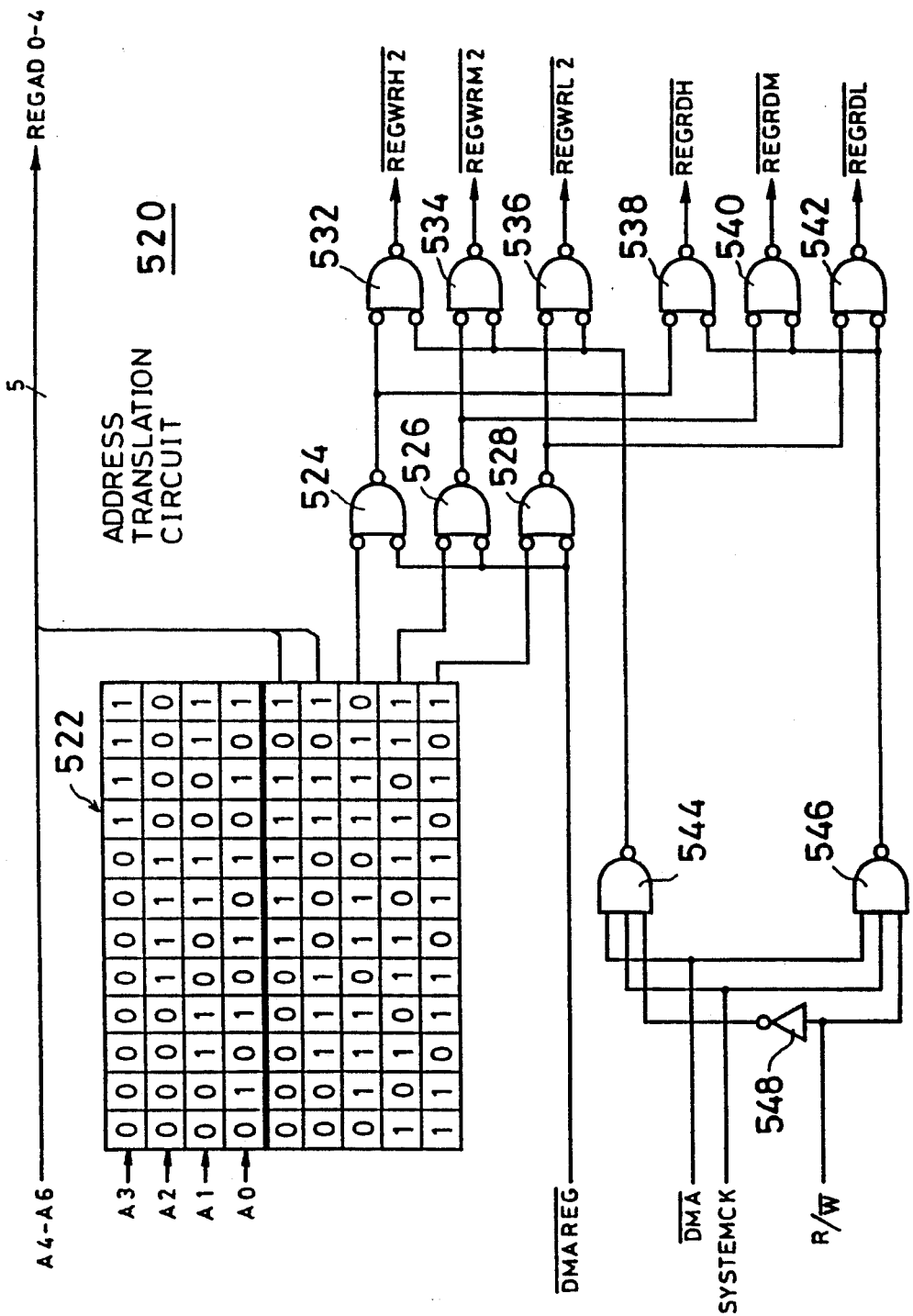
FIG. 30 is a block diagram showing an address translation circuit shown in FIG. 3A.

The address translation circuit 520 depicted in FIG. 30 generates address, write and read signals with which the CPU 12 writes and reads data to and from the DMA working memory 502. Whereas the data from the CPU 12 is in eight-bit format, the working memories 510a, 510b and 510c in the DMA working memory 502 are a 24-bit arrangement each. Thus it is those low-order four bits A0-A3 on the address bus from the CPU 12 which determine which working memory in the DMA working memory 502 the eight-bit data for the CPU 12 is to be written to or read from. The address translation circuit 520 includes a ROM 522 that receives the low-order four bits A0-A3 of a applied address. The two-bit data translated by the ROM 522 and the high-order three bits A4–A6 on the address bus of the CPU 12 are outputted as a five-bit register address REGAD0-4.

The three bits translated by the ROM 522 are applied to OR gates 524, 526 and 528, one bit being destined to one of the two inputs of each gate. The other input of each of the OR gates 524, 526 and 528 is commonly supplied with a signal /DMAREG from the address decoder 520. When writing or reading data to or from the DMA circuit 26, the CPU 12 gains access to a specific address on an address map of its own. When that specific address (for example, 4000H−405FH) is placed on the address bus, the address decoder 520 brings the signal /DMAREG Low. An output of the OR gate 524 is received by OR gates 532 and 538, each through one of its two inputs. In like manner, an output of the OR gate 526 is received by OR gates 534 and 540 and an output of the OR gate 528 is received by OR gates 536 and 542. The other input of each of the OR gates 532, 534 and 536 is commonly fed with an output of an OR gate 544, while the other input of each of the OR gates 538, 540 and 542 commonly admits an output of a NAND gate 546. The OR gates 544 and 546 receive a signal /DMA and the system clock signal SYSTEMCK. The AND gate 544 also admits a signal R/W from the CPU 12 after inversion by an inverter 548. The NAND gate 546 receives the signal R/W uninverted. In this manner, the OR gates 532, 534 and 536 output data write signals /REGWRH2, /REGWRM2 and /REGWRL2, while the OR gates 538, 540 and 542 output data read signals /REGRDH, /REGRDM and /REGRDL.

Figure 31:
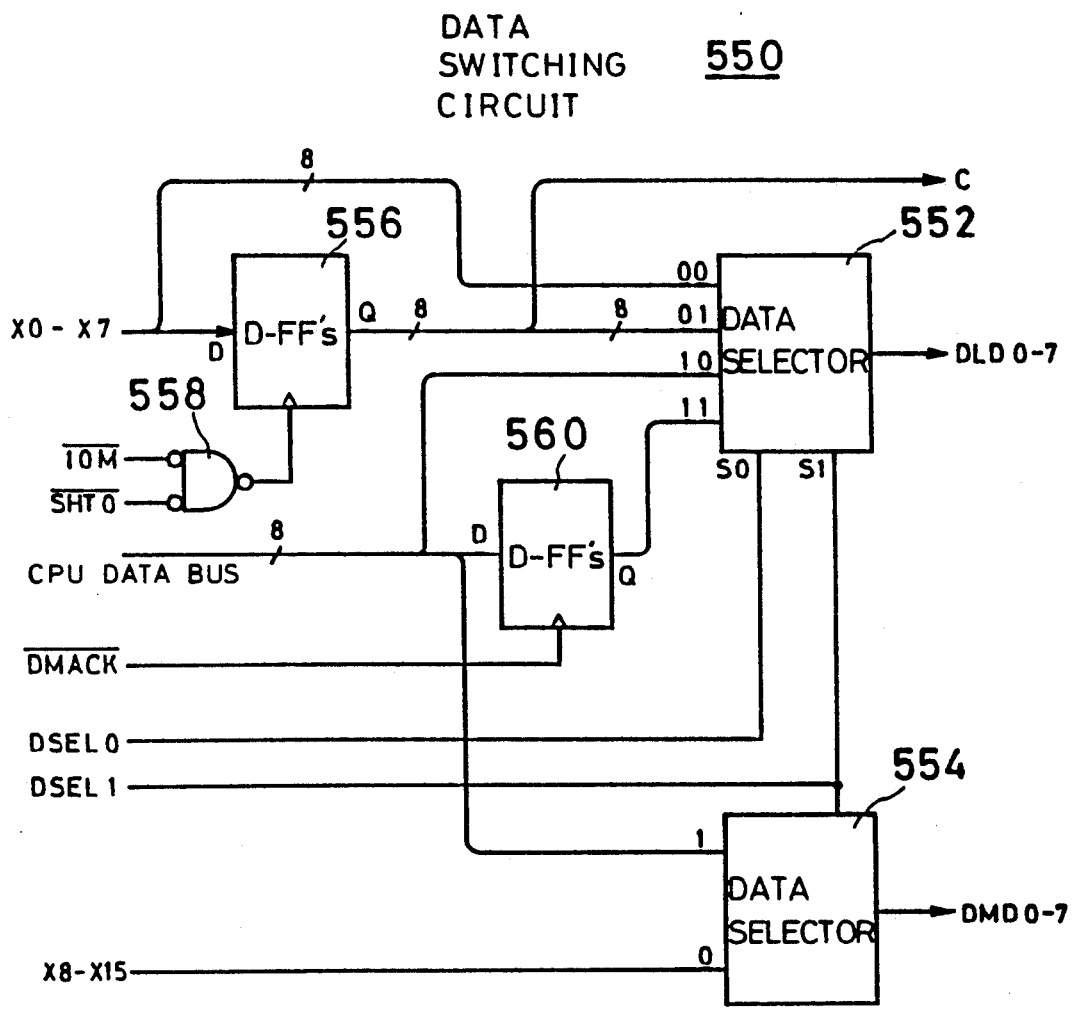
FIG. 31 is a block diagram showing a data switching circuit comprised in FIG. 3A.

The data switching circuit 550, depicted in detail in FIG. 31, switches data destined to the DMA working memory 502 in response to the signals DSEL0 and DSEL1 from the DMA timing signal generating circuit 32 during the DMA operation. The data switching circuit 550 comprises two data selectors 552 and 554, any of which may be selected with the signals DSEL0 and DSEL1. The data selector 552 receives computed results X0–X7 from an arithmetic circuit 580 (described later). The results X0–X7 are also applied to a D input of a DFF 556. An output of the DFF 556 is supplied to the data selector 552. The DFF 556 receives as its clock signal an output of an OR gate 558 which in turn admits the clock signal /10M and the signal /SHT0. The data selector 552 is supplied further with data from the CPU data bus. The data from the CPU data bus is also applied to the D input of a DFF 560. An output of the DFF 560 is applied to the data selector 552 as well. The DFF 560 admits the signal /DMACK as its clock signal. The data selector 554 is fed with the data from the CPU data bus and with computed results X8–X15 from the arithmetic circuit 580.

Consequently, when both the signals DSEL0 and DSEL1 are set to "0", the data selectors 552 and 554 provide as their output the 16-bit data X0–X15 that came from the arithmetic circuit 580. When the signal DSEL0 is set to "0" and the signal DSEL1 is set to "1", content of the register made of the DFF 556 is applied to the middle-order working memory 510b and low-order working memory 510c in the DMA working memory 502. When the signal DSEL0 is set to "1" and the signal DSEL1 is set to "0", the line count data from the CPU data bus is supplied to the middle-order working memory 510b and low-order working memory 510c. When both the signals DSEL0 and DSEL1 are set to "1", the consecutive eight-bit data from the CPU data bus is fed to the middle-order working memory 510b and low-order working memory 510c.

Figure 32:
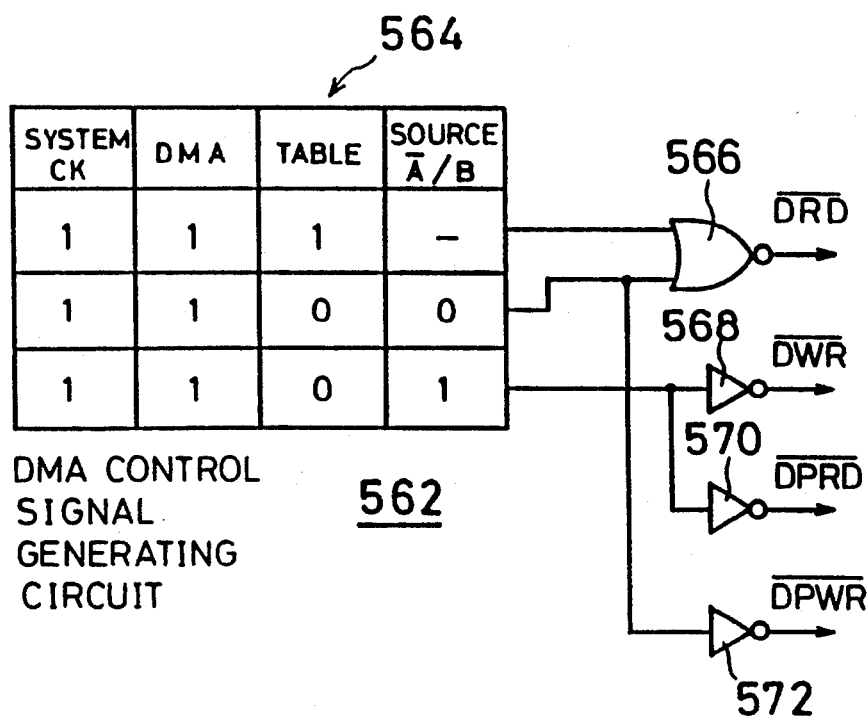
FIG. 32 is a block diagram showing a DMA control signal generating circuit included in FIG. 3A.

The DMA control signal generating circuit 562, details of which are illustrated in FIG. 32, supplies write and read signals to the memory 14 and to the video processor 16 during the DMA operation. As depicted, the DMA control signal generating circuit 562 contains a ROM 564. The ROM 564 receives the system clock signal SYSTEMCK, the signal DMA, the signal TABLE and transfer source data from the set parameter register 584 and, according to each of the signals received, outputs three-bit data. Two bits from the ROM 564 are applied to a NOR gate 566 which in turn outputs a signal /DRD. The other bit from the ROM 564 is inverted by inverters 568 and 570. The inverters 568 and 570 output signals /DWR and /DPRD, respectively. A second bit in an output of the ROM 564 is inverted by an inverter 572 and is outputted as a signal /DPWR. These signals are forwarded by the DMA circuit 26 to the multiplexer 30 (FIG. 1).

Below is a description of circuits and components which are shown in FIGS. 3A and 3B but have not been described individually. After the individualized description of these parts, an operation of the apparatus as a whole will be described.

As mentioned, the address decoder 530 outputs the signal DMAREG when the address data from the CPU 12 is an address value corresponding to the DMA working memory 502, in accordance with the signal R/W from the CPU 12 and with the address value placed on the address bus of the CPU 12. If the address data is an address value corresponding to the H-DMA register 572 or the general DMA register 574, the address decoder 530 outputs a signal HDEN or GDEN. In response to the signal HDEN from the address decoder 530, the H-DMA register 572 latches the H-DMA enable signal placed on the data bus of the CPU 12. Likewise, the general DMA register 574 latches the general DMA enable signal from the CPU 12 in response to the signal GDEN.

A DMA write signal generating circuit 576 generates a write signal to be applied to the DMA working memory 502. When the address data from the DMA address generating circuit 462 is "0", the DMA write signal generating circuit 576 sends its write signal only to the middle-order working memory 510b and low-order working memory 510c in the DMA working memory 502. More specifically, the DMA write signal generating circuit 576 comprises a general DMA write signal generating circuit, an H-DMA data processing write signal generating circuit and an H-DMA table processing signal generating circuit, not shown. The general DMA write signal generating circuit outputs its write signal during the general DMA operation. That is, upon receipt of the signal /DAST from the DMA start/stop circuit 206 or of a signal BYTEEND from the end judging circuit 578 (to be described later), the general DMA write signal generating circuit inhibits writing of data to the DMA working memory 502, otherwise the general DMA write signal generating circuit generates its write signal per cycle of the clock signal 5M. The H-DMA data processing write signal generating circuit provides its write signal during the H-DMA data processing period depicted in FIG. 2. That is, when admitting the signal /DAST from the DMA start/stop circuit 206, the H-DMA data processing write signal generating circuit inhibits writing of data, otherwise the H-DMA data processing write signal generating circuit generates its write signal per cycle of the clock signal DMACK. The H-DMA table processing write signal generating circuit provides its write signal during the H-DMA table processing V or the H-DMA table processing H shown in FIG. 2. That is, when the H-DMA table processing H is in effect and the resulting line count is not zero, i.e., when the data COUNT from the DMA timing signal generating circuit 32 is not zero, the H-DMA table processing write signal generating circuit inhibits writing of data at a specific timing, otherwise the H-DMA table processing write signal generating circuit generates its write data per cycle of the clock signal 5M.

When the data on the CPU data bus is zero, the end judging circuit 578 gives the signal TBEND to the priority judging circuit 382 to end the processing of the current channel within one frame. When the low-order seven bits X0-X6 of computed results from the arithmetic circuit 580 are all zero, the end judging circuit 578 generates a signal LINE0 to indicate that the computed line count has reached zero. If all bits of the computed results are zero, the end judging circuit 578 outputs the signal BYTEEND to indicate the end of the general DMA operation on the current channel.

The arithmetic circuit 580 adds "+1", "0" or "−1" to the data from the arithmetic data register 582 in response to the signals XFA0 and XFA1 from the DMA timing signal generating circuit 32. That is, when both signals XFA1 and XFA0 are "0", the data is incremented by 1. When the signal XFA1 is "0" and the signal XFA0 is "1", the data is incremented by 0. When the signal XFA1 is "1" and the signal XFA0 is "0", or when both signals are "1", the data is decremented by 1. The result of the computation by the arithmetic circuit 580 is sent to the data switching circuit 550 described earlier.

In response to the clock signal /5M from the DMA timing signal generating circuit 32, the arithmetic data register 582 loads on a time division basis an A bus address value, a transfer count set value and a line count which are outputted by the DMA working memory 502, and sends the values to the arithmetic circuit 580. The set parameter register 584 loads the data in the set parameter coming from the DMA working memory 502 in response to the signal /LCNT from the DMA timing signal generating circuit 32. The transfer source data from the set parameter register 584 is fed to the DMA control signal generating circuit 562 described above.

The A bus register 586 loads the A bus data from the DMA working memory 502 in response to the signal LBO from the DMA timing signal generating circuit 32, and outputs the data onto a DMA A bus.

A B bus arithmetic register 588 loads B bus set data from the DMA working memory 502 in response to the signal /LCNT from the DMA timing signal generating circuit 32. The loaded B bus set data is forwarded to a B bus arithmetic circuit 590. In turn, the B bus arithmetic circuit 590 adds the signals BFA0, BFA1 from the DMA timing signal generating circuit 32 and the B bus set data from the B bus arithmetic register 588. The result of the addition is sent to a B bus register 592. The B bus register 592 loads the computed result from the B bus arithmetic circuit 590 and forwards the result onto the B bus of the video processor 16.

Operation

1. General DMA

During the general DMA operation, the CPU 12 first outputs address data, data and a signal R/W. The address decoder 530 (FIG. 3A) receives the address data from the CPU 12. If the address data is found to represent an address previously assigned to the DMA working memory 502, the address decoder 530 sends the signal DMAREG to the address translation circuit 520. The DMA timing signal generating circuit 32 receives the basic clock signal 21M from the clock generator 28 (FIG. 1), and generates a signal SCK and the signals 10M, 5M, DMACK and LBO as already discussed. The DMA start/stop circuit 206 receives the above-mentioned signals from the DMA timing signal generating circuit 32 and generates the system clock signal SYSTEMCK for normal operation. The address translation circuit 520 receives the system clock SYSTEMCK, the signal /DMA from the address decoder 530, an address from the CPU 12 and the signal R/W. Thereafter, the address translation circuit 520 supplies the switching circuit 500 with that address REGAD0-4 of the DMA working memory 502 which corresponds to the address value, and the write signals /REGWRH2, /REGWRM2 and /REGWRL2 corresponding to the same address value. In normal operation, the switching circuit 500 responds to the signal /CPUBE from the DMA start/stop circuit 206 and thereupon supplies the DMA working memory 502 with the address REGAD0-4 from the address translation circuit 520, the data from the CPU 12 and the write signals REGWRH2, /REGWRM2 and REGWRL2 from the address translation circuit 520. In this manner, the data from the CPU 12 is set to the DMA working memory 502.

Next, the CPU 12 sets a general DMA enable signal for the general DMA register 574. Specifically, the CPU 12 outputs an address, a general DMA enable signal and a signal R/W. The address decoder 530 receives the address and the signal R/W from the CPU 12. If the address is found to be one previously assigned to the general DMA register 574 and the signal R/W is found to be Low, the address decoder 530 gives the signal GDEN to the general DMA register 574. The general DMA register 574 latches the data from the CPU 12, i.e., the general DMA enable signal, in response to the signal GDEN. The latched data is sent to the priority judging circuit 382 as the enable signal GDMAEN0-7 for each channel. As described earlier, the priority judging circuit 382 outputs the signal /NOGDMA after bringing it High when at least one general DMA enable signal to the OR gate 458 (FIG. 24) is High. The signal thus outputted enters the DMA start/stop circuit 206, thereby to start the general DMA operation.

On receiving the signal /NOGDMA from the priority judging circuit 382, the DMA start/stop circuit 206 brings the signals GDMA and DMA High before outputting them. At the same time, the DMA start/stop circuit 206 supplies the DMA start signal /DAST to the DMA timing signal generating circuit 32. The DMA start/stop circuit 206 then stops the operation of the CPU 12 by bringing the CPU bus enable signal /CPUBE High and by stopping the CPU clock signal CPUCK. Upon receipt of the DMA start signal /DAST, the DMA timing signal generating circuit 32 generates the timing signals LCNT, SHT0-SHT5 and COUNT described earlier. The priority judging circuit 382 receives the channel register reset signal /TRES to reset the channel register 438 (FIG. 22). The priority judging circuit 382 then supplies the switching circuit 500 with the channel number REGNO0-2 of the highest priority as the high-order three bits DREGAD2-4 of the address. The DMA address generating circuit 462 generates the address signals DREGAD0-1 according to the timing signals LCNT, SHT0-5 and COUNT from the counter circuit 36 (FIGS. 4 and 6) in the DMA timing signal generating circuit 32, as described earlier. The address signal DREGAD0-1 thus generated is applied as the low-order two bits of the address to the switching circuit 500. In this case, the bits DREGAD0 and DREGAD1 are both "0".

During the DMA operation, the switching circuit 500 keeps supplying the DMA working memory 502 with addresses from the priority judging circuit 382 and from the DMA address generating circuit 462 in accordance with the signal /CPUBE from the DMA start/stop circuit 206. Upon receipt of the address from the switching circuit 500, the DMA working memory 502 outputs data, i.e., set parameters and B bus set data. The set parameter register 584 receives the signal LCNT from the DMA timing signal generating circuit 32 and thereupon latches the set parameter from the DMA working memory 502. At the same time, the B bus arithmetic register 588 receives the same signal LCNT and thereupon latches the B bus address value from the DMA working memory 502.

As described, the DMA address generating circuit 462 varies the address signal DREGAD0-1 in accordance with the timing signals LCNT, SHT0-5 and COUNT from the DMA timing signal generating circuit 32. In this case, the address becomes "1" and the high-order three bits DREGAD2-4 of the address from the priority judging circuit 382 remain unchanged. That is, the previous channel number is kept intact.

The switching circuit 500 supplies the DMA working memory 502 with an address value from the DMA address generating circuit 462. In return, the DMA working memory outputs an A bus address set value. The A bus register 586 receives the signal LBO from the DMA timing signal generating circuit 32 and thereupon latches the A bus address value which was outputted as described above by the DMA working memory 502. The latched data is forwarded onto the address bus. The arithmetic data register 582 receives the clock signal /5M from the DMA timing signal generating circuit 32 and thereupon latches the A bus address value from the DMA working memory 502.

As described, the DMA timing signal generating circuit 32 generates the augends BFA0 and BFA1 for the B bus address in accordance with the B bus mode data from the set parameter register 584 and the timing signals LCNT, SHT0-5 and COUNT. The augends BFA0 and BFA1 thus generated are applied to the B bus arithmetic circuit 590. The B bus arithmetic circuit 590 adds the signal BFA0, BFA1 from the DMA timing signal generating circuit 32 and the B bus address value from the B bus arithmetic register 588. The B bus address value is latched by the B bus register 592 in response to the signal LBO from the DMA timing signal generating circuit 32. The latched data is applied to the multiplexer 30 (FIG. 1). The DMA control signal generating circuit 562 receives, as described, the signal DMA from the DMA start/stop circuit 206 and thereupon outputs control signals /DRD, /DWE, /DRPD and /DPWR to the multiplexer 30. Responding to the signal DMA from the DMA start/stop circuit 206, the multiplexer 30 supplies the memory 14 and the video processor 16 with the A bus data, B bus data and the control signals from the DMA circuit 26. In this manner, one-byte data is transferred from the memory 14 to the video processor 16 and vice versa.

The DMA address generating circuit 462 varies the address DREGAD0-1 according to the above-described timing signals from the DMA timing signal generating circuit 32. In this case, the address becomes "1" and the high-order three bits DREGAD2-4 of the address from the priority judging circuit 382 remain unchanged; the previous value is kept intact.

On the basis of the A bus increment data from the set parameter register 584 and the timing signals LCNT, SHT0-5 and COUNT, the DMA timing signal generating circuit 32 outputs the signals XFA0 and XFA1 to designate to the arithmetic circuit 580 how to perform computations as described above. In turn, the arithmetic circuit 580 decrements by 1 or increments by 0 or 1 the A bus address value from the arithmetic data register 582. The computed result is applied to the data switching circuit 550. In accordance with the above described timing signals, the DMA timing signal generating circuit 32 outputs the selection signals DSEL0 and DSEL1 to determine which data among a plurality of data is to be applied to the switching circuit 500.

On receiving the signals DSEL0 and DSEL1, the data switching circuit 550 supplies the switching circuit 500 with the computed result of the A bus address from the arithmetic circuit 580. As described, the DMA write signal generating circuit 576 gives the switching circuit 500 two write signals /REGWRL1 and /REGWRM1 as per the timing signals LCNT, SHT0-5 and COUNT from the DMA timing signal generating circuit 32. The write signals /REGWRL1 and /REGWRM1 correspond respectively to areas d0–d7 and d8–d15 in the DMA working memory 502. In this case, the two write signals are both enabled, and the data in the areas d0–d15 is thereby updated inside the DMA working memory 502. The switching circuit 500 supplies the DMA working memory 502 with addresses from the DMA address generating circuit 462 and from the priority judging circuit 382, with the computed result of the A bus address from the data switching circuit 550, and with the signals REGWRL1 and /REGWRM1 from the DMA write signal generating circuit 576. In this manner, the A bus address in the DMA working memory 502 is updated.

Where the data transfer count is to be updated, the DMA address generating circuit 462 varies the address DREGAD0-1 according to the signals from the DMA timing signal generating circuit 32, as described. In this case, the address DREGAD0-1 becomes "2" and the high-order three bits DREGAD2-4 of the address from the priority judging circuit 382 remain unchanged, and thus, the previous value is kept intact.

The switching circuit 500 supplies the DMA working memory 502 with an address from the DMA address generating circuit 462. In turn, the DMA working memory 502 outputs a data transfer count.

The arithmetic data register 582 receives the clock signal /5M from the DMA timing signal generating circuit 32 and thereupon latches the data transfer count data coming from the DMA working memory 502.

The DMA address generating circuit 462 varies the address signal DREGAD0-1 in accordance with the timing signals LCNT, SHT0-5 and COUNT. In this case, the address becomes "2" and the high-order three bits of the address from the priority judging circuit 382 remain unchanged, and thus, the previous value is kept intact.

The arithmetic circuit 580 receives the operation instructing signals XFA0 and XFA1 from the DMA timing signal generating circuit 32, decrements by 1 the transfer data count from the arithmetic data register 582, and outputs the computed result to the data switching circuit 550. The data switching circuit 550 forwards the computed result to the switching circuit 500 upon receipt of the selection signals DSEL0 and DSEL1 from the DMA timing signal generating circuit 32.

The DMA write signal generating circuit 576 sends the above-mentioned two write signals /REGWRL1 and REGWRM1 to the switching circuit 500 as per the signals from the DMA timing signal generating circuit 32. The switching circuit 500 supplies the DMA working memory 502 with address values from the DMA address generating circuit 462 and from priority judging circuit 382, with the computed result of the A bus address value from the data switching circuit 550, and with the above-mentioned write signals from the DMA write signal generating circuit 576. In this manner, the data transfer count stored in the DMA working memory 502 is updated.

The end judging circuit 578 receives the computed result of the data transfer count from the arithmetic circuit 580 and, when the data transfer count reaches "0", sends the signal /BYTEEND to the DMA timing signal generating circuit 32. In response to the signal /BYTEEND, the DMA timing signal generating circuit 32 generates the signal DMACHEND to inform the priority judging circuit 382 that the DMA operation on the current channel has ended. It is to be noted that the signal COUNT is counted up in the DMA timing signal generating circuit 32 until the data transfer count reaches "0", or that the signal COUNT is reset with a specific timing using a B bus mode signal value from the set parameter register 584. The above-described data transfer is repeated until the data transfer count reaches "0".

On receiving a signal CHANEND from the DMA timing signal generating circuit 32, the priority judging circuit 382 resets the general DMA enable signal for the currently operating channel associated with the DMA register 574. This causes the channel number data (3-bit) of the next-highest priority to be output to the switching circuit 500, and the above operation is repeated.

When the general DMA enable signal is reset for all channels, the priority judging circuit 382 brings the signal /NOGDMA Low. In response, the DMA start/stop circuit 206 brings the signals DMA, GDMA and CPUBE Low to terminate the DMA operation. The DMA start/stop circuit 206 then feeds the CPU clock signal CPUCK to the CPU 12 to return the latter to its normal operation.

Figure 33A:
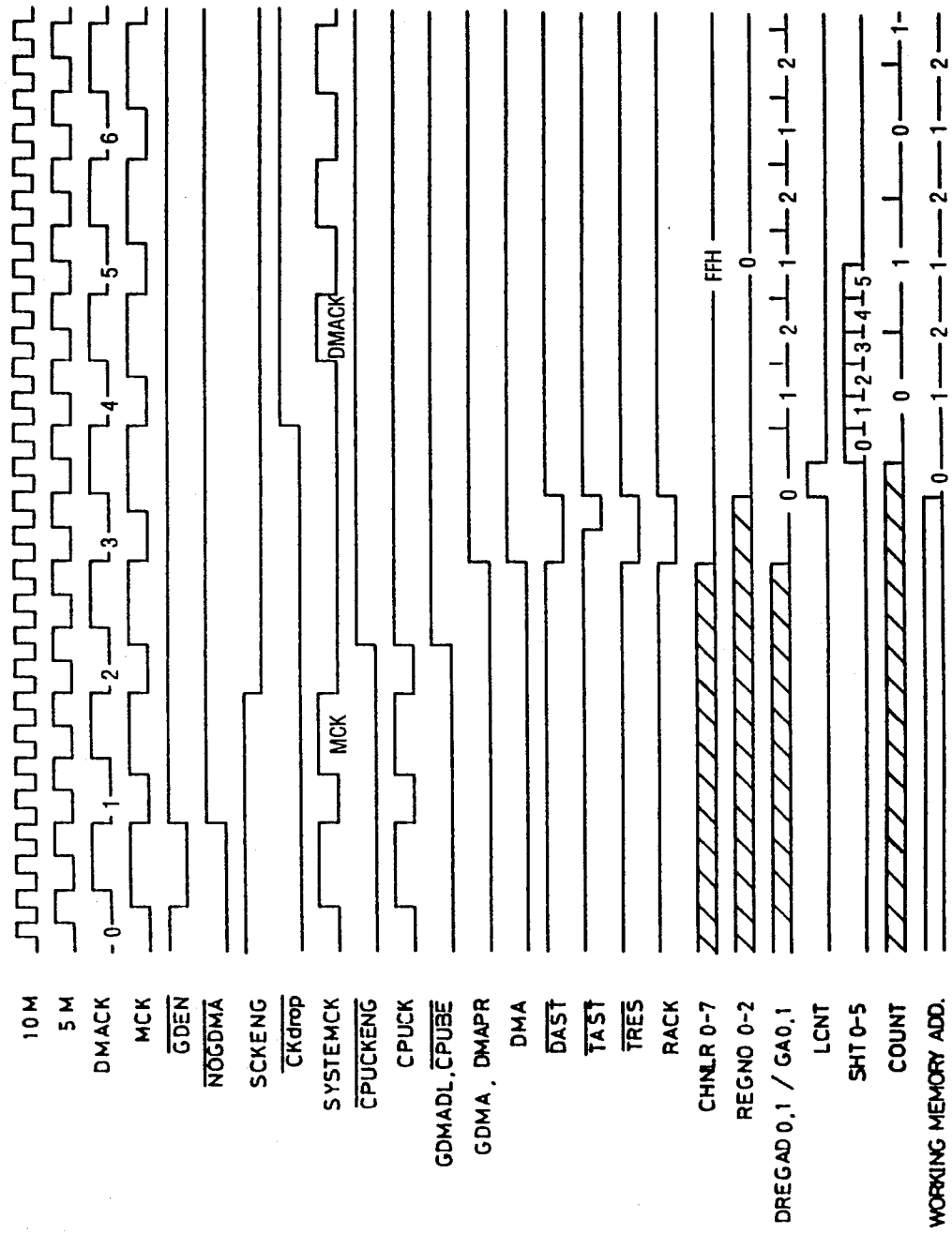
FIGS. 33A and 33B depict the timings in effect when the general DMA operation is started.
Figure 33B:
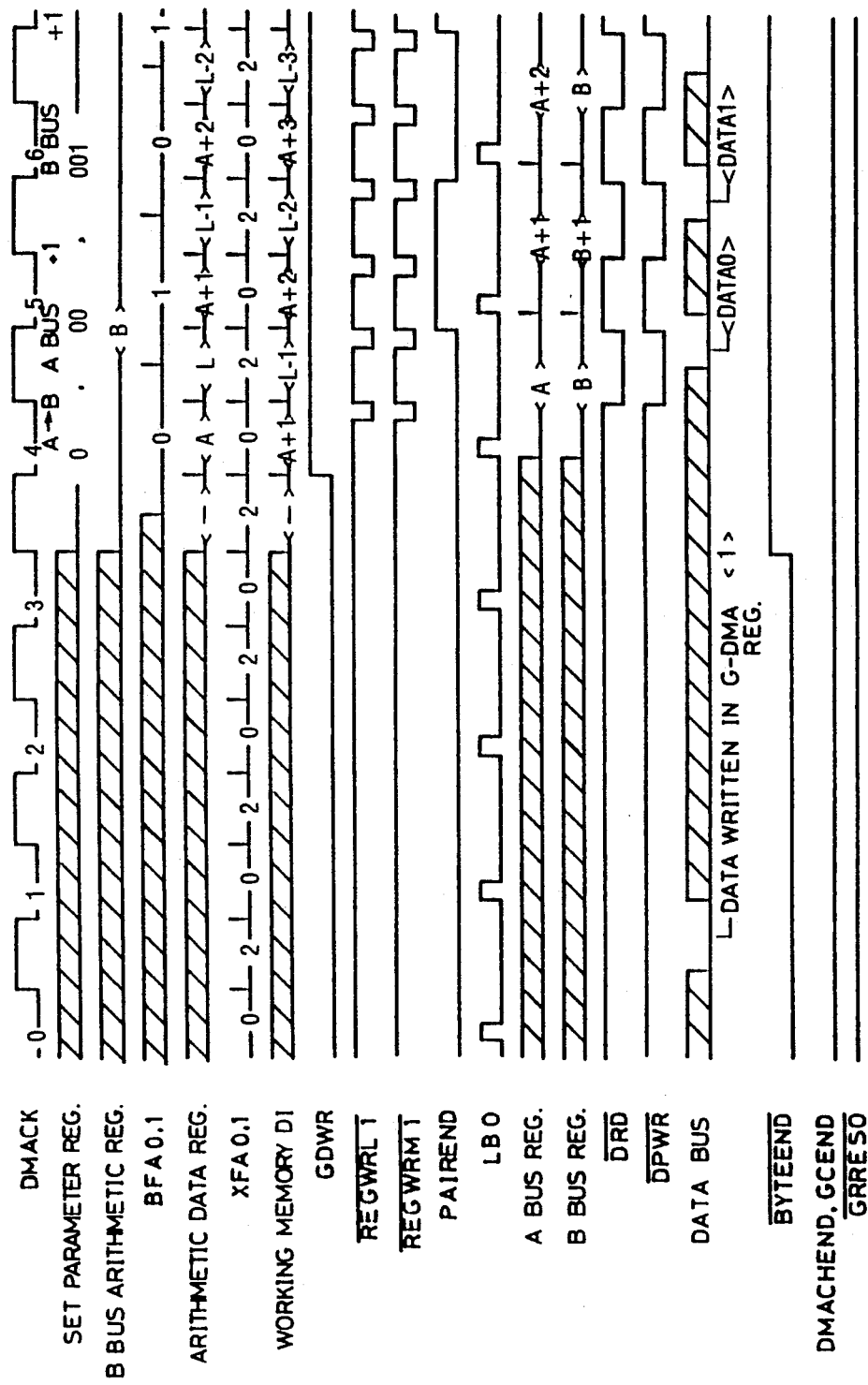
Figure 34A:
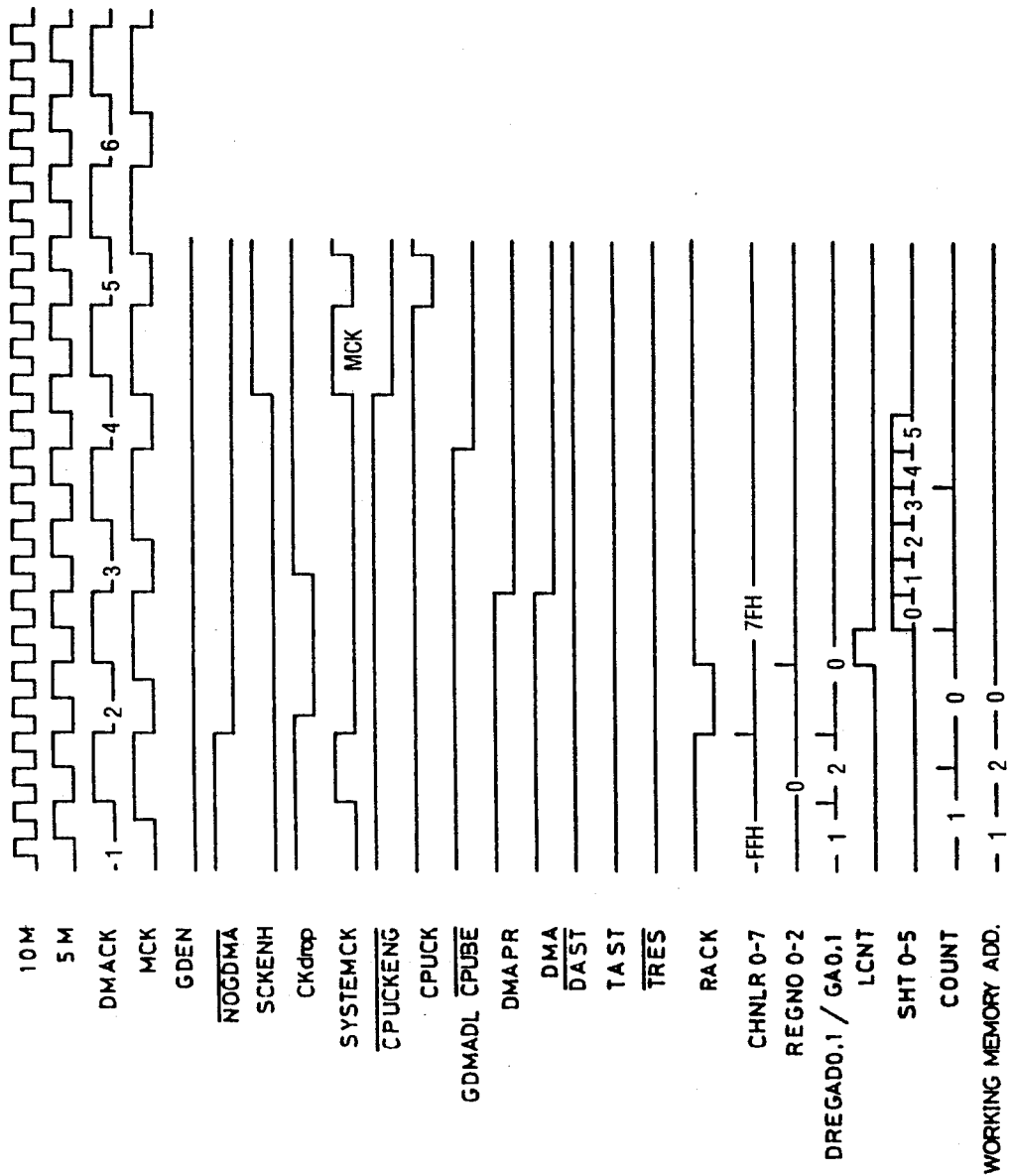

FIGS. 33A and 33B show the timings in effect when the general DMA operation is started. FIGS. 34A and 34B depict the timings in effect when the general DMA operation is stopped. The signals HDMA, HDMASEL, TABLE and DSEL0-1 remain Low during the general DMA operation. In these figures, the character "A" stands for an A bus set address, "B" for a B bus set address and "L" for a set transfer data count.

2. H-DMA

As in the general DMA operation described above, the CPU 12 first writes set data to the DMA working memory 502. Then the CPU 12 sets an H-DMA enable signal to the H-DMA register 572. That is, the CPU 12 outputs an address, data (i.e., H-DMA enable signal), and the signal R/W. The address decoder 530 receives the address and the signal R/W from the CPU 12. If the received address is found to be one previously assigned to the H-DMA register 572 and if the signal R/W is found to be Low, the address decoder 530 gives the signal HDEN to the H-DMA register 572. In response to the signal HDEN, the H-DMA register 572 latches the data (H-DMA enable signal) from the CPU 12 and outputs the signal HDMAEN0-7 to the priority judging circuit 382. As described earlier, the priority judging circuit 382 brings the signal /NOHDMA High when the H-DMA enable signal is High on at least one channel associated with the OR gate 456 (FIG. 24), and the signal /NOHDMA is applied to the DMA start/stop circuit 206. In this manner, the H-DMA operation is enabled.

Next, the H-DMA table processing V shown in FIG. 2 is executed. In this case, the set parameter and the B bus set value are read first. That is, the DMA timing signal generating circuit 32 is supplied with the signal VB which comes from the video processor 16 and indicates vertical blanking. The DMA timing signal generating circuit 32 detects a trailing edge of the signal VB, i.e., the end of a vertical blanking period, and generates the signal VDTOP accordingly. The signal VDTOP is applied to the DMA start/stop circuit 206 as well as to the priority judging circuit 382. In response to the signal VDTOP, the priority judging circuit 382 resets the data transfer enable register 406 (FIG. 20), brings the signal EO Low, and gives it to the DMA start/stop circuit 206. At the same time, the intra-frame operation enable register 396 (FIG. 20) is set.

Responding to the signal VDTOP, the DMA start/stop circuit 206 brings the signals H-DMA and DMA High to start an H-DMA operation. Concurrently, the DMA start/stop circuit 206 feeds the DMA start signal /DAST to the DMA timing signal generating circuit 32, supplies the channel register reset signal /TRES to the priority judging circuit 382, and brings the CPU bus enable signal /CPUBE High. Furthermore, by stopping the CPU clock signal CPUCK, the DMA start/stop circuit 206 stops the operation of the CPU 12 (FIG. 1). When the signal EO from the priority judging circuit 382 is Low, the DMA start/stop circuit 206 generates the signals TAST and TABLE to start H-DMA table processing.

The DMA timing signal generating circuit 32 receives the start signals /DAST and /TAST and thereupon generates the timing signals LCNT, SHT0-5 and COUNT.

On receiving the channel register reset signal /TRES, the priority judging circuit 382 resets the channel register 438 (FIG. 22). In response to the TAST, the priority judging circuit 382 sets the data transfer enable register 406 (FIG. 20) to bring the signal EO High. Furthermore, the priority judging circuit 382 has the channel number /REGNO0-2 of the highest priority channel represented by the high-order three bits of the address, and gives the bits to the switching circuit 500. Thereafter, as in the general DMA operation, the set parameter from the DMA working memory 502 is loaded to the set parameter register 584, and the B bus set value is loaded to the B bus arithmetic register 588.

Then the B bus set data is moved and the data transfer line count is read out. That is, as described, the DMA address generating circuit 462 varies the address DREGAD0-1 on the basis of the timing signals LCNT, SHT0-5, 5M, DMACK and COUNT from the DMA timing signal generating circuit 32. In this case, the address becomes "1" and the high-order three bits of the address from the priority judging circuit 382 remain unchanged. Thus the previous channel number is maintained.

The switching circuit 500 supplies the DMA working memory 502 with an address value from the DMA address generating circuit 462. In response, the DMA working memory 502 outputs an A bus address value. The A bus register 586 latches the address value from the DMA working memory 502 in response to the signal LB0 from the DMA timing signal generating circuit 32, and places the latched data onto the address bus. Responding to the signal /5M from the DMA timing signal generating circuit 32, the arithmetic data register 582 latches the A bus address value that was read from the DMA working memory 502.

The DMA control signal generating circuit 562 feeds control signals to the multiplexer 30 (FIG. 1) in response to the signals DMA and TABLE from the DMA start/stop circuit 206. Responding to the signal DMA, the multiplexer 30 supplies the memory 14 with the control signals from the DMA control signal generating circuit 562. In this manner, the data transfer line count data is outputted from the memory 14.

The DMA address generating circuit 462 varies the address DREGAD0-1 in accordance with the timing signals LCNT, SHT0-5, 5M, DMACK and COUNT from the DMA timing signal generating circuit 32. In this case, the address becomes "3" and the high-order three bits DREGAD2-4 of the address from the priority judging circuit 382 remain unchanged. Thus the previous channel number is maintained.

The arithmetic circuit 580 increments by 1 the A bus address value from the arithmetic data register 582 in response to the operation instructing signals XFA0 and XFA1 from the DMA timing signal generating circuit 32. The computed result is sent to the switching circuit 500 via the data switching circuit 550.

The DMA write signal generating circuit 576 supplies the switching circuit 500 with the two write signals /REGWRL1 and /REGWRM1 in accordance with the timing signals 5M, DMACK and COUNT from the DMA timing signal generating circuit 32. The write signals REGWRL1 and /REGWRM1 correspond respectively to areas d0-d7 and d8-d15 in the DMA working memory 502. That is, in this case, the data in the areas d0-d15 is updated.

The switching circuit 500 supplies the DMA working memory 502 with address values from the DMA address generating circuit 462 and priority judging circuit 382, with the computed result of the A bus address value from the data switching circuit 550, and with the write signals /REGWRL1 and /REGWRM1 from the DMA write signal generating circuit 576. This causes the "A bus address set value plus 1" to be set to the DMA working memory 502.

The DMA address generating circuit 462 varies the address DREGAD0-1 as per the timing signals LCNT, SHT0-5, 5M, DMACK and COUNT from the DMA timing signal generating circuit 32. In this case, the address is "0".

The data switching circuit 550 receives the signals DSEL0 and DSEL1 from the DMA timing signal generating circuit 32 and thereupon supplies the switching circuit 500 with the data on the data bus, i.e., data from the memory 14.

The DMA write signal generating circuit 576 gives the two write signals /REGWRL1 and /REGWRM1 to the switching circuit 500 in accordance with the timing signals 5M, DMACK and COUNT from the DMA timing signal generating circuit 32. In this case, only one write signal /REGWRL1 is enabled. Thus the data in the area d0-d7 alone is updated inside the DMA working memory 502.

The switching circuit 500 supplies the DMA working memory 502 with address values from the DMA address generating circuit 576 and priority judging circuit 382, with the data coming from the memory 14 via the data switching circuit 550, and with the signal /REGWRL1 from the DMA write signal generating circuit 576. This causes the data transfer line count data to be set to the line count work area in the DMA working memory 502.

If the set parameters are read from the DMA working memory 502 in the indirect addressing mode, the corresponding data address is read in the indirect addressing mode. The indirect addressing mode is a mode in which to transfer the data at the address designated by the data address which in turn is designated by a table address. The direct addressing mode, on the other hand, is a mode in which to transfer the data at the address directly designated by a table address. Thus where the direct address mode is in effect, there is no need to read any data address.

The DM address generating circuit 462 varies the address signal DREGAD0-1 according to the timing signals LCNT, SHT0-5, 5M, DMACK and COUNT from the DMA timing signal generating circuit 32. In this case, the address is "3". In the same manner as in reading the data transfer line count described above, the A bus address value in the A bus count work area is placed onto the address bus, incremented and updated. Then data from the memory 14 is loaded to a low-order byte register in the data switching circuit 550. The address signal DREGAD0-1 is varied as well, and the A bus address value is placed onto the address bus, incremented and updated. The address signal DREGAD0-1 is varied further. In this case, the address is "2".

The DMA write signal generating circuit 576 feeds the two write signals /REGWRL1 and /REGWRM1 to the switching circuit 500 in accordance with the timing signals 5M, DMACK and COUNT from the DMA timing signal generating circuit 32. In this case, the two signals are both enabled. This updates the data in the areas d0-d15 within the DMA working memory 502. The data switching circuit 550 supplies the switching circuit 500 with the data from the memory 12 and with the data loaded in the DFF 560 (i.e., low-order byte register; FIG. 31) within the circuit 550 itself, in accordance with the signals DSEL0 and DSEL1 from the DMA timing signal generating circuit 32. In response, the switching circuit 500 supplies the DMA working memory 502 with address values from the DMA address generating circuit 462 and priority judging circuit 382, with the data from the circuit 500 itself, and with the write signals /REGWRL1 and /REGWRM2 from the DMA write signal generating circuit 576. In this manner, the data address is set to the indirect mode work area inside the DMA working memory 502.

The above-described data address read operation is not performed in the direct addressing mode. In accordance with the clock signals 5M, DMACK and COUNT as well as with the data transfer mode signal TYPE from the set parameter register 584, the DMA timing signal generating circuit 32 generates the DMACHEND to inform the priority judging circuit 382 that the operation on the current channel has ended. In the direct addressing mode, the signal DMACHEND is generated immediately before the end of A bus set data movement or of reading of the data transfer line count and, in the indirect addressing mode, the same signal is generated immediately before the end of reading of the data address. On receiving the signal DMACHEND, the priority judging circuit 382 resets the currently operating channel associated with the channel register 483 (FIG. 20), and supplies the switching circuit 500 with the three-bit data of the channel number of the next-highest priority channel as the current address. The above process is repeated until all channels have been finished. Then the priority judging circuit 382 brings the signal EO Low, informing the DMA start/stop circuit 206 that the H-DMA table processing V has ended. In response, the DMA start/stop circuit 206 brings the signals H-DMA, DMA and /CPUBE Low to end the DMA operation and sends the clock signal CPUCK to the CPU 12 to return the latter to its normal operation.

Figure 35C:
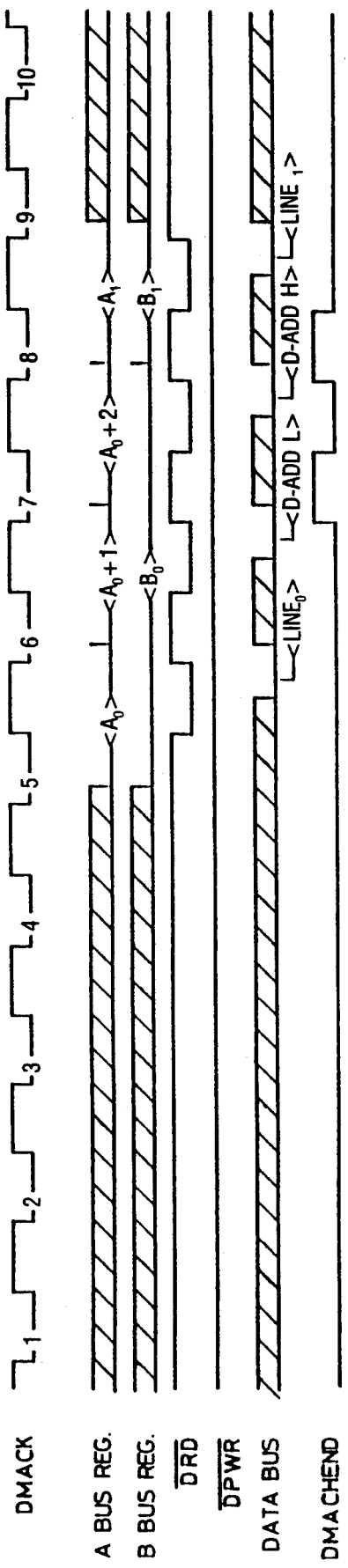

FIGS. 35A, 35B and 35C illustrate the performance timings of the above-described H-DMA table processing V. In these figures, the character "A" stands for an A bus set address and "B" for a B bus set address, and characters "D-ADD" denote a data address. During the H-DMA table processing V, the signal HEN is always High, and the signal /NOGDMA and GDMA are always Low.

Performed next is the H-DMA data processing in which a set parameter and a B bus set value are read out first. That is, the DMA start/stop circuit 206 is fed with the signal HB which comes from the video processor 16 and which indicates a horizontal blanking period. The DMA start/stop circuit 206 detects a leading edge of the signal HB, i.e., the start of a horizontal blanking period, and thereupon brings the signals H-DMA and DMA High to start the H-DMA operation. Concurrently, the DMA start/stop circuit 206 gives the DMA start signal/DAST to the DMA timing signal generating circuit 32 and the channel register reset signal /TRES to the priority judging circuit 382. Furthermore, the DMA start/stop circuit 206 brings the CPU bus enable signal /CPUBE High and stops the CPU clock signal CPUCK, thereby to terminate the operation of the CPU 12. At this point, the signal /TRES goes Low and the signal EO from the priority judging circuit 382 goes High simultaneously, whereby data processing is started.

On receiving the DMA start signals /DAST and /TAST, the DMA timing signal generating circuit 32 generates the timing signals LCNT, SHT0-5 and COUNT. The priority judging circuit 382 supplies the switching circuit 500 with the high-order three bits DREGAD2-4 representing the channel number REGNO0-2 of the highest priority channel. Thereafter, as in the above-described general DMA operation, the set parameter from the DMA working memory 502 is latched in the set parameter register 584, and the B bus set value is latched in the B bus arithmetic register 588.

Data transfer is executed next. The DMA address generating circuit 462 varies the address signal DREGAD0-1 in accordance with the signals LCNT, SHT0-5, 5M, DMACK and COUNT from the DMA timing signal generating circuit 32. In this case, the address is "3" in the direct addressing mode or "2" in the indirect addressing mode. The high-order three bits DREGAD2-4 of the address from the priority judging circuit 382 remain unchanged, and thus, the previous channel number is kept intact.

The switching circuit 500 supplies the DMA working memory 502 with address values from the DMA address generating circuit 462 and from the priority judging circuit 382. In turn, the DMA working memory 502 outputs the A bus address value, i.e., a table address value in the direct addressing mode or a data address value in the indirect addressing mode.

In response to the signal LBO from the DMA timing signal generating circuit 32, the A bus register 586 latches the A bus address value that was read from the DMA working memory 502. The latched A bus address value is outputted onto the address bus. The arithmetic data register 582 receives the signal /5M from the DMA timing signal generating circuit 32 and thereupon latches the A bus address value that was read from the DMA working memory 502. The B bus arithmetic circuit 590 adds the signals BFA0, BFA1 from the DMA timing signal generating circuit 32 and the B bus address value from the B bus arithmetic register 588. The result of the addition by the B bus arithmetic circuit 590 is latched in the B bus register 592 in response to the signal LBO. The latched result is forwarded to the multiplexer 30 (FIG. 1). The DMA control signal generating circuit 562 feeds the multiplexer 30 with the signals DMA and TABLE from the DMA start/stop circuit 206.

Responding to the signal DMA, the multiplexer 30 supplies the memory 14 and video processor 16 with the B bus and control signals from the DMA circuit 26. As a result of this operation, one-byte data is transferred.

The DMA address generating circuit 462 further varies the address signal DREGAD0-1. At this point, the address is "3" in the direct addressing mode or "2" in the indirect addressing mode. Likewise, the A bus address value is updated, the value being a table address value in the direct addressing mode or a data address value in the indirect addressing mode.

The H-DMA data processing is then terminated, and the H-DMA table processing H (FIG. 2) is started. That is, the above-described data transfer is repeated in accordance with the mode designation data placed in the set parameter register 584. If the B bus mode designation data is "000", data transfer is performed once; if the data is "001" or "010", data transfer is performed twice; if the data is "011" or "100", data transfer is repeated four times. Thereafter, the DMA timing signal generating circuit 32 outputs the signal DMACHEND to the priority judging circuit 382. In response to the signal DMACHEND, the priority judging circuit 382 resets the currently operating channel in the channel register 438 (FIG. 22), and supplies the switching circuit 500 with the three-bit data of the channel number of the next-highest priority channel as the address. If the data transfer enable register 406 or the intra-frame operation enable register 396 inside the priority judging circuit 382 is reset, the current channel is not selected, and no data transfer takes place.

When all channels have been finished after repetition of the above process, the signal EO from the priority judging circuit 382 becomes Low. This causes the DMA start/stop circuit 206 to generate the signals /TAST and TABLE. This in turn brings the H-DMA data processing to and end and starts the H-DMA table processing H simultaneously.

Figure 36B:
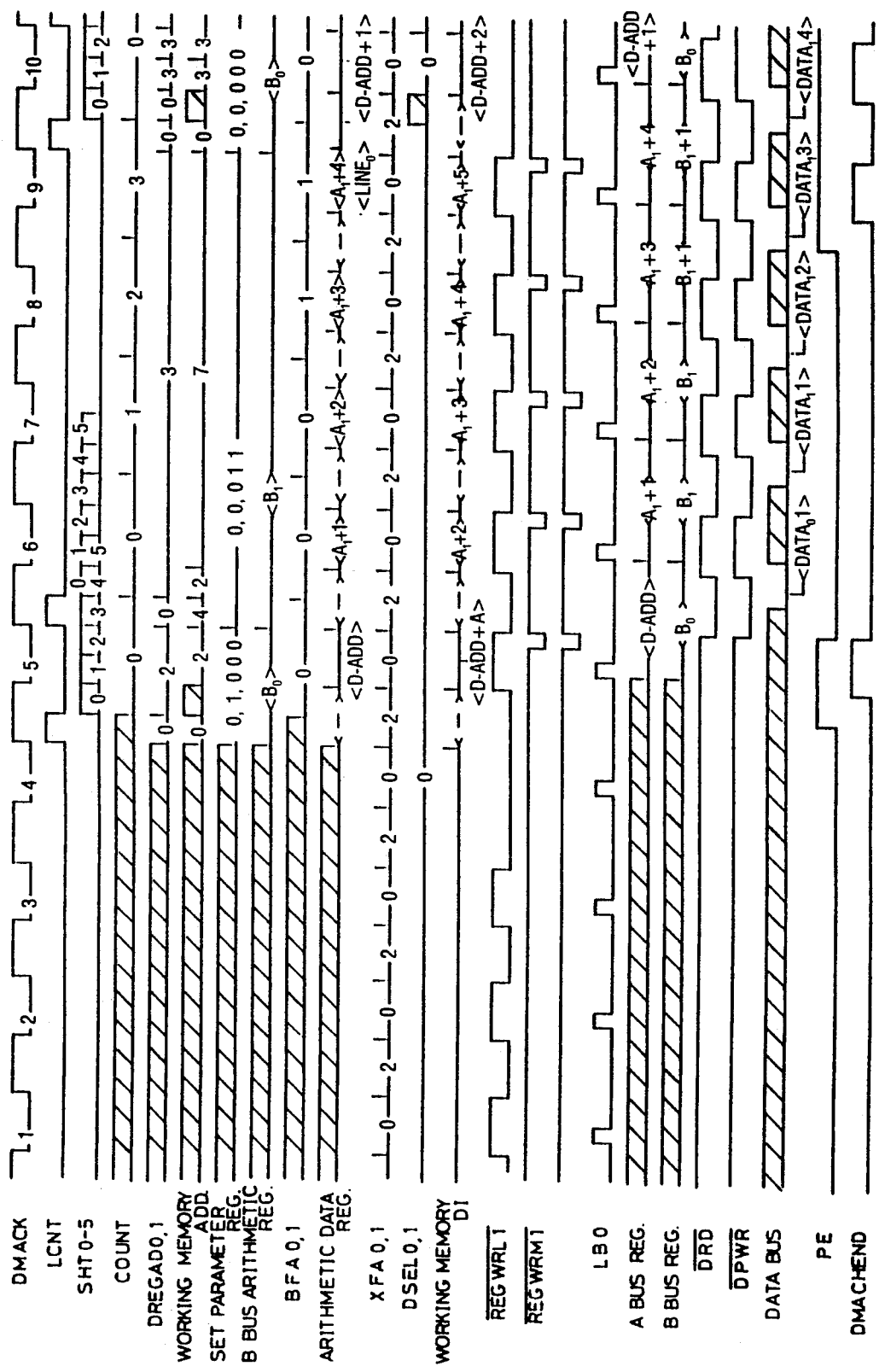

FIGS. 36A and 36B depict the performance timings in effect during the H-DMA data processing. In these figures, the characters "A" stands for an A bus set address and "B" for a B bus set address, and the characters "D-ADD" designate a data address. During the H-DMA data processing, the signal HEN is always High, and the signals /NOGDMA, GDMA, VB, VOHO and VDTOP are always Low.

Figure 37C:
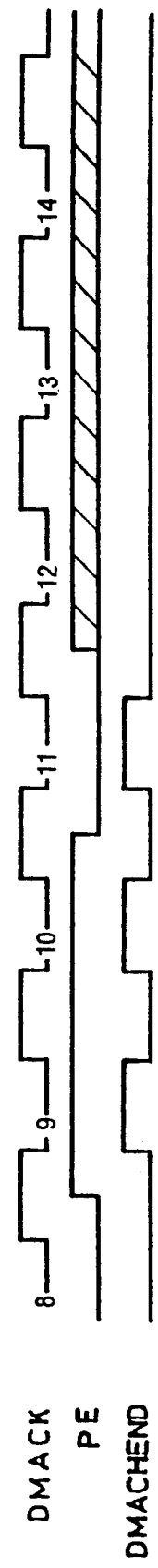

FIGS. 37A, 37B an 37C illustrate the performance timings of the H-DMA table processing. In these figures, the character "A" stands for an A bus set address and "B" for a B bus set address, and the characters "D-ADD" denotes a data address. During the H-DMA data processing, the signal HEN is always High, and the signals /NOGDMA, GDMA, VB, VOHO and VDTOP are always Low.

During the H-DMA table processing H, the set parameter, B bus set value and data transfer line count are read out. That is, the signals /TAST and TABLE from the DMA start/stop circuit 206 are sent to the DMA timing signal generating circuit 32 as well as to the priority judging circuit 382. The output of the signal DMA to the multiplexer 30 and that of the signals /CPUBE and CPUCK to the CPU 12 remain discontinued. The priority judging circuit 382 sets the data transfer enable register 406 (FIG. 20) in response to the signal /TAST, and sets the channel register 438 (FIG. 22) in response to the signal /TRES, thereby supplying the switching circuit 500 with the high-order three bits of the address for the channel number of the highest priority channel. If the intra-frame operation enable register 396 (FIG. 20) in the priority judging circuit 382 is "0", the current channel is not enabled, and the H-DMA table processing H is not carried out.

Thereafter, as in the above-described general DMA operation, the set parameter from the DMA working memory 502 is latched in the set parameter register 584, and the B bus set value is latched in the B bus arithmetic register 588. At the same time, the data transfer line count is latched in the arithmetic data register 582 in response to the signal LCNT from the DMA timing signal generating circuit 32. The arithmetic circuit 580 receives the signals XFA0 and XFA1 from the DMA timing signal generating circuit 32, decrements by 1 the data transfer line count from the arithmetic data register 582, and gives the computed result to the data switching circuit 550. At this point, the end judging circuit 578 outputs the signal LINE0 if d0–d6 of "data transfer line count minus 1" are "0"; if d0–d6 are not "0", the data line count is decremented as described below. If "data line count minus 1" is not "0" and if d7, i.e., data transfer mode signal C, is "0", the data transfer enable register 406 inside the priority judging circuit 382 is reset. This prevents data transfer from taking place during the next horizontal blanking period.

Where the data transfer line count is decremented, the DMA address generating circuit 462 varies the address signal DREGAD0-1 in accordance with a timing signal CLNT and the timing signals CLNT, SHT0-5, 5M, DMACK and COUNT from the DMA timing signal generating circuit 32. In this case, the address is "0". The data switching circuit 550 receives the signals DSEL0 and DSEL1 from the DMA timing signal generating circuit 32 and thereupon supplies the switching circuit 500 with the data of "data transfer line count minus 1" latched in the DFF inside, i.e., in the line count register 560 (FIG. 31).

The DMA write signal generating circuit 576 gives two write signals /REGWRL1 and /REGWRM1 to the switching circuit 500 according to the timing signals 5M, DMACK and COUNT from the DMA timing signal generating circuit 32. In this case, only one write signal /REGWRL1 is enabled. Thus only the data in the area d0–d7 inside the DMA working memory 502 is updated.

The switching circuit 500 supplies the DMA working memory 502 with address values from the DMA address generating circuit 462 and priority judging circuit 382, with the computed result of the data transfer line count from the data switching circuit 550, and with the write signal /REGWRL1 from the DMA write signal generating circuit 576. Thus the data transfer line count in the DMA working memory 502 is updated. Another setting of data to the DMA working memory 502 is performing as follows: When the low-order seven bits d0–d6 of the computed result of the data transfer line count are "0", the DMA address generating circuit 462 gives the low-order two bits of the address to the switching circuit 500 in accordance with the timing signals LCNT, SHT0-5, 5M, DMACK and COUNT from the DMA timing signal generating circuit 32. In this case, the address is "3". Thereafter, as in the above-described A bus set data movement or in the reading of the transfer line count, the data transfer line count is transferred from the memory 14 to an appropriate work area in the DMA working memory 502. In the indirect addressing mode, both the data transfer line count and the relevant data address are transferred. At this point, if the data transfer line count read from the memory 14 is "0", the end judging circuit 578 sends the signal TBEND to the priority judging circuit 382. This resets the intra-frame operation enable register 396 (FIG. 20) inside the priority judging circuit 382, whereby the DMA operation on the current channel is stopped until the next frame.

The above-described H-DMA table processing H ends as follows: The DMA timing signal generating circuit 32 outputs the signal DMACHEND in accordance with the signals 5M, DMACK and COUNT from the DMA timing signal generating circuit 32 as well as with the data transfer mode signal TYPE from the set data register 582. This informs the priority judging circuit 382 that the operation on the current channel has ended. Responding to the signal DMACHEND, the priority judging circuit 382 resets the currently operating channel in the channel register 438, and outputs the channel number of the next-highest priority channel as the address to the switching circuit 500. When all channels have been finished, the signal EO from the priority judging circuit 382 becomes Low. The DMA start/stop circuit 206 brings the signals H-DMA, DMA and /CPUBE Low to end the DMA operation, and gives the clock signal /CPUCK to the CPU 12 to return the latter to its normal operation.

Figure 39C:
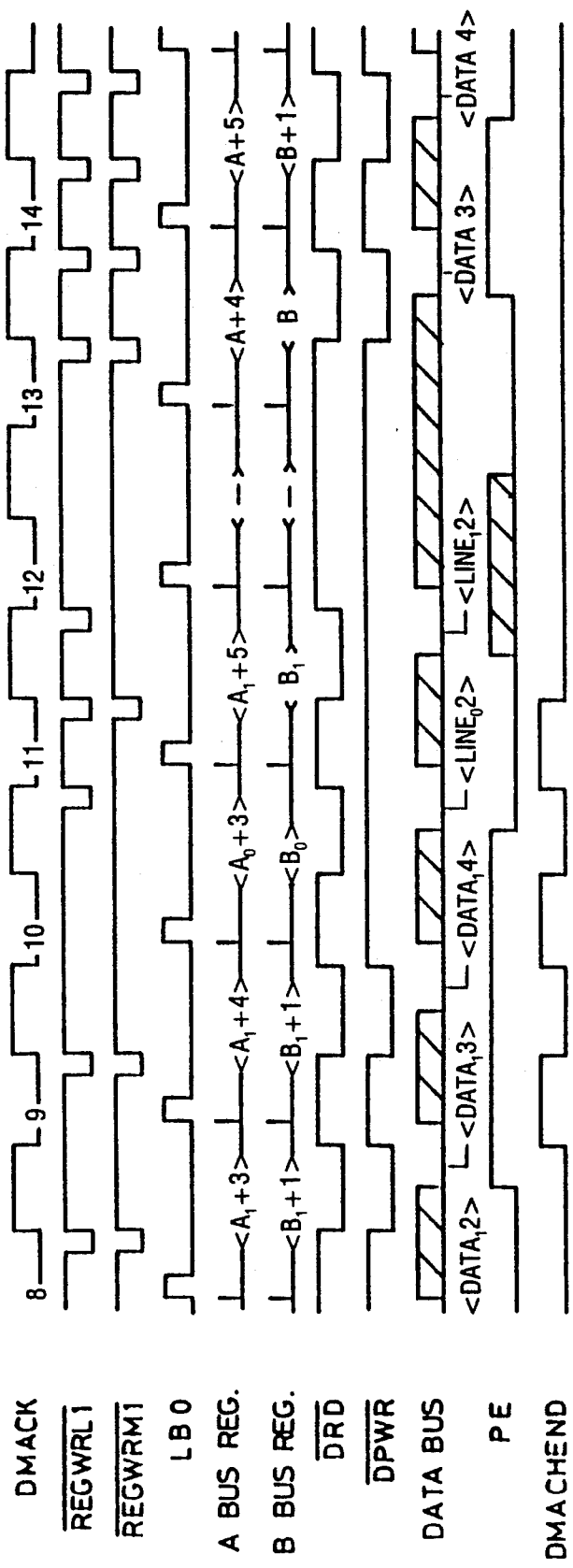

FIGS. 38A and 38B show the performance timings in effect during transition from general DMA to H-DMA, and FIGS. 39A and 39B depict the performance timings in effect during transition from the H-DMA to the general DMA. During transition from the general DMA to the H-DMA, the signal VB remains Low.

Figure 40A:
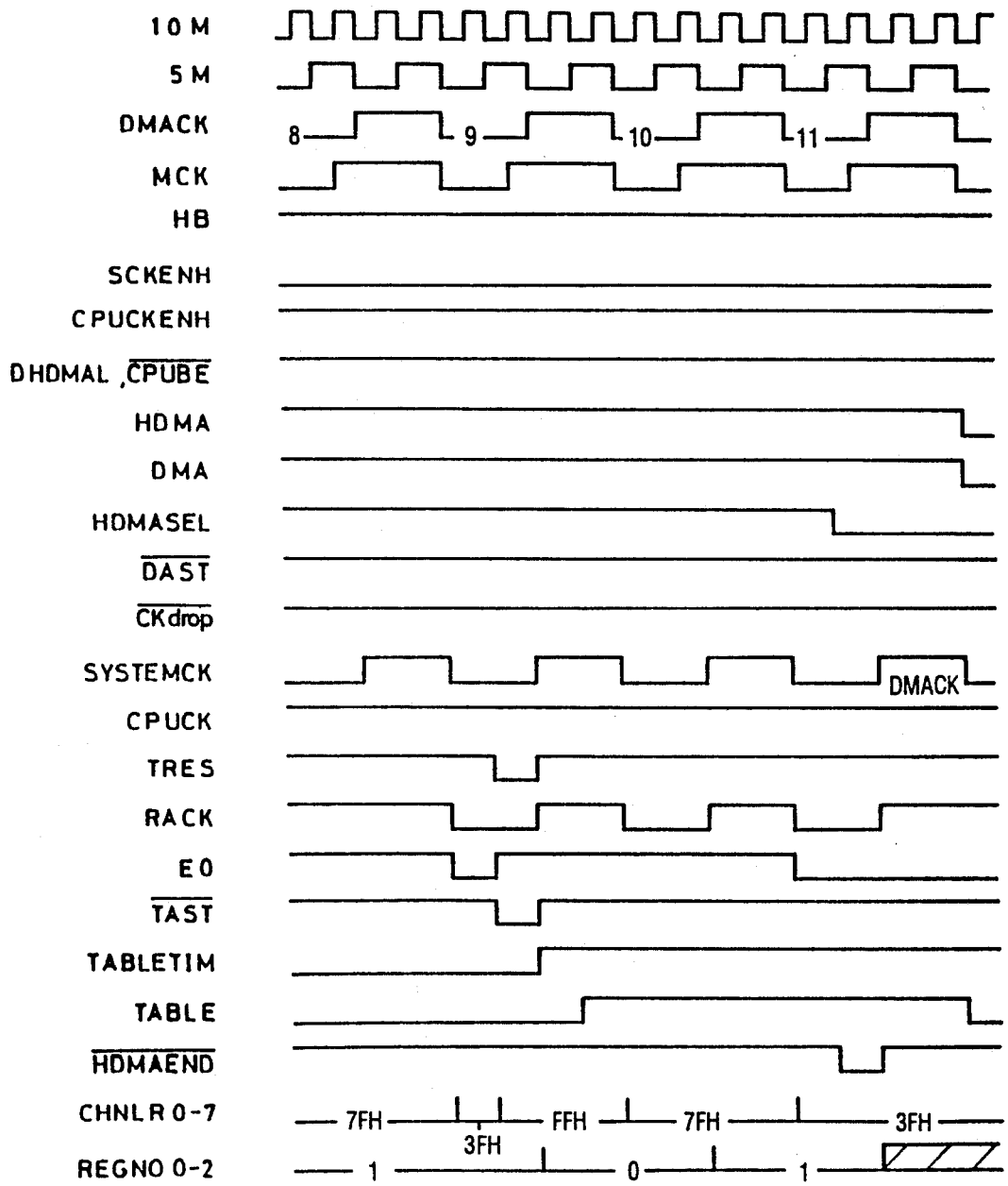
FIGS. 40A and 40B are timing charts showing a PATH in the H-DMA table processing H.
Figure 40B:
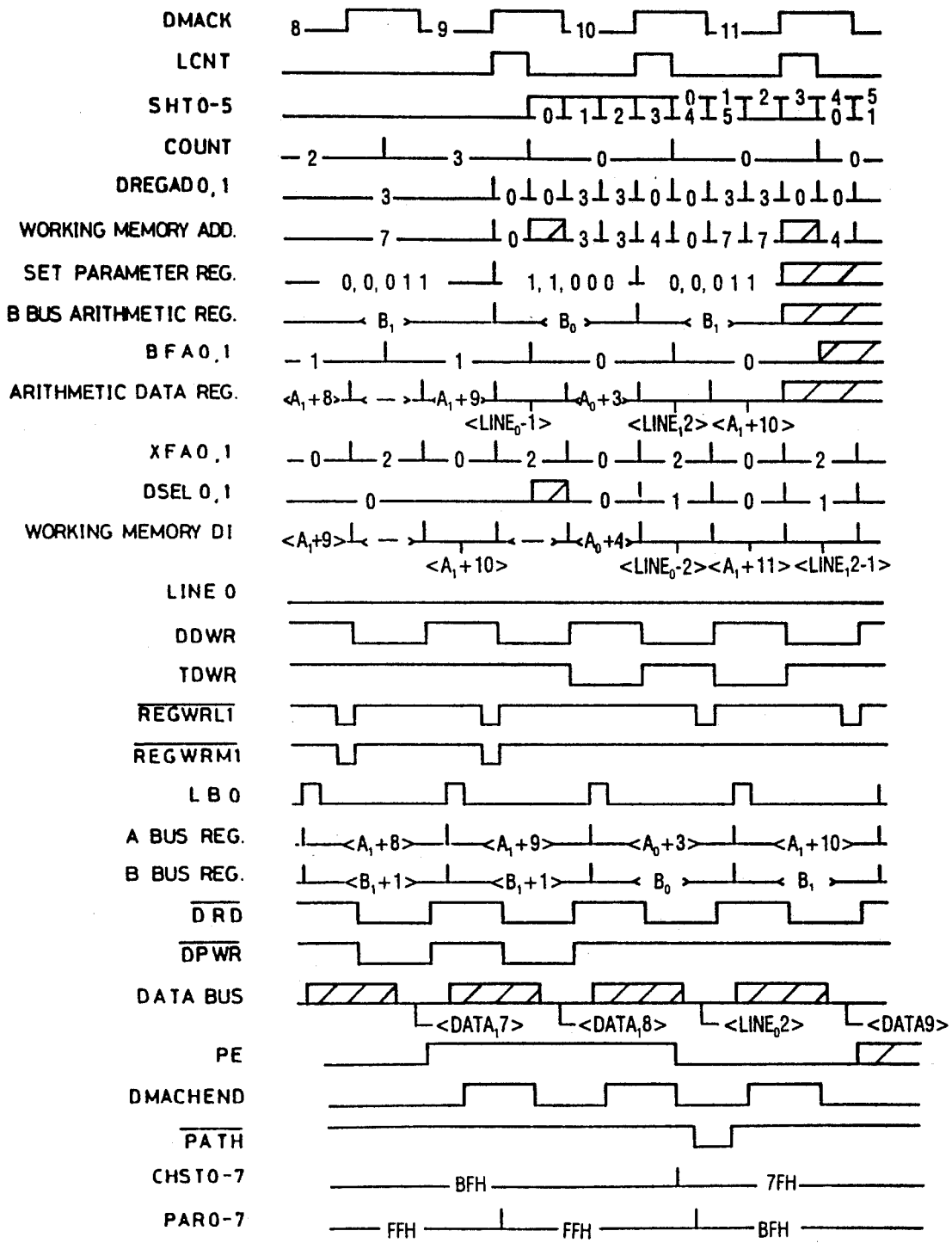
Figure 41A:
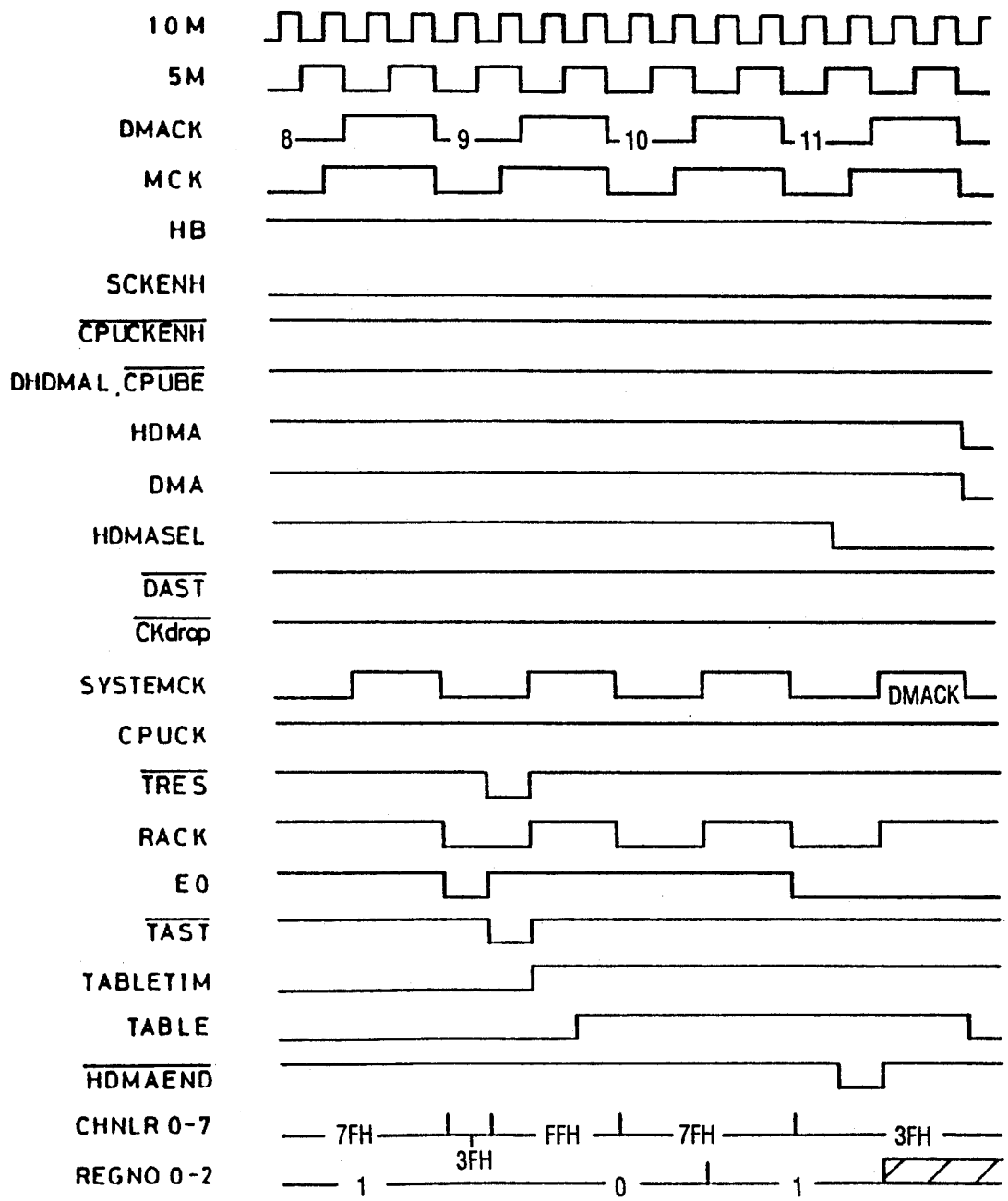
FIGS. 41A and 41B are timing charts showing an LITIM operation in the H-DMA table processing H.
Figure 41B:
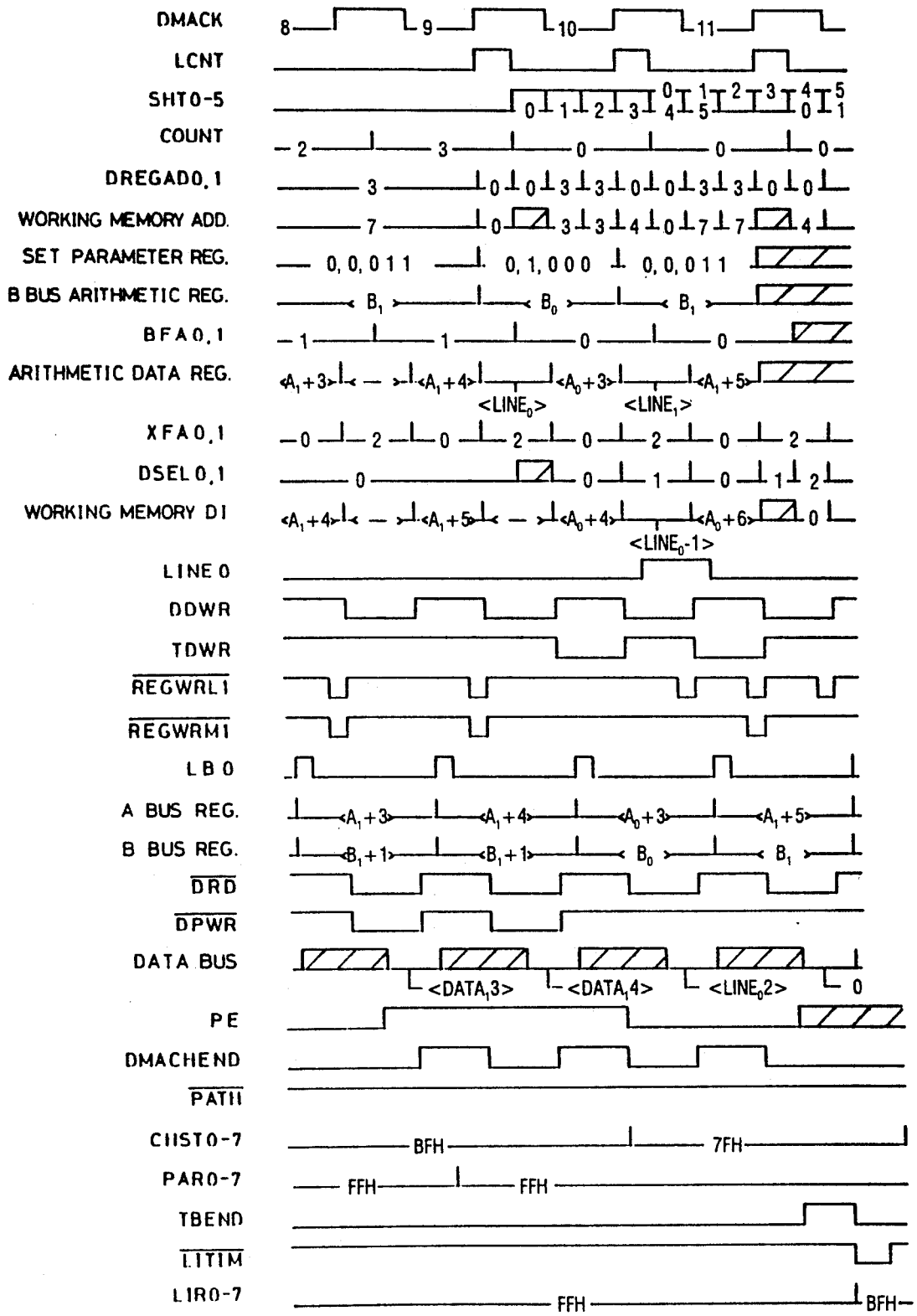
Figure 42:
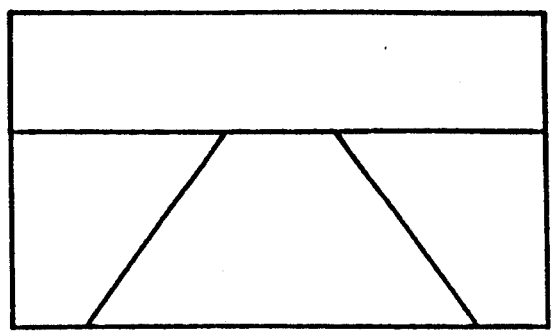
FIGS. 42 and 43 are illustrative views showing examples of still images varied in accordance with the embodiment of the present invention.
Figure 43:
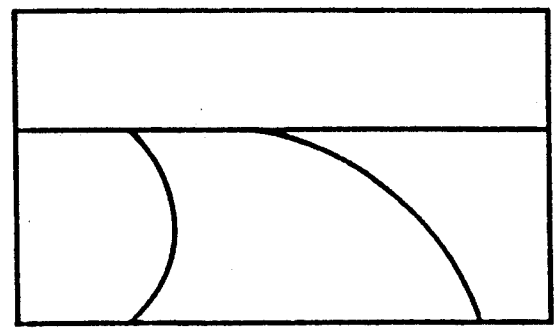

FIGS. 40A and 40B illustrate the path timings in effect during the H-DMA table processing H. FIGS. 41A and 41B indicate the limit timings in effect during the H-DMA table processing H.

Where the embodiment described above is applied, it is very easy to change the background image (still picture) of FIG. 42 into what is shown in FIG. 43. According to the prior art, such change of the background image requires either completely updating the contents of the video RAM for vertical blanking periods or resorting to the so-called partial scroll method whereby the scroll value is varied per scanning line. The conventional partial scroll method must fulfill very strict timing requirements. With this embodiment of the invention, by contrast, partial scrolls are very easy to accomplish. That is, where a partial scroll is needed, the signal C outputted by the data switching circuit 550 is initialized to "1" for H-DMA. This causes the arithmetic circuit 580 to repeat computations such as increments by 1, increments by 0 and decrements by 1 during subsequent horizontal blanking periods as per instructions from the arithmetic data register 582. All that is needed is to set an initial value, and the partial scroll will then be carried out. In practice, a scroll register, not shown, is set per horizontal blanking period for H-DMA. This eliminates the need for the program to fine-adjust the timing. With that programming burden lifted from it, the CPU may turn to other matters that need its attention.

In addition, a memory cartridge incorporating a semiconductor memory is used as an external storage device in the above described embodiments; however, it is possible to use an external storage device such as a CD-ROM in the present invention. In a case of use of the memory cartridge, the program data including the character data, color data, priority data and etc., and the parameter data including the number of data to be transferred by the DMA, an address in which the data to be transferred is stored, an address to which the data is to be transferred and are stored in the semiconductor memory as described in the above, and the CPU 12 generates control data for the moving picture characters and the still (background) picture characters on the basis of the program data read from the semiconductor memory and outputs the same to the video processor 16.

In contrast, in a case of use of the CD-ROM, the above described program data is optically recorded as digital data in the CD-ROM (not shown). In addition, an optical reader for optically reading recorded date on the CD-ROM is connected to a suitable connector such as a expansion connector. When the CD-ROM is used as the external storage unit, a memory cartridge is also used. In this case, the memory cartridge is comprised with a ROM (not shown) that stores a starting program for controlling an operation of the optical reader, a buffer RAM (not shown) for temporarily storing the program data read from the CD-ROM, and etc. Then, prior to a start of a display operation, the CPU 12 applies control data to the optical reader on the basis of the starting program of the ROM to cause the optical reader read the recorded data of the CD-ROM. The parameter data read from the CD-ROM is transferred to the working RAM and the program data is transferred to the buffer RAM included in the memory cartridge. The CPU 12 controls the video processor 16 on the basis of the program data stored in the buffer RAM. That is, after the data read from the CD-ROM by the optical reader has been transferred to the respective memories, the CPU 12 and the video processor 16 execute the display operation and the DMA operation by accessing the respective memories as done in the previous embodiments.

In the case of the above described CD-ROM, the program for executing the H-DMA operation may be stored in advance in the ROM which is included in the memory cartridge and used for storing the starting program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A direct memory access apparatus for use in an image processing system that displays an image on a raster scan monitor, said apparatus comprising:
   a data storing means for storing a data to be transferred;
   a data receiving means for receiving a transferred data;
   an address value generating means for generating a first address value and a second address value necessary for direct memory access;
   a horizontal blanking period detecting means for detecting a horizontal blanking signal which is synchronous with a horizontal blanking period of said raster scan monitor;
   a vertical blanking period detecting means for detecting a vertical blanking signal which is synchronous with a vertical blanking period of said raster scan monitor;
   a data transfer request means for generating a data transfer request signal when said horizontal blanking detecting means detects the horizontal blanking signal and said vertical blanking detecting means does not detect the vertical blanking signal; and
   a first data transfer means for reading, in response to said data transfer request signal from said data transfer request signal from said data transfer request means, said data to be transferred from said data storing means in accordance with said first address value, said first data transfer means transferring the read data to said data receiving means in accordance with said second address value.

2. A direct memory access apparatus according to claim 1, wherein said first transfer means includes a first addressing means to which said first address value from said address value generating means is set as an initial address, said first addressing means changing an address value at least once during one frame period of said raster scan monitor when said horizontal blanking period is detected, said first addressing means designating a read address of said data storing means in accordance with a changed address value; and a second addressing means to which said second address value from said address value generating means is set as an initial address, said second addressing means changing an address value at least once during said one frame period of said raster scan monitor when said horizontal blanking period is detected, said second addressing means designating an address of said data receiving means in accordance with a changed address value.

3. A direct memory access apparatus according to claim 2, wherein said data storing means stores a transfer data of at least one byte and the number of horizontal blanking periods necessary for transferring said data,
said apparatus further comprising a transfer data number designating means for designating the number of the transfer data to be transferred during one horizontal blanking signal period,
said first addressing means changing said address value, during said one horizontal blanking signal period, as many times as the number of the transfer data designated by said transfer data number designating means and repeatedly changing said address value as indicated by many times as said number of horizontal blanking periods stored in said data storing means.

4. A direct memory access apparatus according to claim 2, wherein said data storing means stores a transfer data of at least one byte correspondingly to a period of one said horizontal blanking period and the number of horizontal blanking periods during which no data transfer is performed through direct memory access,
said apparatus further comprising a transfer data number designating means for designating the number of transfer data to be transferred during said period of one horizontal blanking period,
said first addressing means changing said address value, during said one horizontal blanking period, as many times as the number of the transfer data designated by said transfer data number designating means,
a control means including an inhibiting means for inhibiting data transfer as many times as said number of horizontal blanking periods which is stored in said data storing means and during which no data transfer is performed after as many data as said number of transfer data designated by said transfer data number designating means are transferred.

5. A direct memory access apparatus according to claim 1, wherein said first data transfer means includes:
a first register to which said first address value from said address value generating means is set as an initial address;
a first addressing means for temporarily storing, during each frame period of said raster scan monitor, said first address value set in said first register, said first addressing means designating a read address of said data storing means in accordance with said address value changed at least once during said one frame period of said raster scan monitor when said horizontal blanking period is detected;
a second register to which said second address value from said address value generating means is set as an initial address; and
a second addressing means for temporarily storing, during each frame period of said raster scan monitor, said second address value that is set in said second register, said second addressing means designating an address of said data receiving means in accordance with said address value changed at least once during said one frame period of said raster scan monitor when said horizontal blanking period is detected,
wherein the same data is transferred over a plurality of frames in synchronism with the same horizontal blanking period of each frame.

6. A direct memory access apparatus according to claim 1, further comprising a start signal generating means for generating a start signal that starts another direct memory access; a second data transfer means for transferring data from said data storing means to said data receiving means in response to said start signal; and a switching means for causing said first data transfer means to execute data transfer in response to said horizontal blanking period during data transfer performed by said second data transfer means.

7. A direct memory access apparatus according to claim 6, further comprising a plurality of data transfer channels; and a setting means for setting for each of said channels one of the data transfers executed by said first data transfer means and the data transfer executed by said second data transfer means.

8. An external storage device used in an image processing apparatus that displays an image on a raster scan monitor, said external storage device comprising:
an address value storing means for storing a first address value and a second address value necessary for direct memory access, at least one of said external storage device and said image processing apparatus including a data storing means for storing data to be transferred through the direct memory access,
wherein said image processing apparatus includes a data receiving means for receiving a transferred data;
a first signal generating means for generating a horizontal blanking signal in synchronism with a horizontal blanking period of said raster scan monitor; and
a second signal generating means for generating a vertical blanking signal in synchronism with a vertical blanking period of said raster scan monitor;
a first data transfer means operative in the absence of said vertical blanking signal for reading, in response to said horizontal blanking signal from said first signal generating means, said data to be transferred from said data storing means in accordance with said first address value, said first data transfer means transferring the read data to said data receiving means in accordance with said second address value.

9. An external storage device according to claim 8, further comprising a number storing means for storing the number of horizontal blanking periods necessary for transferring said data to be transferred; and a transfer data number storing means for storing the number of the data to be transferred during one horizontal blanking signal period, and
said first transfer means changing said address value, during said one horizontal blanking signal period, as many times as the number of the data to be transferred designated by said transfer data number, and repeatedly changing said address value as many times as indicated by said number of horizontal blanking periods.

10. An external storage device according to claim 8, further comprising a first number storing means for storing the number of horizontal blanking periods during which no data transfer is performed through the direct memory access; and
a second number storing means for storing the number of the data to be transferred during said one horizontal blanking signal period, and
said first transfer means changing said address value, during said one horizontal blanking signal period, as many times as the number of the data to be transferred, and said image processing apparatus further including an inhibit means for inhibiting data transfer as many times as said number of horizontal blanking periods.

11. An external storage device according to claim 8, further comprising a start signal generating means for generating a start signal that starts another direct memory access, and said image processing apparatus including a second data transfer means for transferring data from said data storing means to said data receiving means in response to said start signal; and a switching means for causing said first data transfer means to execute data transfer in response to said horizontal blanking signal during data transfers performed by said second data transfer means.

12. An external storage device according to claim 11, further comprising a setting means for setting either the data transfer by said first transfer means or the data transfer by said second data transfer per each direct memory access channel.

* * * * *